United States Patent
Boyer et al.

(10) Patent No.: US 9,915,194 B2
(45) Date of Patent: **\*Mar. 13, 2018**

(54) TWIN SCROLL TURBOCHARGER IN A VARIABLE DISPLACEMENT ENGINE

(71) Applicant: Ford Global Technologies, LLC, Dearborn, MI (US)

(72) Inventors: Brad Alan Boyer, Canton, MI (US); Gregory Patrick McConville, Ann Arbor, MI (US); Kim Hwe Ku, West Bloomfield, MI (US); James Douglas Ervin, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,148

(22) Filed: Jun. 12, 2017

(65) Prior Publication Data

US 2017/0276061 A1    Sep. 28, 2017

Related U.S. Application Data

(60) Division of application No. 15/218,879, filed on Jul. 25, 2016, now Pat. No. 9,702,295, which is a
(Continued)

(51) Int. Cl.
*F02B 37/02* (2006.01)
*F02D 17/02* (2006.01)
(Continued)

(52) U.S. Cl.
CPC .......... *F02B 37/025* (2013.01); *F01N 13/107* (2013.01); *F02D 17/02* (2013.01); *F02M 26/04* (2016.02); *Y02T 10/144* (2013.01)

(58) Field of Classification Search
CPC ........ F02B 37/025; F02B 75/06; F02B 37/22; F02B 37/24; F02B 2075/1816;
(Continued)

(56) References Cited

U.S. PATENT DOCUMENTS 3,383,092 A   5/1968 Cazier
3,941,104 A   3/1976 Egli
(Continued)

FOREIGN PATENT DOCUMENTS

CN   103185062 A   7/2013
WO   2013060625 A1   5/2013

OTHER PUBLICATIONS

Flierl, R. et al., "Turbocharged Three-Cylinder Engine with Activation of a Cylinder," MTZ Motortechnische Zeitschrift, vol. 75, No. 6, Jun. 1, 2014, 6 pages.

*Primary Examiner* — Hung Q Nguyen
*Assistant Examiner* — Xiao Mo
(74) *Attorney, Agent, or Firm* — Julia Voutyras; McCoy Russell LLP

(57) ABSTRACT

Methods and systems are provided for operating an engine with variable displacement engine (VDE) operation coupled to a twin scroll turbocharger. One method comprises directing exhaust from a first outer cylinder and a first inner cylinder of four cylinders to a first scroll of the twin scroll turbocharger, directing exhaust from a second outer cylinder and a second inner cylinder of the four cylinders to a second scroll of the twin scroll turbocharger, and during a first condition, firing all four cylinders with uneven firing.

6 Claims, 18 Drawing Sheets

Related U.S. Application Data continuation of application No. 14/445,876, filed on Jul. 29, 2014, now Pat. No. 9,399,969.

(51) Int. Cl.
  *F02M 26/04* (2016.01)
  *F01N 13/10* (2010.01)

(58) Field of Classification Search
  CPC ........ F02B 75/20; F01N 13/107; F02D 17/02; F02M 26/04; Y02T 10/144
  See application file for complete search history.

(56) References Cited

U.S. PATENT DOCUMENTS

| | | |
|---|---|---|
| 4,172,434 A | 10/1979 | Coles |
| 4,974,449 A | 12/1990 | Core |
| 5,927,242 A | 7/1999 | Kollock |
| 6,324,847 B1 | 12/2001 | Pierpont |
| 6,600,989 B2 | 7/2003 | Sellnau et al. |
| 7,059,997 B2 | 6/2006 | Nishizawa et al. |
| 7,751,963 B2 | 7/2010 | Gecim et al. |
| 7,891,332 B2 | 2/2011 | Shin et al. |
| 7,913,669 B2 | 3/2011 | Luken et al. |
| 8,145,410 B2 | 3/2012 | Berger et al. |
| 8,161,747 B2 | 4/2012 | Pierpont et al. |
| 8,176,891 B2 | 5/2012 | Choi |
| 8,210,148 B2 | 7/2012 | Morgan et al. |
| 8,347,849 B2 | 1/2013 | Wermuth et al. |
| 8,375,904 B2 | 2/2013 | Gustafson |
| 8,676,470 B2 | 3/2014 | Shinagawa et al. |
| 2004/0074480 A1 | 4/2004 | Chen et al. |
| 2005/0193721 A1 | 9/2005 | Surnilla et al. |
| 2006/0102124 A1 | 5/2006 | Calderwood |
| 2008/0154468 A1 | 6/2008 | Berger et al. |
| 2012/0159946 A1 | 6/2012 | Sauerstein |
| 2014/0283783 A1* | 9/2014 | Hayman .................. F16C 3/06 123/319 |
| 2014/0360477 A1 | 12/2014 | Doering et al. |
| 2015/0361927 A1 | 12/2015 | Glugla |
| 2016/0032845 A1 | 2/2016 | Boyer et al. |
| 2016/0032846 A1 | 2/2016 | Boyer et al. |
| 2016/0040589 A1 | 2/2016 | Glugla et al. |
| 2016/0102616 A1 | 4/2016 | McConville et al. |
| 2016/0102620 A1 | 4/2016 | Ervin et al. |

\* cited by examiner

TWIN SCROLL TURBOCHARGER IN A VARIABLE DISPLACEMENT ENGINE

CROSS REFERENCE TO RELATED APPLICATIONS

The present application is a divisional of U.S. patent application Ser. No. 15/218,879, entitled "TWIN SCROLL TURBOCHARGER IN A VARIABLE DISPLACEMENT ENGINE," filed on Jul. 25, 2016. U.S. patent application Ser. No. 15/218,879 is a continuation of U.S. patent application Ser. No. 14/445,876, entitled "TWIN SCROLL TURBOCHARGER IN A VARIABLE DISPLACEMENT ENGINE," filed on Jul. 29, 2014, now U.S. Pat. No. 9,399,969. The entire contents of the above referenced-applications are hereby incorporated by reference in their entirety for all purposes.

FIELD

The present disclosure relates to a turbocharger layout for a variable displacement engine.

BACKGROUND AND SUMMARY

Twin scroll turbocharger configurations may be used in turbocharged engines. A twin scroll turbocharger configuration may separate an inlet to an exhaust turbine into two separate passages connected to exhaust manifold runners so that exhaust from engine cylinders whose exhaust gas pulses may interfere with each other are separated.

For example, on a typical inline four (I4) engine with a cylinder firing order of 1-3-4-2, exhaust manifold runners from cylinder 1 and cylinder 4 may be connected to a first inlet of a twin scroll turbine and exhaust manifold runners from cylinder 2 and cylinder 3 may be connected to a second inlet of said twin scroll turbine, where the second inlet is different from the first inlet. Separating exhaust gas pulses in this way may result in increased efficiency of exhaust gas delivery to the turbine and may increase power output of the turbine.

However, the above configuration may not be applicable to an engine with a different firing order. As an example, ignition events in a four-cylinder engine may be configured to occur in the following order: 1-3-2-4. In this scenario, coupling exhaust manifold runners from cylinders 1 and 4 to a first inlet and coupling exhaust runners from cylinders 2 and 3 to a second inlet of the twin scroll turbine may result in exhaust pulse interference producing a decrease in volumetric efficiency and affecting turbine spool-up.

The inventors herein have identified the above issue and devised an approach that partially addresses this issue. In one approach, a method for the engine comprises directing exhaust from a first outer cylinder and a first inner cylinder of four cylinders to a first scroll of a twin scroll turbocharger, directing exhaust from a second outer cylinder and a second inner cylinder of the four cylinders to a second scroll of the twin scroll turbocharger, and during a first condition, operating all cylinders with at least one uneven firing. An example engine may comprise four cylinders arranged in an inline configuration with a firing order of 1-3-2-4, as mentioned above. Based on cylinder positions within an engine block, cylinder 1 may be categorized as a first outer cylinder, cylinder 4 may be identified as a second outer cylinder, cylinder 2 may be categorized as a first inner cylinder (next to cylinder 1), and cylinder 3 may be identified based on its position in the engine block as second inner cylinder (next to cylinder 4). By separating exhaust from cylinders 1 and 2 from exhaust flowing out of cylinders 3 and 4, exhaust pulse separation may be maintained between cylinders 1 and 4, and between cylinders 2 and 3.

As another example, a turbocharged variable displacement engine may include four inline cylinders such that two cylinders are positioned as outer cylinders while remaining two cylinders are positioned as inner cylinders. The engine may be configured to operate with a firing sequence of first outer cylinder-second inner cylinder-second outer cylinder-first inner cylinder. To enable sufficient exhaust pulse separation, exhaust runners from the first outer cylinder and the first inner cylinder may be fluidically coupled to a first scroll of an exhaust turbine of the turbocharger while exhaust runners from the second inner cylinder and the second outer cylinder may be fluidically coupled to a second scroll of the exhaust turbine of the turbocharger. The engine be operated with uneven firing by firing the first outer cylinder midway between the second inner cylinder and the second outer cylinder, and by firing the first inner cylinder, the second inner cylinder, and the second outer cylinder at 240 crank angle degree intervals from each other. Thus, the first outer cylinder may be fired approximately 120 crank angle degrees after the second outer cylinder has fired, and 120 crank angle degrees before the second inner cylinder fires. The engine may also be operated in a variable displacement mode (or reduced cylinder mode) by deactivating the first outer cylinder and firing the remaining three cylinders at 240 crank angle degree intervals.

In this way, a turbocharged engine with a firing order of 1-3-2-4 may be operated with exhaust pulse separation. By delivering exhaust from cylinder 1 and cylinder 2 to a first scroll of an exhaust turbine and directing exhaust from cylinder 3 and cylinder 4 to a second scroll of the exhaust turbine, exhaust pulse interference during an uneven firing mode may be reduced. Each scroll of the exhaust turbine may receive exhaust pulses separated by a minimum of 240 crank angle degrees in the full-cylinder mode with uneven firing and the reduced cylinder even firing mode. Exhaust pulse separation with a twin scroll turbocharger may enable more efficient recovery of kinetic energy from the exhaust gases. Therefore, the engine may operate with increased power output and improved fuel efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
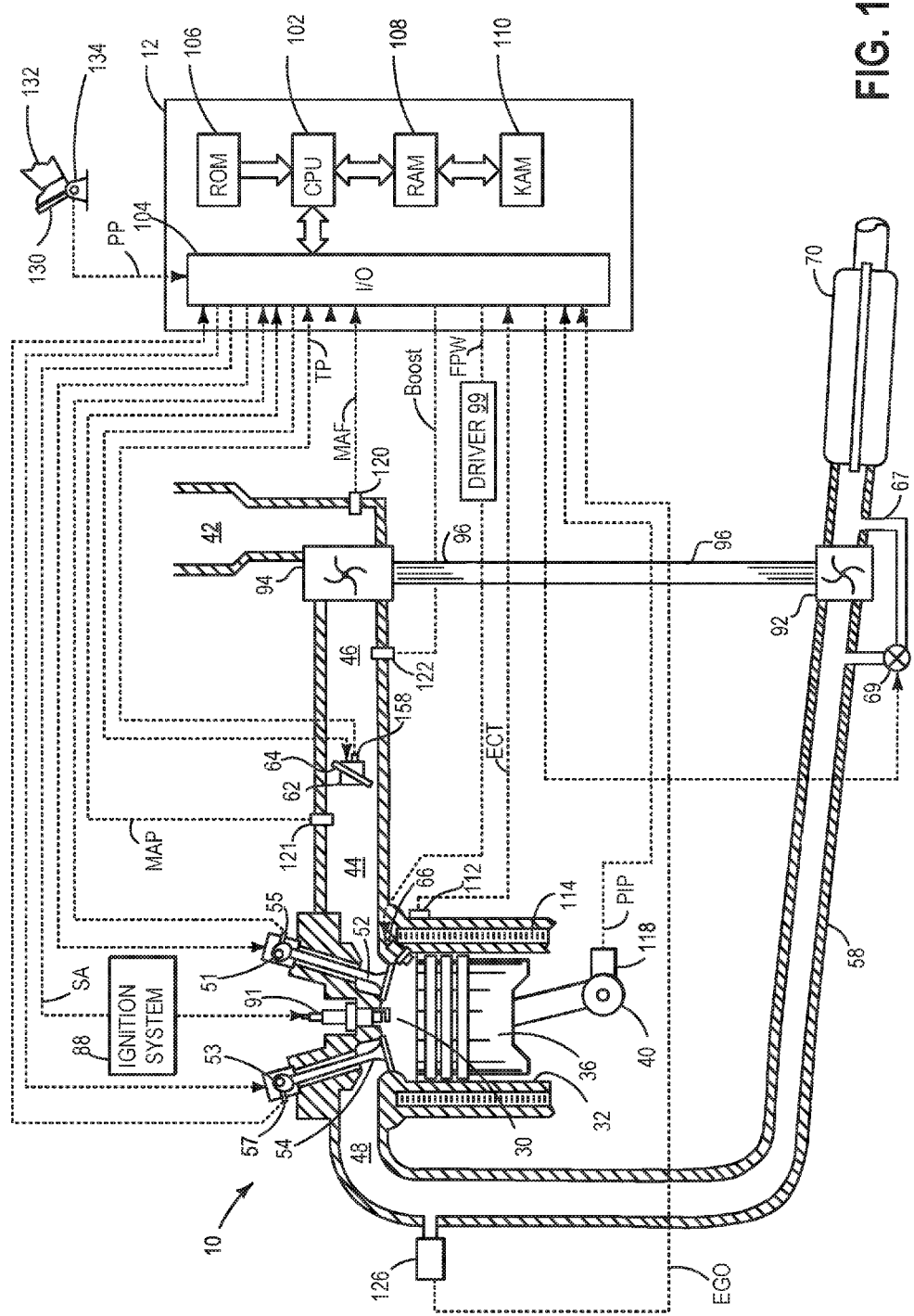
FIG. 1 shows a schematic diagram of an example cylinder within an engine.
Figure 2:
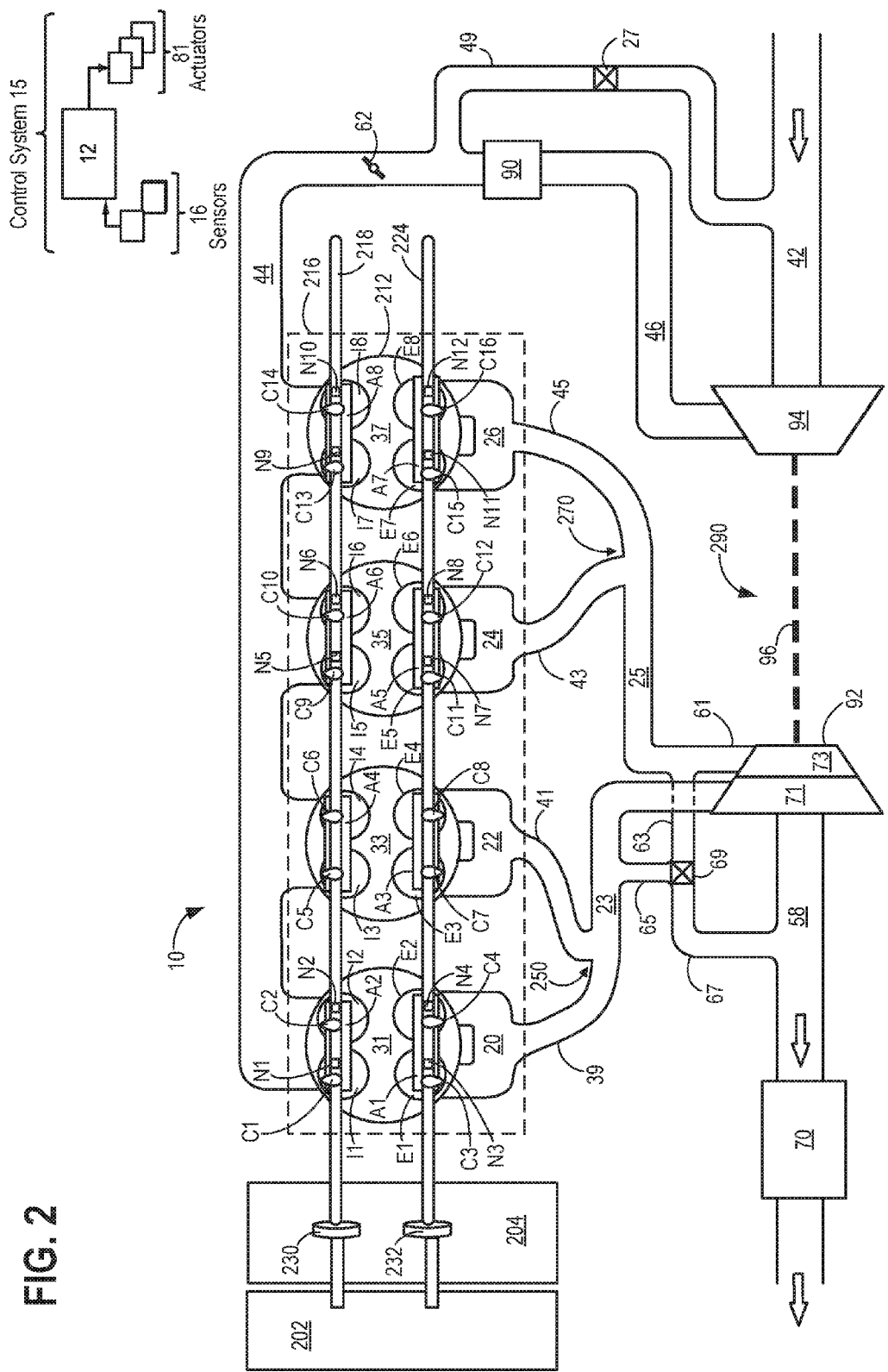
FIG. 2 portrays a schematic layout of a four-cylinder engine with a twin scroll turbocharger, according to an embodiment of the present disclosure.
Figure 4:
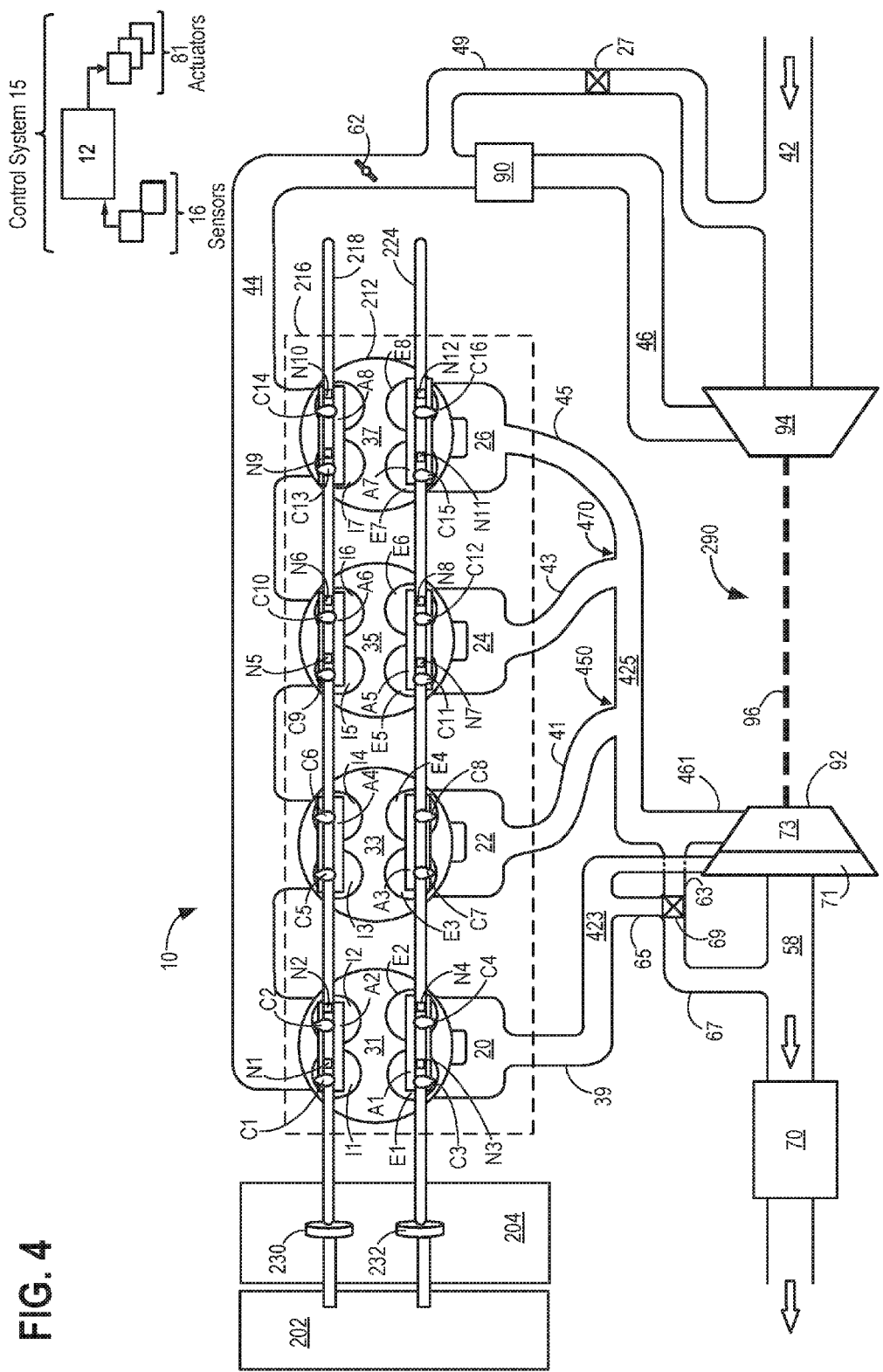
FIG. 4 depicts an alternate exhaust layout for the embodiment shown in FIG. 2.
Figure 5:
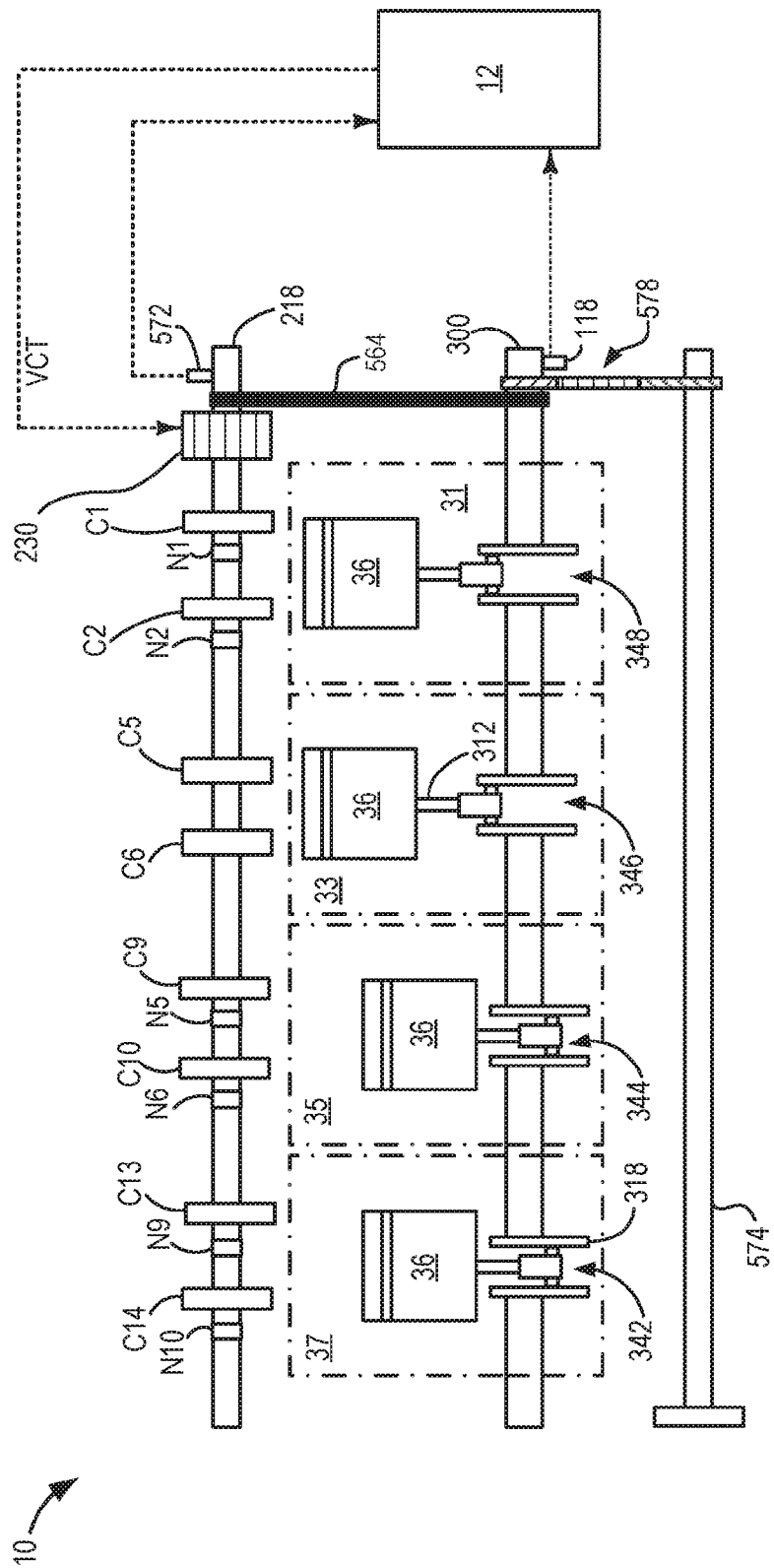
FIG. 5 shows a schematic diagram of an engine including a crankshaft, a balance shaft, and a camshaft, according to an embodiment of the present disclosure.
Figure 6:
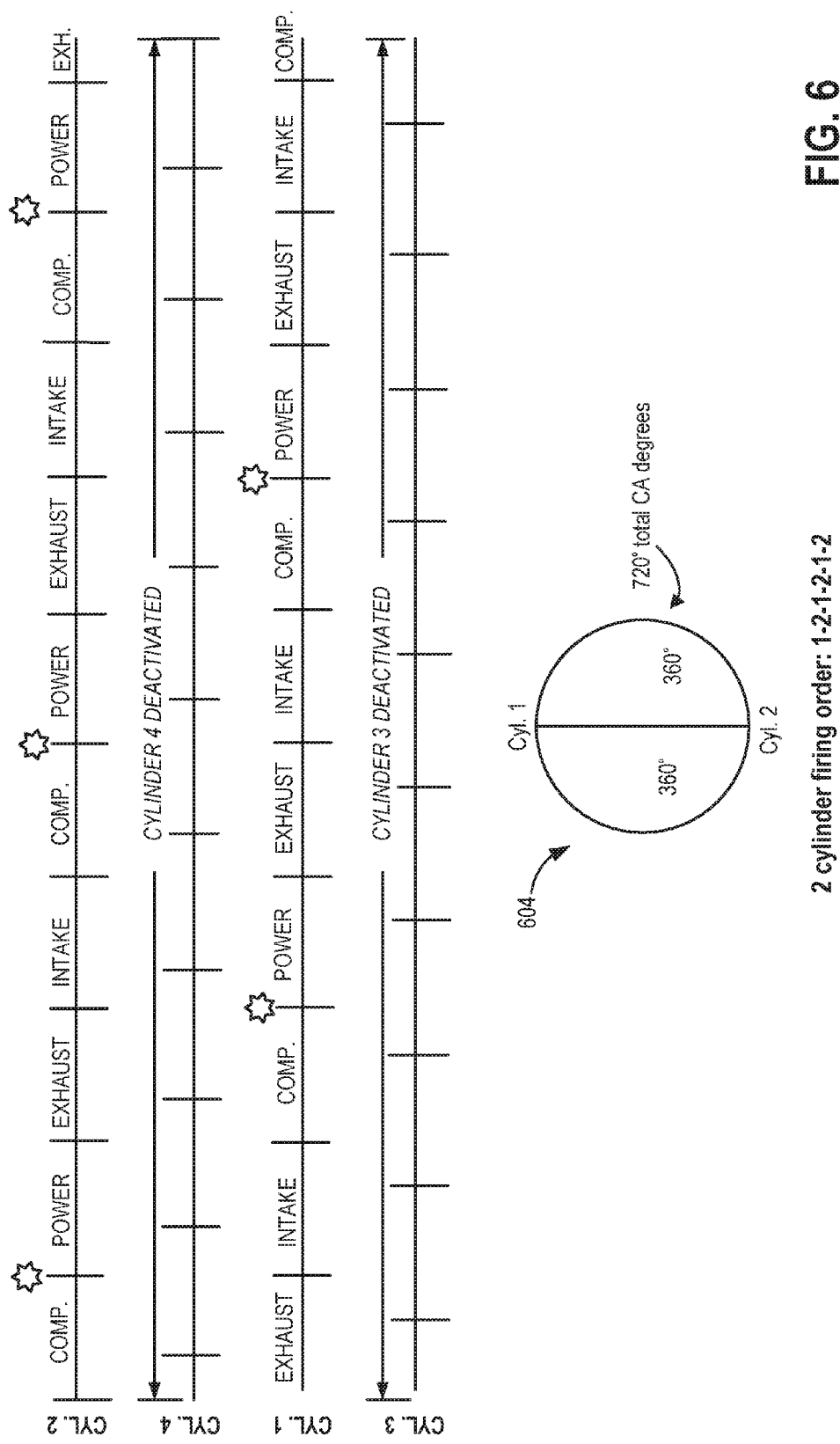
FIGS. 6-8 illustrate example spark timing diagrams in different engine operation modes.
Figure 7:
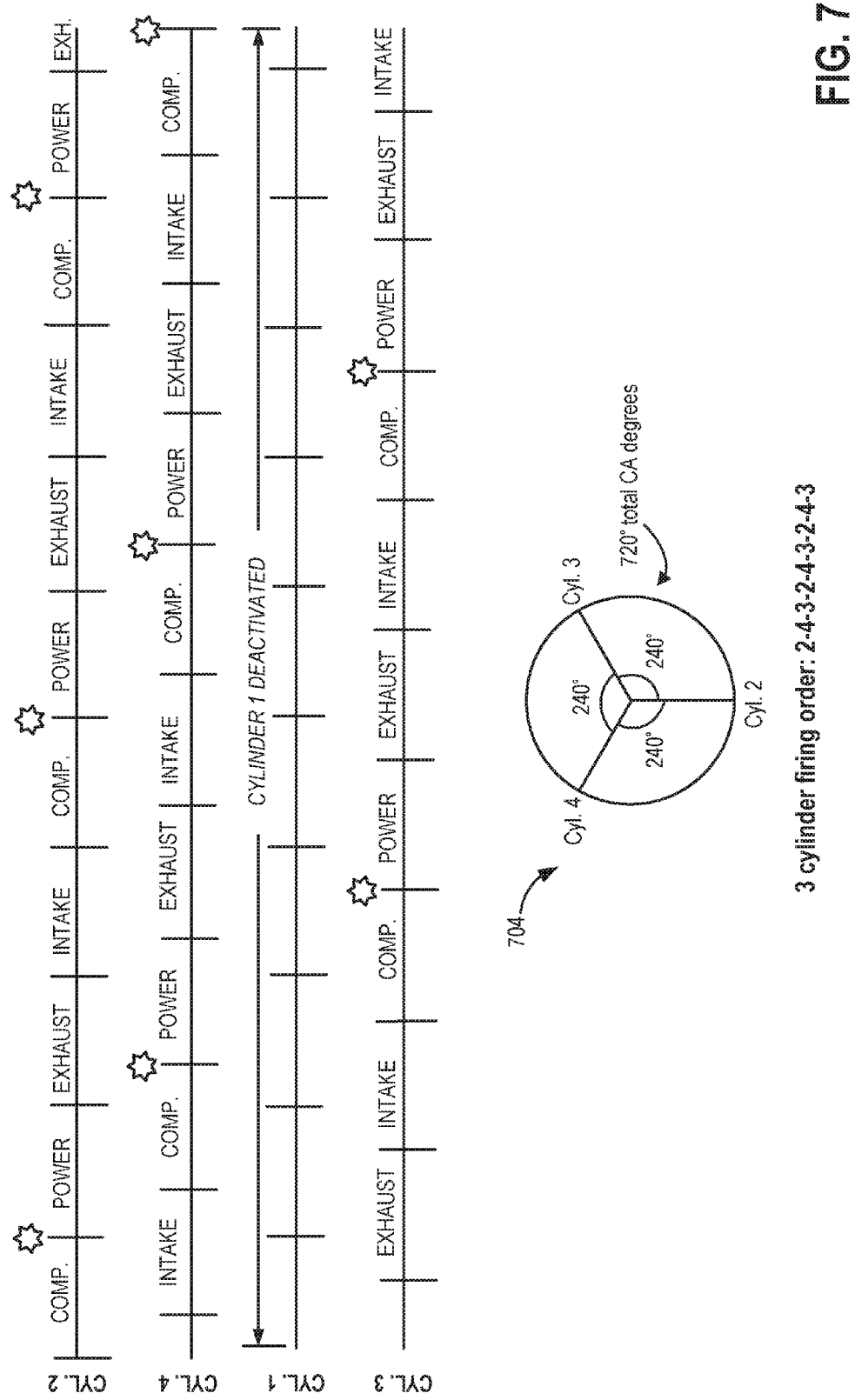
Figure 8:
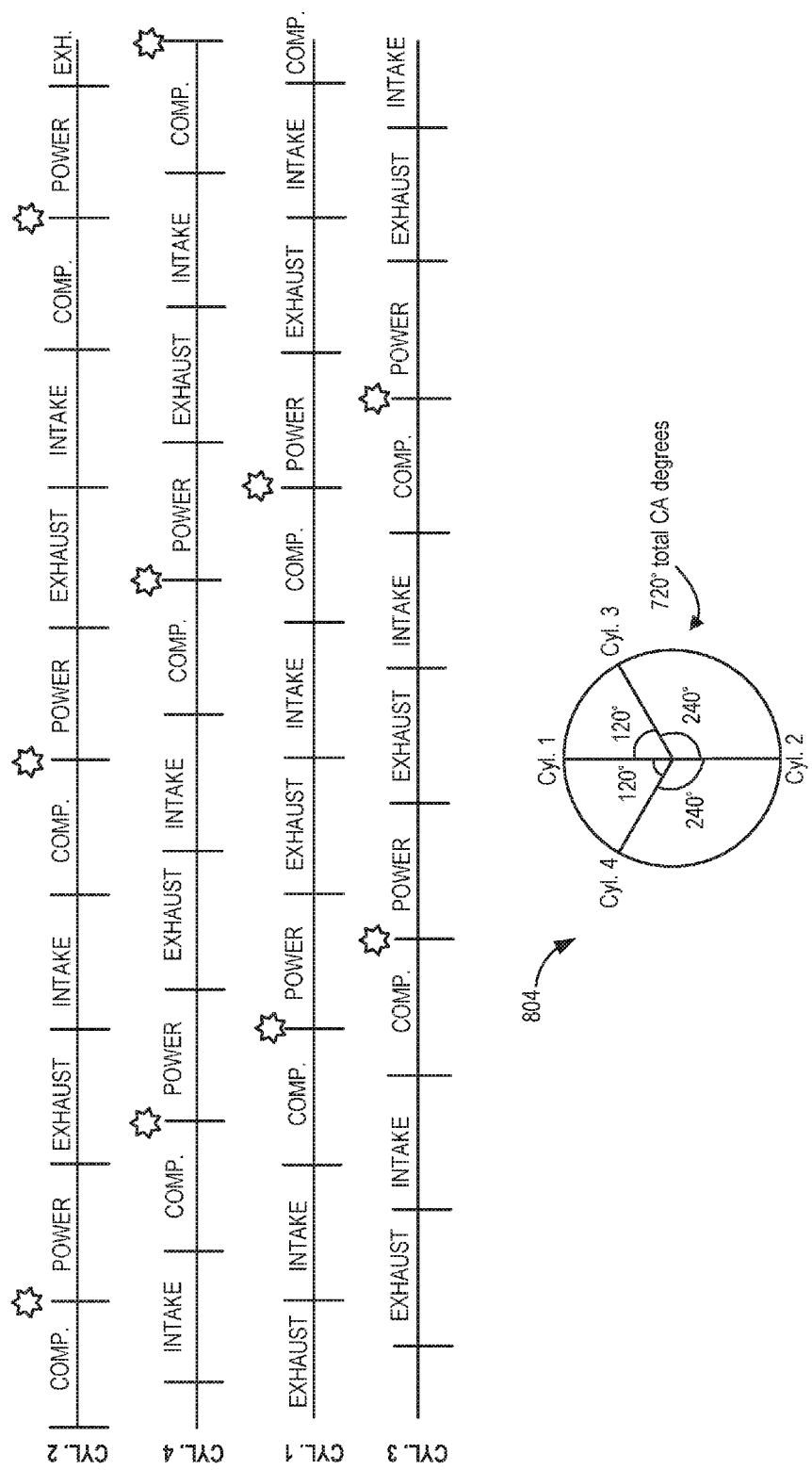

The following description relates to operating an engine system, such as the engine system of FIG. 1. The engine system may be a four-cylinder engine capable of operation in variable displacement engine (VDE) mode coupled to a twin scroll turbocharger as shown in FIG. 2. The four-cylinder engine may include a symmetric exhaust layout as shown in FIG. 2 or may have an asymmetric exhaust layout as shown in FIG. 4. Further, the engine may include a crankshaft, such as the crankshaft of FIG. 3 that enables engine operation in a three-cylinder or two-cylinder mode, each with even firing, as shown in FIGS. 6 and 8, respectively. The engine may also be operated in a four-cylinder mode with uneven firing, as shown in FIG. 7. A controller may be configured to select an engine operating mode based on engine load and may transition between these modes (FIGS. 9 and 10) based on changes in torque demand (FIG. 18), engine load and speed (FIG. 11). Crankshaft rotation in the example engine may be balanced by a single balance shaft, as shown in FIG. 5, rotating in an opposite direction to that of the crankshaft. The engine system of FIG. 2 may be modified to include an integrated exhaust manifold (IEM) with symmetric exhaust layout (FIG. 12) or asymmetric exhaust layout (FIG. 13). An additional embodiment of the engine (FIG. 14) may include an engine capable of operating primarily in a three-cylinder VDE mode with reduced excursions into a four-cylinder mode. Herein, engine operation in three-cylinder mode may comprise operation with either a shorter intake duration or a longer intake duration (FIG. 15). The controller may select the engine operation mode (FIG. 16) based on engine load and may transition between the available modes based on changes in engine load (FIG. 17).

Referring now to FIG. 1, it shows a schematic depiction of a spark ignition internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48 and exhaust passage 58. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In the example of FIG. 1, intake valve 52 and exhaust valve 54 may be controlled by cam actuation via respective cam actuation systems 51 and 53. Cam actuation systems 51 and 53 may each include one or more cams mounted on one or more camshafts (not shown in FIG. 1) and may utilize one or more of cam profile switching (CPS), variable cam timing (VCT), variable valve timing (VVT) and/or variable valve lift (VVL) systems that may be operated by controller 12 to vary valve operation. The angular position of intake and exhaust camshafts may be determined by position sensors 55 and 57, respectively. In alternate embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 99. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 91 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 94 arranged along intake passage 42. For a turbocharger, compressor 94 may be at least partially driven by an exhaust turbine 92 (e.g. via a shaft) arranged along exhaust passage 58. Compressor 94 draws air from intake passage 42 to supply boost chamber 46. Exhaust gases spin exhaust turbine 92 which is coupled to compressor 94 via shaft 96.

For a supercharger, compressor 94 may be at least partially driven by the engine and/or an electric machine, and may not include an exhaust turbine. Thus, the amount of compression provided to one or more cylinders of the engine via a turbocharger or supercharger may be varied by controller 12.

A wastegate 69 may be coupled across exhaust turbine 92 in a turbocharger. Specifically, wastegate 69 may be included in a bypass passage 67 coupled between an inlet and outlet of the exhaust turbine 92. By adjusting a position of wastegate 69, an amount of boost provided by the exhaust turbine may be controlled.

Intake manifold 44 is shown communicating with throttle 62 having a throttle plate 64. In this particular example, the position of throttle plate 64 may be varied by controller 12 via a signal provided to an electric motor or actuator (not shown in FIG. 1) included with throttle 62, a configuration that is commonly referred to as electronic throttle control (ETC). Throttle position may be varied by the electric motor via a shaft. Throttle 62 may control airflow from intake boost chamber 46 to intake manifold 44 and combustion chamber 30 (and other engine cylinders). The position of throttle plate 64 may be provided to controller 12 by throttle position signal TP from throttle position sensor 158.

Exhaust gas sensor 126 is shown coupled to exhaust manifold 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 58 downstream of exhaust gas sensor 126 and exhaust turbine 92. Device 70 may be a three way catalyst (TWC), NOx trap, various other emission control devices, or combinations thereof.

An exhaust gas recirculation (EGR) system (not shown) may be used to route a desired portion of exhaust gas from exhaust passage 58 to intake manifold 44. Alternatively, a portion of combustion gases may be retained in the combustion chambers, as internal EGR, by controlling the timing of exhaust and intake valves.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, wastegate 69, fuel injector 66, and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by vehicle operator 132; a measurement of engine manifold pressure (MAP) from pressure sensor 121 coupled to intake manifold 44; a measurement of boost pressure from pressure sensor 122 coupled to boost chamber 46; a profile ignition pickup signal (PIP) from Hall effect sensor 118 (or other type) coupled to crankshaft 40; a measurement of air mass entering the engine from mass airflow sensor 120; and a measurement of throttle position from sensor 158. Barometric pressure may also be sensed (sensor not shown) for processing by controller 12. In a preferred aspect of the present description, crankshaft sensor 118, which may be used as an engine speed sensor, may produce a predetermined number of equally spaced pulses for every revolution of the crankshaft from which engine speed (RPM) can be determined. Such pulses may be relayed to controller 12 as a profile ignition pickup signal (PIP) as mentioned above.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g. when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g. when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as spark plug 91, resulting in combustion. Additionally or alternatively compression may be used to ignite the air/fuel mixture. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, early intake valve closing, or various other examples.

Turning now to FIG. 2, it shows a schematic diagram of multi-cylinder internal combustion engine, which may be engine 10 of FIG. 1. The embodiment shown in FIG. 2 includes a variable cam timing (VCT) system 202, a cam profile switching (CPS) system 204, a turbocharger 290, and emission control device 70. It will be appreciated that engine system components introduced in FIG. 1 are numbered similarly and not reintroduced.

Engine 10 may include a plurality of combustion chambers (i.e., cylinders) 212 which may be capped on the top by cylinder head 216. In the example shown in FIG. 2, engine 10 includes four combustion chambers: 31, 33, 35, and 37. It will be appreciated that the cylinders may share a single engine block (not shown) and a crankcase (not shown).

As described earlier in reference to FIG. 1, each combustion chamber may receive intake air from intake manifold 44 via intake passage 42. Intake manifold 44 may be coupled to the combustion chambers via intake ports. Each intake port may supply air and/or fuel to the cylinder it is coupled to for combustion. Each intake port can selectively communicate with the cylinder via one or more intake valves. Cylinders 31, 33, 35, and 37 are shown in FIG. 2 with two intake valves each. For example, cylinder 31 has two intake valves I1 and I2, cylinder 33 has two intake valves I3 and I4, cylinder 35 has two intake valves I5 and I6, and cylinder 37 has two intake valves I7 and I8.

The four cylinders 31, 33, 35, and 37 are arranged in an inline-4 configuration where cylinders 31 and 37 are positioned as outer cylinders, and cylinders 33 and 35 are inner cylinders. In other words, cylinders 33 and 35 are arranged adjacent to each other and between cylinders 31 and 37 on the engine block. Herein, outer cylinders 31 and 37 may be described as flanking inner cylinders 33 and 35. While engine 10 is depicted as an inline four engine with four cylinders, it will be appreciated that other embodiments may include a different number of cylinders.

Each combustion chamber may exhaust combustion gases via one or more exhaust valves into exhaust ports coupled thereto. Cylinders 31, 33, 35, and 37 are shown in FIG. 2 with two exhaust valves each for exhausting combustion gases. For example, cylinder 31 has two exhaust valves E1 and E2, cylinder 33 has two exhaust valves E3 and E4, cylinder 35 has two exhaust valves E5 and E6, and cylinder 37 has two exhaust valves E7 and E8.

Each cylinder may be coupled to a respective exhaust port for exhausting combustion gases. In the example of FIG. 2, exhaust port 20 receives exhaust gases from cylinder 31 via exhaust valves E1 and E2. Similarly, exhaust port 22 receives exhaust gases exiting cylinder 33 via exhaust valves E3 and E4, exhaust port 24 receives exhaust gases from cylinder 35 via exhaust valves E5 and E6, and exhaust port 26 receives exhaust gases leaving cylinder 37 via exhaust valves E7 and E8. Therefrom, the exhaust gases are directed via a split manifold system to exhaust turbine 92 of turbocharger 290. It will be noted that in the example of FIG. 2, the split exhaust manifold is not integrated within the cylinder head 216.

As shown in FIG. 2, exhaust port 20 may be fluidically coupled with first plenum 23 via runner 39 while exhaust port 22 may fluidically communicate with first plenum 23 via runner 41. Further, exhaust port 24 may be fluidically coupled to second plenum 25 via runner 43 while exhaust port 26 may fluidically communicate with second plenum 25 via runner 45. Thus, cylinders 31 and 33 may exhaust their combustion gases into first plenum 23 via respective exhaust ports 20 and 22, and via runners 39 and 41 respectively. Runners 39 and 41 may combine at Y-junction 250 into first plenum 23. Cylinders 35 and 37 may expel their exhaust gases via exhaust ports 24 and 26, respectively, into second plenum 25 via respective runners 43 and 45. Runners 43 and 45 may combine at Y-junction 270 into second plenum 25. Thus, first plenum 23 may not fluidically communicate with runners 43 and 45 from cylinders 24 and 26 respectively. Further, second plenum 25 may not fluidically communicate with runners 39 and 41 from cylinders 31 and 33, respectively. Additionally, first plenum 23 and second plenum 25 may not communicate with each other. In the depicted example, first plenum 23 and second plenum 25 may not be included in the cylinder head 216 and may be external to cylinder head 216.

Each combustion chamber may receive fuel from fuel injectors (not shown) coupled directly to the cylinder, as direct injectors, and/or from injectors coupled to the intake manifold, as port injectors. Further, air charges within each cylinder may be ignited via spark from respective spark plugs (not shown). In other embodiments, the combustion chambers of engine 10 may be operated in a compression ignition mode, with or without an ignition spark.

As described earlier in reference to FIG. 1, engine 10 may include a turbocharger 290. Turbocharger 290 may include an exhaust turbine 92 and an intake compressor 94 coupled on a common shaft 96. The blades of exhaust turbine 92 may be caused to rotate about the common shaft 96 as a portion of the exhaust gas stream discharged from engine 10 impinges upon the blades of the turbine. Intake compressor 94 may be coupled to exhaust turbine 92 such that compressor 94 may be actuated when the blades of exhaust turbine 92 are caused to rotate. When actuated, compressor 94 may then direct pressurized gas through boost chamber 46, and charge air cooler 90 to air intake manifold 44 from where it may then be directed to engine 10. In this way, turbocharger 290 may be configured for providing a boosted air charge to the engine intake.

Intake passage 42 may include an air intake throttle 62 downstream of charge air cooler 90. The position of throttle 62 can be adjusted by control system 15 via a throttle actuator (not shown) communicatively coupled to controller 12. By modulating air intake throttle 62, while operating compressor 94, an amount of fresh air may be inducted from the atmosphere into engine 10, cooled by charge air cooler 90 and delivered to the engine cylinders at compressor (or boosted) pressure via intake manifold 44. To reduce compressor surge, at least a portion of the air charge compressed by compressor 94 may be recirculated to the compressor inlet. A compressor recirculation passage 49 may be provided for recirculating cooled compressed air from downstream of charge air cooler 90 to the compressor inlet. Compressor recirculation valve 27 may be provided for adjusting an amount of cooled recirculation flow recirculated to the compressor inlet.

Turbocharger 290 may be configured as a multi-scroll turbocharger wherein the exhaust turbine 92 includes a plurality of scrolls. In the depicted embodiment, exhaust turbine 92 includes two scrolls comprising a first scroll 71 and a second scroll 73. Accordingly, turbocharger 290 may be a twin scroll (or dual scroll) turbocharger with at least two separate exhaust gas entry paths flowing into, and through, exhaust turbine 92. The dual scroll turbocharger 290 may be configured to separate exhaust gas from cylinders whose exhaust gas pulses interfere with each other when supplied to exhaust turbine 92. Thus, first scroll 71 and second scroll 73 may be used to supply separate exhaust streams to exhaust turbine 92.

In the example of FIG. 2, first scroll 71 is shown receiving exhaust from cylinders 31 and 33 via first plenum 23. Second scroll 73 is depicted fluidly communicating with second plenum 25 and receiving exhaust from cylinders 35 and 37. Therefore, exhaust may be directed from a first outer cylinder (cylinder 31) and a first inner cylinder (cylinder 33) to a first scroll 71 of twin scroll turbocharger 290. Further, exhaust may be directed from a second outer cylinder (cylinder 37) and a second inner cylinder (cylinder 35) to a second scroll 73 of twin scroll turbocharger 290. The first scroll 71 may not receive exhaust from second plenum 25 and second scroll 73 may not receive exhaust pulses from first plenum 23.

Exhaust turbine 92 may include at least one wastegate to control an amount of boost provided by said exhaust turbine. As shown in FIG. 2, a common wastegate 69 may be included in bypass passage 67 coupled between an inlet and outlet of the exhaust turbine 92 to control an amount of exhaust gas bypassing exhaust turbine 92. Thus, a portion of exhaust gases flowing towards first scroll 71 from first plenum 23 may be diverted via passage 65 past wastegate 69 into bypass passage 67. Further, a different portion of exhaust gases flowing into second scroll 73 from second plenum 25 may be diverted via passage 63 through wastegate 69. Exhaust gases exiting turbine exhaust 92 and/or wastegate 69 may pass through emission control device 70 and may exit the vehicle via a tailpipe (not shown). In alternative dual scroll systems, each scroll may include a corresponding wastegate to control the amount of exhaust gas which passes through exhaust turbine 92.

Returning now to cylinders 31, 33, 35, and 37, as described earlier, each cylinder comprises two intake valves and two exhaust valves. Herein, each intake valve is actuatable between an open position allowing intake air into a respective cylinder and a closed position substantially blocking intake air from the respective cylinder. FIG. 2 illustrates intake valves I1-I8 being actuated by a common intake camshaft 218. Intake camshaft 218 includes a plurality of intake cams configured to control the opening and closing of the intake valves. Each intake valve may be controlled by one or more intake cams, which will be described further below. In some embodiments, one or more additional intake cams may be included to control the intake valves. Further still, intake actuator systems may enable the control of intake valves.

Each exhaust valve is actuatable between an open position allowing exhaust gas out of a respective cylinder and a closed position substantially retaining gas within the respective cylinder. FIG. 2 shows exhaust valves E1-E8 being actuated by a common exhaust camshaft 224. Exhaust camshaft 224 includes a plurality of exhaust cams configured to control the opening and closing of the exhaust valves. Each exhaust valve may be controlled by one or more exhaust cams, which will be described further below. In some embodiments, one or more additional exhaust cams may be included to control the exhaust valves. Further, exhaust actuator systems may enable the control of exhaust valves.

Intake valve actuator systems and exhaust valve actuator systems may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 212 may each have only one exhaust valve and/or intake valve, or more than two intake and/or exhaust valves. In still other examples, exhaust valves and intake valves may be actuated by a common camshaft. However, in alternate embodiments, at least one of the intake valves and/or exhaust valves may be actuated by its own independent camshaft or other device.

Engine 10 may be a variable displacement engine (VDE) and a subset of the four cylinders 212 may be deactivated, if desired, via one or more mechanisms. Therefore, controller 12 may be configured to deactivate intake and exhaust valves for selected cylinders when engine 10 is operating in VDE mode. Intake and exhaust valves of selected cylinders may be deactivated in the VDE mode via switching tappets, switching rocker arms, or switching roller finger followers.

In the present example, cylinders 31, 35, and 37 are capable of deactivation. Each of these cylinders features a first intake cam and a second intake cam per intake valve arranged on common intake camshaft 218, and a first exhaust cam and a second exhaust cam per exhaust valve positioned on common exhaust camshaft 224.

First intake cams have a first cam lobe profile for opening the intake valves for a first intake duration. In the example of FIG. 2, first intake cams C1 and C2 of cylinder 31, first intake cams C5, C6 of cylinder 33, first intake cams C9, C10 of cylinder 35, and first intake cams C13, C14 of cylinder 37 may have a similar first cam lobe profile which opens respective intake valves for a similar duration and lift. In other examples, first intake cams for different cylinders may have different lobe profiles. Second intake cams are depicted as null cam lobes which may have a profile to maintain their respective intake valves in closed position. Thus, null cam lobes assist in deactivating corresponding valves in the VDE mode. In the example of FIG. 2, second intake cams N1, N2 of cylinder 31, second intake cams N5, N6 of cylinder 35, and second intake cams N9, N10 of cylinder 37 are null cam lobes. These null cam lobes can deactivate corresponding intake valves in cylinders 31, 35, and 37.

Further, each of the intake valves may be actuated by a respective actuator system operatively coupled to controller 12. As shown in FIG. 2, intake valves I1 and I2 of cylinder 31 may be actuated via actuator system A2, intake valves I3 and I4 of cylinder 33 may be actuated via actuator system A4, intake valves I5 and I6 of cylinder 35 may be actuated via actuator system A6, and intake valves I7 and I8 of cylinder 37 may be actuated via actuator system A8.

Similar to the intake valves, each of the deactivatable cylinders (31, 35, and 37) features a first exhaust cam and a second exhaust cam arranged on common exhaust camshaft 224. First exhaust cams may have a first cam lobe profile providing a first exhaust duration and lift. In the example of FIG. 2, first exhaust cams C3 and C4 of cylinder 31, first exhaust cams C7, C8 of cylinder 33, first exhaust cams C11, C12 of cylinder 35, and first exhaust cams C15, C16 of cylinder 37 may have a similar first cam lobe profile which opens respective exhaust valves for a given duration and lift. In other examples, first exhaust cams for different cylinders may have different lobe profiles. Second exhaust cams are depicted as null cam lobes which may have a profile to maintain their respective exhaust valves in the closed position. Thus, null cam lobes assist in deactivating exhaust valves in the VDE mode. In the example of FIG. 2, second exhaust cams N3, N4 of cylinder 31, second exhaust cams N7, N8 of cylinder 35, and second exhaust cams N11, N12 of cylinder 37 are null cam lobes. These null cam lobes can deactivate corresponding exhaust valves in cylinders 31, 35, and 37.

Further, each of the exhaust valves may be actuated by a respective actuator system operatively coupled to controller 12. Therefore, exhaust valves E1 and E2 of cylinder 31 may be actuated via actuator system A1, exhaust valves E3 and E4 of cylinder 33 may be actuated via actuator system A3, exhaust valves E5 and E6 of cylinder 35 may be actuated via actuator system A5, and exhaust valves E7 and E8 of cylinder 37 may be actuated via actuator system A7.

Cylinder 33 (or first inner cylinder) may not be capable of deactivation and may not include null cam lobes for its intake and exhaust valves. Consequently, intake valves I3 and I4 of cylinder 33 may not be deactivatable and are only operated by first intake cams C5 and C6 respectively. Thus, intake valves I3 and I4 of cylinder 33 may not be operated by null cam lobes. Likewise, exhaust valves E3 and E4 may not be deactivatable and are only operated by first exhaust cams C7 and C8. Further, exhaust valves E3 and E4 may not be operated by null cam lobes. Therefore, each intake valve and each exhaust valve of cylinder 33 may be actuated by a single respective cam.

It will be appreciated that other embodiments may include different mechanisms known in the art for deactivating intake and exhaust valves in cylinders. Such embodiments may not utilize null cam lobes for deactivation. For example, hydraulic roller finger follower systems may not use null cam lobes for cylinder deactivation.

Further, other embodiments may include reduced actuator systems. For example, a single actuator system may actuate intake valves I1 and I2 as well as exhaust valves E1 and E2. This single actuator system would replace actuator systems A1 and A2 providing one actuator system for cylinder 31. Other combinations of actuator systems are also possible.

CPS system 204 may be configured to translate specific portions of intake camshaft 218 longitudinally, thereby causing operation of intake valves I1-I8 to vary between respective first intake cams and second intake cams (where applicable). Further, CPS system 204 may be configured to translate specific portions of exhaust camshaft 224 longitudinally, thereby causing operation of exhaust valves E1-E8 to vary between respective first exhaust cams and second exhaust cams. In this way, CPS system 204 may switch between a first cam for opening a valve for a first duration, and a second cam, for opening the valve for a second duration. In the given example, CPS system 204 may switch cams for intake valves in cylinders 31, 35, and 37 between a first cam for opening the intake valves for a first duration, and a second null cam for maintaining intake valves closed. Further, CPS system 204 may switch cams for exhaust valves in cylinders 31, 35, and 37 between a first cam for opening the exhaust valves for a first duration, and a second null cam for maintaining exhaust valves closed. In the example of cylinder 33, CPS system 204 may not switch cams for the intake and exhaust valves as cylinder 33 is configured with one cam per valve, and may not be deactivated.

CPS system 204 may receive signals from controller 12 to switch between different cam profiles for different cylinders in engine 10 based on engine operating conditions. For example, during low engine loads, engine operation may be in a two-cylinder mode. Herein, cylinders 35 and 37 may be deactivated via the CPS system 204 actuating a switching of cams from first intake and first exhaust cams to second, null intake and second, null exhaust cams for each valve. Simultaneously, cylinders 31 and 33 may be maintained operative with their intake and exhaust valves being actuated by their respective first cams.

In another example, at a medium engine load, engine 10 may be operated in a three-cylinder mode. Herein, CPS system 204 may be configured to actuate the intake and exhaust valves of cylinders 33, 35, and 37 with their respective first intake cams. Concurrently, cylinder 31 may be deactivated by CPS system 204 via actuating the intake and exhaust valves of cylinder 31 with respective second, null cams.

Engine 10 may further include VCT system 202. VCT system 202 may be a twin independent variable camshaft timing system, for changing intake valve timing and exhaust valve timing independently of each other. VCT system 202 includes intake camshaft phaser 230 and exhaust camshaft phaser 232 for changing valve timing. VCT system 202 may be configured to advance or retard valve timing by advancing or retarding cam timing (an example engine operating parameter) and may be controlled via controller 12. VCT system 202 may be configured to vary the timing of valve opening and closing events by varying the relationship between the crankshaft position and the camshaft position. For example, VCT system 202 may be configured to rotate intake camshaft 218 and/or exhaust camshaft 224 independently of the crankshaft to cause the valve timing to be advanced or retarded. In some embodiments, VCT system 202 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof.

Engine 10 may be controlled at least partially by a control system 15 including controller 12 and by input from a vehicle operator via an input device (FIG. 1). Control system 15 is shown receiving information from a plurality of sensors 16 (various examples of which were described in reference to FIG. 1) and sending control signals to a plurality of actuators 81. As one example, control system 15, and controller 12, can send control signals to and receive a cam timing and/or cam selection measurement from CPS system 204 and VCT system 202. As another example, actuators 81 may include fuel injectors, wastegate 69, compressor recirculation valve 27, and throttle 62. Controller 12 may receive input data from the various sensors, process the input data, and trigger the actuators in response to the processed input data based on instruction or code programmed therein corresponding to one or more routines. Additional system sensors and actuators will be elaborated below with reference to FIG. 5.

FIG. 4 depicts an alternate example embodiment of engine 10 with an asymmetric exhaust layout, unlike the symmetric exhaust layout of FIG. 2. Specifically, the asymmetric layout comprises directing exhaust from cylinder 31 (or the first outer cylinder) to first scroll 71 of exhaust turbine 92 and directing exhaust from cylinders 33, 35, and 37 (or the first inner cylinder, the second inner cylinder, and the second outer cylinder) to second scroll 73 of exhaust turbine 92. In comparison, the embodiment of FIG. 2 depicts a symmetric exhaust layout wherein first scroll 71 and second scroll 73 of exhaust turbine 92 each receive exhaust from two cylinders. The symmetric exhaust layout may provide improved turbine efficiency relative to the asymmetric exhaust layout.

In the example of FIG. 4, first scroll 71 of exhaust turbine 92 may receive exhaust only from cylinder 31 via exhaust port 20 and runner 39 while second scroll 73 of exhaust turbine 92 may receive exhaust from cylinders 33, 35, and 37 via respective ports 22, 24, and 26, and respective runners 41, 43, and 45. Further, runners 41, 43, and 45 may converge into plenum 425 before delivering exhaust to exhaust turbine 92. As depicted in FIG. 4, runners 43 and 45 may join plenum 425 at Y-junction 470. Further, runner 41 may join plenum 425 at Y-junction 450. Plenum 425 may direct combusted gases to a first pipe 461 which delivers exhaust to second scroll 73 of exhaust turbine 92. During conditions when lower boost is demanded, wastegate 69 may be opened to receive a portion of exhaust gases from plenum 425 via passage 63. Likewise, a portion of exhaust may be diverted from runner 39 (and first scroll 71) through passage 65 and past wastegate 69.

In the example of the asymmetric layout, second scroll 73 may be larger in size than first scroll 71. For example, second scroll 73 may be designed to receive a higher quantity of exhaust gases that may be received from three cylinders (33, 35, and 37).

Further details of the symmetric and asymmetric exhaust layouts of FIGS. 2 and 4 will be elaborated in reference to FIGS. 6, 7, and 8. It will be appreciated that the exhaust layouts provided may allow a more compact arrangement within the engine between the turbocharger and the cylinder head.

As mentioned earlier, engine 10 of FIGS. 1 and 2 may be operated in VDE mode or non-VDE (all cylinders firing) mode. In order to provide fuel economy benefits along with reduced noise, vibration and harshness (NVH), example engine 10 may be primarily operated in either an even firing three-cylinder or an even firing two-cylinder VDE mode. A first version of a four-cylinder crankshaft wherein engine firing (or cylinder strokes) occurs at 180 crank angle (CA) degree intervals may introduce NVH due to uneven firing when operating in a three-cylinder mode. For example, in a four-cylinder engine with the first version of the crankshaft enabling a firing order of 1-3-4-2 may fire at the following uneven intervals: 180°-180°-360° when operated in three-cylinder mode (1-3-4).

In order for engine 10 to operate in the three-cylinder mode with reduced NVH, a crankshaft that allows even firing during three-cylinder mode operation may be desired. For example, a crankshaft may be designed to fire three cylinders at 240° intervals while a fourth cylinder is deactivated. By providing a crankshaft that allows even firing in the three-cylinder mode, engine 10 may be operated for longer periods in the three-cylinder mode which can enhance fuel economy and ease NVH.

Figure 3:
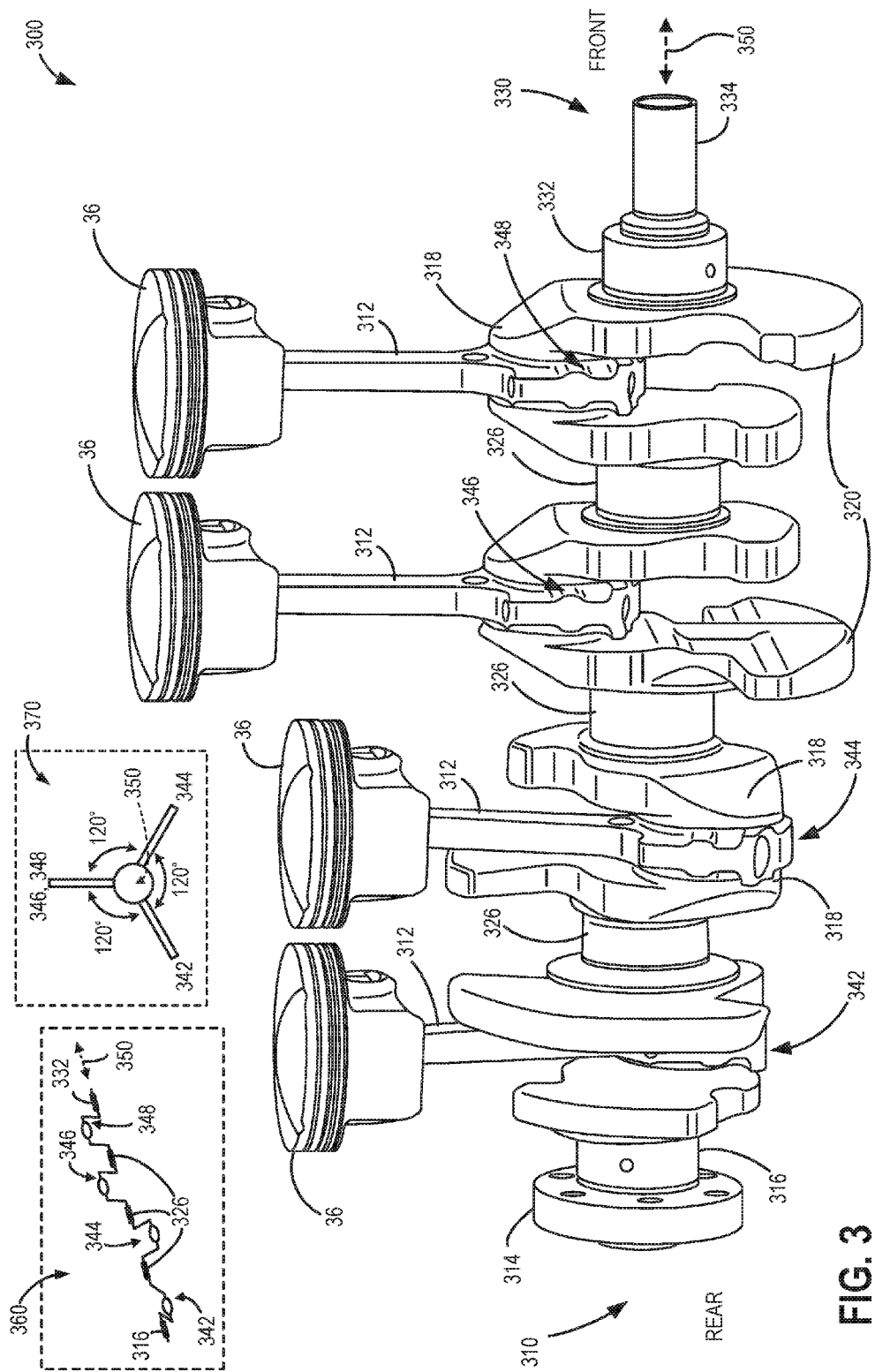
FIG. 3 is an illustration of a crankshaft in accordance with the present disclosure.

Accordingly, an example crankshaft 300 that may be utilized for operating engine 10 in a two-cylinder or three-cylinder mode with even firing is shown in FIG. 3. FIG. 3 illustrates a perspective view of crankshaft 300. Crankshaft 300 may be crankshaft 40 shown in FIG. 1. The crankshaft depicted in FIG. 3 may be utilized in an engine, such as engine 10 of FIGS. 2 and 4, having an inline configuration in which the cylinders are aligned in a single row. A plurality of pistons 36 may be coupled to crankshaft 300, as shown. Further, since engine 10 is an inline four-cylinder engine, FIG. 3 depicts four pistons arranged in a single row along a length of the crankshaft 300.

Crankshaft 300 has a crank nose end 330 (also termed front end) with crank nose 334 for mounting pulleys and/or for installing a harmonic balancer (not shown) to reduce torsional vibration. Crankshaft 300 further includes a flange end 310 (also termed rear end) with a flange 314 configured to attach to a flywheel (not shown). In this way, energy generated via combustion may be transferred from the pistons to the crankshaft and flywheel, and thereon to a transmission thereby providing motive power to a vehicle.

Crankshaft 300 may also comprise a plurality of pins, journals, webs (also termed, cheeks), and counterweights. In the depicted example, crankshaft 300 includes a front main bearing journal 332 and a rear main bearing journal 316. Apart from these main bearing journals at the two ends, crankshaft 300 further includes three main bearing journals 326 positioned between front main bearing journal 332 and rear main bearing journal 316. Thus, crankshaft 300 has five main bearing journals wherein each journal is aligned with a central axis of rotation 350. The main bearing journals 316, 332, and 326 support bearings that are configured to enable rotation of crankshaft 300 while providing support to the crankshaft. In alternate embodiments, the crankshaft may have more or less than five main bearing journals.

Crankshaft 300 also includes a first crank pin 348, a second crank pin 346, a third crank pin 344, and a fourth crank pin 342 (arranged from crank nose end 330 to flange end 310). Thus, crankshaft 300 has a total of four crank pins. However, crankshafts having an alternate number of crank pins have been contemplated. Crank pins 342, 344, 346, and 348 may each be mechanically and pivotally coupled to respective piston connecting rods 312, and thereby, respective pistons 36. It will be appreciated that during engine operation, crankshaft 300 rotates around the central axis of rotation 350. Crank webs 318 may support crank pins 342, 344, 346, and 348. Crank webs 318 may further couple each of the crank pins to the main bearing journals 316, 332, and 326. Further, crank webs 318 may be mechanically coupled to counterweights 320 to dampen oscillations in the crankshaft 300. It may be noted that all crank webs in crankshaft 300 may not be labeled in FIG. 3.

The second crank pin 346 and the first crank pin 348 are shown at similar positions relative to central axis of rotation 350. To elaborate, pistons coupled to first crank pin 348 and second crank pin 346 respectively may be at similar positions in their respective strokes. First crank pin 348 may also be aligned with second crank pin 346 relative to central axis of rotation 350. Further, the second crank pin 346, the third crank pin 344 and the fourth crank pin 342 may be arranged 120 degrees apart from each other around the central axis of rotation 350. For example, as depicted in FIG. 3 for crankshaft 300, third crank pin 344 is shown swaying towards the viewer, fourth crank pin 342 is moving away from the viewer (into the paper) while second crank pin 346 and first crank pin 348 are aligned with each other and are in the plane of the paper.

Inset 360 shows a schematic drawing of crankshaft 300 depicting the positions of the four crank pins relative to each other and relative to central axis of rotation 350. Inset 370 shows a schematic diagram of a side view of crankshaft 300 as viewed from the rear end (or flange end 310) of the crankshaft looking toward the front end (or crank nose end 330) along the central axis of rotation 350. Inset 370 indicates the relative positions of the crank pins in relation to the center axis of crankshaft 300 and central axis of rotation 350.

As shown in inset 360, the fourth crank pin 342, and the third crank pin 344 are depicted swaying in substantially opposite directions to each other. To elaborate, when viewed from the end of rear main bearing journal 316 towards front main bearing journal 332, third crank pin 344 is angled towards the right while fourth crank pin 342 is angled towards the left, relative to the central axis of rotation 350. This angular placement of third crank pin 344 relative to fourth crank pin 342 is also depicted in inset 370.

Further, it will be observed that third crank pin 344 and fourth crank pin 342 may not be arranged directly opposite from each other. These crank pins may be positioned 120 degrees apart in the clockwise direction as measured specifically from third crank pin 344 towards fourth crank pin 342 and as viewed from the flange (rear) end 310 with rear main bearing journal 316 towards crank nose end 330 with front main bearing journal 332. The fourth crank pin 342 and the third crank pin 344 are, therefore, angled relative to one another around the central axis of rotation 350. Similarly, the third crank pin 344 and the second crank pin 346 are angled relative to one another around the central axis of rotation 350. Further, first crank pin 348 and second crank pin 346 are shown aligned and parallel with each other around the central axis of rotation 350. Additionally, first crank pin 348 and second crank pin 346 are positioned adjacent to each other. As shown in inset 370, the second crank pin 346, the third crank pin 344 and the fourth crank pin 342 are positioned 120 degrees apart from each other around the center axis of crankshaft 300. Further, first crank pin 348 and second crank pin 346 are positioned vertically above the central axis of rotation 350 (e.g., at zero degrees) while third crank pin 344 is positioned 120 degrees clockwise from first crank pin 348 and second crank pin 346. Fourth crank pin 342 is positioned 120 degrees counterclockwise from first crank pin 348 and second crank pin 346.

It will be appreciated that even though first crank pin 348 is depicted aligned with second crank pin 346, and each of the two pistons coupled to first crank pin 348 and second crank pin 346 is depicted in FIG. 3 at a TDC position, the two respective pistons may be at the end of different strokes. For example, the piston coupled to first crank pin 348 may be at the end of a compression stroke while the piston associated with second crank pin 346 may be at the end of the exhaust stroke. Thus, the piston coupled to first crank pin 348 may be 360 crank angle degrees (CAD) apart from the piston coupled to second crank pin 346 when considered with respect to a 720 CAD engine firing cycle.

The crank pin arrangement of FIG. 3 supports an engine firing order of 3-2-4 in the three-cylinder mode. Herein, the firing order 3-2-4 comprises firing a third cylinder with a piston coupled to third crank pin 344 followed by firing a second cylinder with a piston coupled to second crank pin 346, and then firing a fourth cylinder with a piston coupled to fourth crank pin 342. Herein, each combustion event is separated by an interval of 240° of crank angle.

The crank pin arrangement may also mechanically constrain a firing order of 1-3-2-4 when all cylinders are activated in a non-VDE mode. Herein, the firing order 1-3-2-4 may comprise firing a first cylinder with a piston coupled to the first crank pin 348 followed by firing the third cylinder with its piston coupled to the third crank pin 344 next. The second cylinder with piston coupled to the second crank pin 346 may be fired after the third cylinder followed by firing the fourth cylinder with piston coupled to the fourth crank pin 342. In the example of engine 10 with crankshaft 300, firing events in the four cylinders with firing order 1-3-2-4 may occur at the following uneven intervals: 120°-240°-240°-120°. Since first crank pin 348 is aligned with second crank pin 346, and their piston strokes occur 360 crank angle degrees apart, firing events in the first cylinder and the second cylinder also occur at 360° intervals from each other. Engine firing events will be further described in reference to FIGS. 6, 7, and 8.

Turning now to FIG. 5, it portrays a schematic illustration of engine 10 including the cylinders, camshafts and crankshaft described in FIGS. 1-4. As such, components of engine system introduced in FIGS. 1-4 are numbered similarly in FIG. 5. It will be appreciated that engine 10 is depicted in a reverse view relative to the view depicted in FIGS. 2 and 4. In other words, cylinder 31 in FIGS. 2 and 4 is shown at extreme left while cylinder 31 in FIG. 5 is shown at extreme right. Likewise, cylinders 33, 35, and 37 are reversed.

Crankshaft 300 in engine 10 of FIG. 5 is driven by reciprocating motion of pistons 36 coupled to crankshaft 300 via connecting rods 312. The rotational motion of crankshaft 300 drives intake camshaft 218 and a single balance shaft 574. Intake camshaft 218 may be coupled to crankshaft 300 via a linkage 564 (e.g., timing chain, belt, etc.) while balance shaft 574 may be coupled to crankshaft 300 via a linkage and gear system 578. A position of intake camshaft 218 may be sensed by intake camshaft position sensor 572. A similar sensor may sense the position of exhaust camshaft 224 (not shown).

Single balance shaft 574 may be a weighted shaft to offset vibrations during engine operation. In one example, balance shaft 574 may have a rocking couple for balancing cylinders 33, 35, and 37 with a single weight added for balancing cylinder 31. In addition, single balance shaft 574 may rotate in a direction counter to the rotational direction of crankshaft 300. Further, single balance shaft 574 may rotate at the same speed as crankshaft 300. A single balance shaft may be sufficient to offset vibrations arising from engine 10 since engine 10 may largely operate in a three-cylinder or two-cylinder even firing mode. Further, the engine may experience fewer transitions between VDE modes and non-VDE modes. By using a single balance shaft, instead of twin balance shafts spinning at twice the engine speed, lower frictional losses may be achieved enabling a reduction in fuel consumption.

Engine 10 of FIG. 5 is depicted with four cylinders (as in FIGS. 2 and 4) 31, 33, 35, and 37 arranged in a single row. As described earlier, the four cylinders have two intake valves and two exhaust valves. Intake camshaft 218 includes two cams for each intake valve of cylinders 31, 35, and 37: a first cam to open a respective intake valve for a given duration and lift, and a second, null cam to enable deactivation of the intake valves in these cylinders. As mentioned in reference to FIG. 2, cylinder 33 is not capable of deactivation and includes one intake cam per intake valve. Exhaust camshaft 224 is not shown in FIG. 5.

FIG. 5 depicts the four crank pins of crankshaft 300 coupled to their respective pistons. As shown in the depicted example, first crank pin 348 is coupled to a piston in cylinder 31 (or first cylinder), second crank pin 346 is coupled a piston in cylinder 33 (or second cylinder), third crank pin 344 is coupled to a piston in cylinder 35 (or third cylinder), and fourth crank pin 342 is coupled to a piston in cylinder 37 (or fourth cylinder). As elaborated earlier in reference to FIG. 3, first crank pin 348 is shown aligned with second crank pin 346, but the associated pistons may be 360 crank angle degrees apart in respect to their engine strokes. Correspondingly, cylinder 31 and cylinder 33 may be 360 crank angle degrees apart in respect to the strokes occurring within these cylinders. As noted earlier, cylinder 31 may be at the end of its compression stroke when cylinder 33 may be at the end of its exhaust stroke. Thus, in the embodiment described herein, cylinders 31 and 33 may experience engine strokes that are 360 crank angle (CA) degrees apart. Additionally, as described earlier, second crank pin 346, third crank pin 344, and fourth crank pin 342 may be positioned approximately 120 degrees apart along the crankshaft. Further, cylinders 33, 35, and 37 may experience engine strokes that are 240 CA degrees apart.

Operation of engine 10, particularly, the firing order, will be described now in reference to FIGS. 6-8 which depict ignition timing diagrams for the four cylinders of engine 10. FIG. 6 illustrates engine firing in a two-cylinder VDE mode for engine 10, FIG. 7 depicts engine firing in a three-cylinder VDE mode for engine 10, and FIG. 8 represents engine firing in a non-VDE mode for engine 10 wherein all four cylinders are activated. It will be appreciated that cylinders 1, 2, 3, and 4 in FIGS. 6-8 correspond to cylinders 31, 33, 35, and 37 respectively, of FIGS. 2, 4, and 5. For each diagram, cylinder number is shown on the y-axis and engine strokes are depicted on the x-axis. Further, ignition, and the corresponding combustion event, within each cylinder is represented by a star symbol between compression and power strokes within the cylinder. Further, additional diagrams 604, 704, and 804, portray cylinder firing events in each active cylinder in each mode around a circle representing 720 degrees of crank rotation.

Referring to FIG. 6, an example engine firing diagram in two-cylinder VDE mode for engine 10 is illustrated. Herein, cylinders 3 and 4 are deactivated by actuating the intake and exhaust valves of these cylinders via their respective null cams. Cylinders 1 and 2 may be fired 360 CA degrees apart in a firing order of 1-2-1-2. As shown in FIG. 6, cylinder 1 may commence a compression stroke at the same time that cylinder 2 begins an exhaust stroke. As such, each engine stroke in cylinders 1 and 2 is spaced 360 CA degrees apart. For example, an exhaust stroke in cylinder 2 may occur 360 CA degrees after an exhaust stroke in cylinder 1. Similarly, ignition events in the engine are spaced 360 CA degrees apart and accordingly, power strokes in the two active cylinders occur 360 CA degrees apart from each other. The two-cylinder VDE mode may be utilized during low engine load conditions when torque demand is lower. By operating in the two-cylinder mode, fuel economy benefits may also be attained.

Turning now to FIG. 7, it portrays an example cylinder firing diagram for the cylinder firing order in an example three-cylinder VDE mode for engine 10 wherein three cylinders are activated. In this example, cylinder 1 may be deactivated while cylinders 2, 3, and 4 are activated. Ignition and combustion events within the engine and between the three activated cylinders may occur at 240 CA degree intervals similar to a three-cylinder engine. Herein, firing events may occur at evenly spaced intervals. Likewise, each engine stroke within the three cylinders may occur at 240 CA degree intervals. For example, an exhaust stroke in cylinder 2 may be followed by an exhaust stroke in cylinder 4 at about 240 CA degrees after the exhaust stroke in cylinder 2. Similarly, the exhaust stroke in cylinder 4 may followed by an exhaust stroke in cylinder 3 after an interval of 240 CA degrees. Firing events in the engine may occur similarly. An example firing order for the three-cylinder VDE mode may be 2-4-3-2-4-3. As illustrated at 704, cylinder 3 may be fired approximately 240 CA degrees after cylinder 4 is fired, cylinder 2 may be fired approximately 240 CA degrees after the firing event in cylinder 3, and cylinder 4 may be fired approximately 240 CA degrees after the firing event in cylinder 2. Thus, a method of operating an engine may comprise, during a first VDE mode in an engine having four cylinders, deactivating a first cylinder of the four cylinders and firing a second, third, and fourth cylinder of the four cylinders, each firing event separated by 240 degrees of crank angle (CA).

It will be appreciated that the even firing intervals of 240 CA degrees in the three-cylinder VDE mode may be approximate. In one example, the firing interval between cylinder 3 and cylinder 2 may be 230 CA degrees. In another example, the firing interval between cylinder 3 and cylinder 2 may be 255 CA degrees. In yet another example, the firing interval between cylinder 3 and cylinder 2 may be exactly 240 CA degrees. Likewise, the firing interval between cylinder 2 and cylinder 4 may vary in a range between 230 CA degrees and 255 CA degrees. The same variation may apply to firing intervals between cylinder 4 and cylinder 3. Other variations may also be possible.

Referring to FIG. 2 (or FIG. 4), it may be appreciated that the firing order of 2-4-3 may enable improved balance and reduced NVH. For example, cylinder 2 represents cylinder 33 of FIGS. 2 and 4 and is positioned as a first inner cylinder, cylinder 4 represents cylinder 37 of FIGS. 2 and 4 and is positioned as a second outer cylinder, and cylinder 3 represents cylinder 35 of FIGS. 2 and 4 and is positioned as a second inner cylinder. Based on the positions of activated cylinders within the engine block, the firing order of 2-4-3 may provide better balance and may reduce noise and vibrations.

Further, the three-cylinder VDE mode may be selected for engine operation during engine idling conditions. Noise and vibration may be more prominent during engine idle conditions and the even firing three-cylinder mode with stable firing may be a more suitable option for engine operation during these conditions.

Turning now to FIG. 8, it portrays an example cylinder firing diagram for the cylinder firing order in an example non-VDE mode for engine 10 wherein all four cylinders are activated. In the non-VDE mode, engine 10 may be fired unevenly based on the design of crankshaft 300. In one example, crankshaft 300 shown in FIG. 3 may produce the cylinder firing order shown in FIG. 8. As shown in the depicted example, cylinder 1 may be fired between cylinders 3 and 4. In one example, cylinder 1 may be fired approximately 120 crank angle (CA) degrees after cylinder 4 is fired. In one example, cylinder 1 may be fired exactly 120 CA degrees after cylinder 4 is fired. In another example, cylinder 1 may be fired 115 CA degrees after cylinder 4 fires. In yet another example, cylinder 1 may be fired 125 CA degrees after firing cylinder 4. Further, cylinder 1 may be fired approximately 120 CA degrees before cylinder 3 is fired. For example, cylinder 1 may be fired in a range of between 115 and 125 CA degrees before cylinder 3 is fired. In addition, cylinders 2, 3, and 4 may continue to have combustion events 240 CA degrees apart with a combustion event in cylinder 1 occurring approximately midway between the combustion events in cylinder 4 and cylinder 3. Therefore, engine 10 may be fired with the following firing order: 1-3-2-4 (or 2-4-1-3 or 3-2-4-1 or 4-1-3-2 since the firing is cyclic) at uneven intervals wherein cylinder 1 is the uneven firing cylinder. As illustrated at 804, cylinder 3 may be fired approximately 120 degrees of crank rotation after cylinder 1 is fired, cylinder 2 may be fired approximately 240 degrees of crank rotation after firing cylinder 3, cylinder 4 may be fired at approximately 240 degrees of crank rotation after firing cylinder 2, and cylinder 1 may be fired again at approximately 120 degrees of crank rotation after firing cylinder 4. In other examples, the intervals between the firing events in the four cylinders may vary from the intervals mentioned above.

Accordingly, during the non-VDE mode in the example four-cylinder engine 10, a method of engine operation may comprise firing three cylinders with a middle cylinder firing a first number of crankshaft degrees between an earlier cylinder and a later cylinder, and firing a fourth cylinder between the later cylinder and the earlier cylinder at double the first number of crankshaft degrees therebetween. To elaborate in reference to FIG. 8, the method includes firing three cylinders, such as cylinders 4, 1, and 3, wherein the middle cylinder may be cylinder 1 firing a first number of crankshaft degrees, e.g., 120°, between the earlier cylinder, cylinder 4, and the later cylinder, cylinder 3. The fourth cylinder in this example, cylinder 2 may be fired at double the first number of crankshaft degrees, e.g., 240°, between the later cylinder, cylinder 3, and the earlier cylinder, cylinder 4. Engine 10 may have a firing sequence of: 1-3-2-4-1-3-2-4 such that the firing order may be the earlier cylinder, middle cylinder and later cylinder (e.g. cylinders 4, 1, and 3 respectively) while the fourth cylinder, cylinder 2, is fired away from the three cylinders and not between the three cylinders 4, 1, and 3. For example, the fourth cylinder may fire after the later cylinder. Further, the four cylinders may be mechanically constrained to fire in the order identified above. In another example, no other cylinders may fire at any other timings in between.

Additionally, during a given condition, which may be medium engine load, the middle cylinder (cylinder 1) may be deactivated and the earlier cylinder, the later cylinder and the fourth cylinder may be fired at evenly spaced intervals of about 240 crankshaft degrees. The firing order herein may be as follows: the earlier cylinder, the later cylinder, and the fourth cylinder.

In other words, a four-cylinder engine may include a crankshaft configured to fire three of the four cylinders at 240 crank angle degree intervals and fire the remaining cylinder of the four cylinders midway between two of the three cylinders being fired 240 crank angle degrees apart. An example firing sequence may include firing a first cylinder, firing a second cylinder at about 120 crank angle degrees after firing the first cylinder, firing a third cylinder at about 240 crank angle degrees after firing the second cylinder, and firing a fourth cylinder at about 240 crank angle degrees after firing the third cylinder, and firing the first cylinder at about 120 crank angle degrees after firing the fourth cylinder. Thus, the first cylinder may be fired at about 120 crank angle degrees between the fourth cylinder and the second cylinder and the third cylinder may be fired at 240 crank angle degrees (or double of 120 crank angle degrees) between the fourth and second cylinders. The engine may also be operated in a three-cylinder mode wherein the first cylinder is deactivated, and the second, third and fourth cylinders are fired at about 240 crank angle degree intervals from each other. Additionally, the engine may be operated in a two-cylinder mode by deactivating two cylinders and firing the remaining two cylinders 360 crank angle degrees apart from each other.

Referring back to FIGS. 2 and 4, the symmetric and asymmetric exhaust layouts will now be described further. As elaborated earlier, the symmetric exhaust layout of FIG. 2 depicts first scroll 71 of exhaust turbine 92 receiving exhaust from cylinders 31 and 33, while second scroll 73 of exhaust turbine 92 receives exhaust from cylinders 35 and 37. An alternate embodiment may feature an asymmetric exhaust layout, such as that shown in FIG. 4, wherein cylinder 31 exhausts directly to first scroll 71 while cylinders 33, 35, and 37 expel their combustion gases to second scroll 73. By exhausting directly, cylinder 31 may only exhaust its combustion products to first scroll 71 and not to second scroll 73.

In a first version four-cylinder engine including a divided exhaust manifold featuring a twin scroll turbocharger, exhaust runners from cylinders 1 and 4 (first and second outer cylinders or cylinders 31 and 37) may combine to deliver their exhaust to a first scroll of the exhaust turbine while cylinders 2 and 3 (first and second inner cylinders or cylinders 33 and 35) may deliver their exhaust to a second scroll of the exhaust turbine. This exhaust layout may be suitable for a four cylinder engine with a firing sequence of 1-3-4-2 so that an exhaust gas pressure pulse from cylinder 1 may not interfere with the ability of cylinder 2 to expel its exhaust gases.

However, in a second version, such as the example embodiment of four-cylinder engine 10 shown in FIGS. 2, 4, 5 which has a firing sequence of 1-3-2-4 (e.g., cylinder 31 followed by cylinder 35 followed by cylinder 33 followed by cylinder 37), the exhaust layout described for the first version may not be suitable and may degrade turbine efficiency. For example, if the example engine 10 shown in FIGS. 2, 4, and 5 has an exhaust layout such as that of the first version, an exhaust gas pressure pulse from cylinder 31 (first outer cylinder) may interfere with the ability of cylinder 37 (second outer cylinder) to expel its exhaust gases. As will be observed in FIG. 8, cylinder 31 (or cylinder 1) may be ending its expansion stroke and opening its exhaust valves while cylinder 37 (or cylinder 4) still has its exhaust valves open. Therefore, in order to separate exhaust pulses and increase pulse energy driving the turbine, the second version may include exhaust runners from cylinders 1 and 2 (or cylinders 31 and 33) merging into first plenum 23, and exhaust runners from cylinders 3 and 4 (or cylinders 35 and 37, respectively) combining into second plenum 25.

It will be appreciated that in the symmetric layout, first scroll 71 receives exhaust pulses from cylinders 31 and 33 that are separated by at least 360 CA degrees while second scroll 73 receives exhaust pulses from cylinders 35 and 37 that are at least 240 CA degrees apart. In this way, each scroll may receive an exhaust pulse that is separated from the next pulse by at least 240 CA degrees.

Therefore, a method for operating engine 10 in a non-VDE mode may comprise directing exhaust from a first outer cylinder (cylinder 31) and a first inner cylinder (cylinder 33) of four cylinders to a first scroll 71 of a twin scroll turbocharger 290, directing exhaust from a second outer cylinder (cylinder 37) and a second inner cylinder (cylinder 35) of the four cylinders to a second scroll 73 of the twin scroll turbocharger 290, and firing all cylinders in an uneven mode, e.g., with at least one uneven firing. The method may include firing all cylinders in an uneven mode as follows: firing the second inner cylinder at 120 degrees of crank rotation after the first outer cylinder is fired, firing the first inner cylinder 240 crank angle degrees after firing the second inner cylinder, firing the second outer cylinder 240 crank angle degrees after firing the first inner cylinder, and firing the first outer cylinder 120 crank angle degrees after firing the second outer cylinder. Thus, firing events in the first outer cylinder and the first inner cylinder may be separated by at least 360 crank angle degrees while firing events in the second outer cylinder and the second inner cylinder may be separated by at least 240 crank angle degrees.

A first VDE mode may include operating engine 10 in a three-cylinder mode. A method for operating engine 10 in three-cylinder mode may comprise deactivating the first outer cylinder (cylinder 31) and directing exhaust only from first inner cylinder (cylinder 33) to the first scroll 71 of the twin scroll turbocharger. The second scroll 73 may continue to receive exhaust from second outer and second inner cylinders. The first VDE mode may be used during a first condition that may include engine idling conditions (for reduced NVH). The first VDE mode may also be utilized during medium engine load conditions.

A second VDE mode may include operating engine 10 in a two-cylinder mode. A method for operating engine 10 in two-cylinder mode may comprise deactivating the second outer cylinder (cylinder 37) and the second inner cylinder (cylinder 33). Thus, the engine may be operated by activating the first outer cylinder (cylinder 31) and first inner cylinder (cylinder 33). The second VDE mode may be used during low engine load conditions.

In the example of the asymmetric exhaust layout, as shown in FIG. 4, first scroll 71 of exhaust turbine 92 may receive exhaust gases approximately every 720 CA degrees while second scroll 73 of exhaust turbine 92 may receive exhaust pulses approximately every 240 CA degrees. In this layout as well, each scroll may receive an exhaust pulse that is separated from the next pulse by at least 240 CA degrees. In the three-cylinder mode, first scroll 71 may not receive exhaust pulses as cylinder 31 may be deactivated. However, second scroll 73 may continue to receive expelled exhaust from the three activated cylinders (cylinders 33, 35, and 37).

In the two-cylinder mode, cylinders 35 and 37 may be deactivated. Herein, first scroll 71 may receive exhaust pulses from cylinder 31 approximately every 720 CA degrees while second scroll 73 may receive exhaust pulses from cylinder 33 approximately every 720 CA degrees. Accordingly, exhaust turbine 92 may receive exhaust pulses approximately every 360 CA degrees.

Scroll 73 is depicted in FIGS. 2, 4, 12, 13, and 14 of the present disclosure as an inboard scroll that is located closer to a center housing of the turbocharger 290. Further, scroll 71 in the above figures is illustrated farther from the center housing of turbocharger 290. It will be appreciated that in other examples, the positions of scrolls 73 and 71 may be swapped without departing from the scope of the present disclosure.

Therefore, a method of operating an engine in non-VDE mode with an asymmetric exhaust layout may comprise flowing exhaust from a first outer cylinder (cylinder 31) of four cylinders to a first scroll 71 of a twin scroll turbocharger 290, flowing exhaust from a first inner cylinder (cylinder 33), a second outer cylinder (cylinder 37) and a second inner cylinder (cylinder 35) of the four cylinders to a second scroll 73 of the twin scroll turbocharger 290, and during a first condition, operating all cylinders with at least one uneven firing. The first condition may include high engine load conditions. The uneven firing may include a similar firing interval to that described above for a symmetric exhaust layout wherein each of the first inner cylinder, the second outer cylinder and the second inner cylinder may be fired at 240 crank angle degree intervals and the first outer cylinder may be fired approximately midway between the firing of the second outer cylinder and the second inner cylinder. Further, the first outer cylinder may be fired at approximately 120 crank angle degrees after firing the second outer cylinder and approximately 120 crank angle degrees before firing the second inner cylinder. Herein, the first outer cylinder may be the one cylinder with uneven firing.

During a second condition, the engine may be operated in three-cylinder mode by deactivating the first outer cylinder and firing the remaining three cylinders at even intervals. For example, the remaining three cylinders may be operated with even firing with respect to each other. Herein, the first inner cylinder, the second outer cylinder, and the second inner cylinder may be fired at 240 crank angle degree intervals between each cylinder. The second condition for using three-cylinder mode may be under medium engine load conditions. In another example, the three-cylinder mode may be used during idling conditions.

During a third condition, the engine may be operated in a two-cylinder mode by deactivating the second outer and second inner cylinders. Herein, the remaining cylinders, first outer cylinder and first inner cylinder, may be fired at even intervals of 360 crank angle degrees. The third condition for using the two-cylinder VDE mode may be during low engine load conditions.

It will be appreciated that the two-cylinder VDE mode, three-cylinder VDE mode and non-VDE modes may also be used in a naturally aspirated engine. In this example, a turbocharger may not be used.

Figure 9:
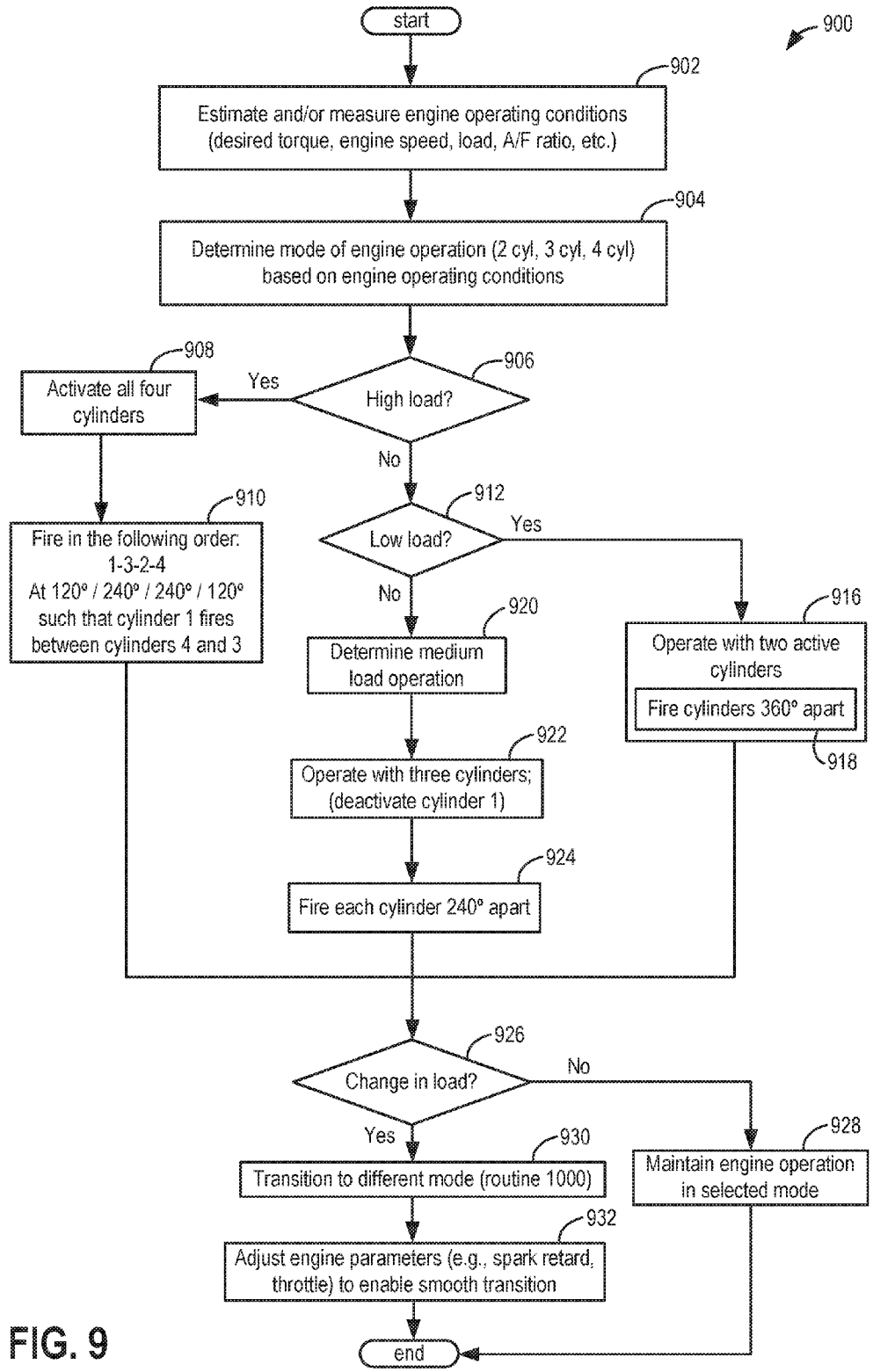
FIG. 9 depicts an example flowchart for selecting a VDE mode or non-VDE mode of operation based on engine operating conditions.

Turning now to FIG. 9, it shows an example routine 900 for determining a mode of engine operation in a vehicle based on engine load. Specifically, a two-cylinder VDE mode, a three-cylinder VDE mode, or a non-VDE mode of operation may be selected based on engine loads. Further, transitions between these modes of operation may be determined based on changes in engine loads. Routine 900 may be controlled by a controller such as controller 12 of engine 10.

At 902, the routine includes estimating and/or measuring engine operating conditions. These conditions may include, for example, engine speed, engine load, desired torque (for example, from a pedal-position sensor), manifold pressure (MAP), mass air flow (MAF), boost pressure, engine temperature, spark timing, intake manifold temperature, knock limits, etc. At 904, the routine includes determining a mode of engine operation based on the estimated engine operating conditions. For example, engine load may be a significant factor to determine engine mode of operation which includes two-cylinder VDE mode, three-cylinder VDE mode or non-VDE mode (also termed full-cylinder mode). In another example, desired torque may also determine engine operating mode. A higher demand for torque may include operating the engine in non-VDE or four-cylinder mode. A lower demand for torque may enable a transition of engine operation to a VDE mode. As will be elaborated later in reference to FIG. 11, in particular Map 1140, a combination of engine speed and engine load conditions may determine engine mode of operation.

At 906, therefore, routine 900 may determine if high (or very high) engine load conditions exist. For example, the engine may be experiencing higher loads as the vehicle ascends a steep incline. In another example, an air-conditioning system may be activated thereby increasing load on the engine. If it is determined that high engine load conditions exist, routine 900 continues to 908 to activate all cylinders and operate in the non-VDE mode. In the example of engine 10 of FIGS. 2, 4, and 5, all four cylinders may be operated during the non-VDE mode. As such, a non-VDE mode may be selected during very high engine loads and/or very high engine speeds.

Further, at 910, the four cylinders may be fired in the following sequence: 1-3-2-4 with cylinders 2, 3, and 4 firing about 240 CA degrees apart, and cylinder 1 firing about halfway between cylinder 4 and cylinder 3. As described earlier, when all cylinders are activated, a first cylinder (cylinder 3) may be fired at 120 degrees of crank rotation after cylinder 1, a second cylinder (cylinder 2) may be fired at 240 degrees of crank rotation after firing the first cylinder, a third cylinder (cylinder 4) may be fired at 240 degrees of crank rotation after firing the second cylinder, and a fourth cylinder (cylinder 1) may be fired at 120 degrees of crank rotation after firing the third cylinder. Routine 900 may then proceed to 926.

If at 906, it is determined that high engine load conditions do not exist, routine 900 progresses to 912 where it may determine if low engine load conditions are present. For example, the engine may be operating at a light load when cruising on a highway. In another example, lower engine loads may occur when the vehicle is descending an incline. If low engine load conditions are determined at 912, routine 900 continues to 916 to operate the engine in a two-cylinder VDE mode. Additionally, at 918, the two activated cylinders (cylinders 1 and 2) may be fired at 360 crank angle degree intervals. Routine 900 may then proceed to 926.

If it is determined that low engine load conditions are not present, routine 900 progresses to 920 where it may determine medium engine load operation. Next, at 922, the engine may be operated in a three-cylinder VDE mode wherein cylinder 1 may be deactivated and cylinders 2, 3, and 4 may be activated. Further, at 924, the three activated cylinders may be fired 240 crank angle degrees apart such that the engine experiences combustion events at 240 crank angle intervals.

Once an engine operating mode is selected and engine operation in selected mode is commenced (e.g., at one of 910, 916 or 924), routine 900 may determine at 926 if a change in engine load is occurring. For example, the vehicle may complete ascending the incline to reach a more level road thereby reducing the existing high engine load to a moderate load (or low load). In another example, the air-conditioning system may be deactivated. In yet another example, the vehicle may accelerate on the highway to pass other vehicles so that engine load may increase from a light load to a moderate or high load. If it is determined at 926 that a change in load is not occurring, routine 900 continues to 928 to maintain engine operation in the selected mode. Else, engine operation may be transitioned at 930 to a different mode based on the change in engine load. Mode transitions will be described in detail in reference to FIG. 10 which shows an example routine 1000 for transitioning from an existing engine operation mode to a different operation mode based on determined engine loads.

At 932, various engine parameters may be adjusted to enable a smooth transition and reduce torque disturbance during transitions. For example, it may be desired to maintain a driver-demanded torque at a constant level before, during, and after the transition between VDE operating modes. As such, when cylinders are reactivated, the desired air charge and thus the manifold pressure (MAP) for the reactivated cylinders may decrease (since a larger number of cylinders will now be operating) to maintain constant engine torque output. To attain the desired lower air charge, the throttle opening may be gradually reduced during the preparing for transition. At the time of the actual transition, that is, at the time of cylinder reactivation, the throttle opening may be substantially reduced to attain the desired airflow. This allows the air charge to be reduced during the transition without causing a sudden drop in engine torque, while allowing the air charge and MAP levels to be immediately reduced to the desired level at the onset of cylinder reactivation. Additionally or alternatively, spark timing may be retarded to maintain a constant torque on all the cylinders, thereby reducing cylinder torque disturbances. When sufficient MAP is reestablished, spark timing may be restored and throttle position may be readjusted. In addition to throttle and spark timing adjustments, valve timing may also be adjusted to compensate for torque disturbances. Routine 900 may end after 932.

It should be noted that when the relative speed (or loads or other such parameters) is indicated as being high or low, the indication refers to the relative speed compared to the range of available speeds (or loads or other such parameters, respectively). Thus, low engine loads or speeds may be lower relative to medium and higher engine loads and speeds, respectively. High engine loads and speeds may be higher relative to medium (or moderate) and lower engine loads and speeds respectively. Medium or moderate engine loads and speeds may be lower relative to high or very high engine loads and speeds, respectively. Further, medium or moderate engine loads and speeds may be greater relative to low engine loads and speeds, respectively.

Turning now to FIG. 11, it shows example maps 1120, 1140, and 1160 featuring engine load-engine speed plots. Specifically, the maps indicate different engine operation modes that are available at different combinations of engine speeds and engine loads. Each of the maps shows engine speed plotted along the x-axis and engine load plotted along the y-axis. Line 1122 represents a highest load that a given engine can operate under at a given speed. Zone 1124 indicates a four-cylinder non-VDE mode for a four-cylinder engine, such as engine 10 described earlier. Zone 1148 indicates a three-cylinder VDE mode with standard intake durations and zone 1126 indicates a two-cylinder VDE mode for the four-cylinder engine.

Map 1120 depicts an example of a first version of a four-cylinder engine, wherein the lone available VDE mode is a two-cylinder mode VDE option (unlike the embodiments in the present disclosure). The two-cylinder mode (zone 1126) may be primarily used during low engine loads and moderate engine speeds. At all other engine speed-engine load combinations, a non-VDE mode may be used (zone 1124). As will be observed in map 1120, zone 1126 occupies a smaller portion of the area under line 1122 relative to the area representing a non-VDE mode (zone 1124). Therefore, an engine operating with two available modes (VDE and non-VDE) may provide relatively minor improvements in fuel economy over an engine without variable displacement. Further, since the transition between the two modes involves activation or deactivation of two out of four cylinders, more intrusive controls (e.g., larger changes to spark timing along with adjustments to throttle and valve timings) may be needed to compensate for torque disturbances during these transitions. As mentioned earlier, the first version of the four cylinder engine may not provide an option of operating in three-cylinder mode due to increased NVH issues.

Map 1140 depicts an example of engine operation for one embodiment of the present disclosure, e.g. engine 10 of FIGS. 2, 4, and 5. Herein, the engine may operate in one of two available VDE modes increasing fuel economy benefits over the first version option described in reference to Map 1120. The engine may operate in two-cylinder VDE mode, as in the example of Map 1120, during low engine loads at moderate engine speeds. Further, the engine may operate in three-cylinder VDE mode during low load-low speed conditions, during moderate load-moderate speed conditions, and during moderate load-high speed conditions. At very high speed conditions at all loads and at very high load conditions at all engine speeds, a non-VDE mode of operation may be utilized.

It will be appreciated from Map 1140 that the example engine of FIGS. 2, 4, and 5 may operate substantially in a three-cylinder or a two-cylinder mode. A non-VDE mode may be selected only during the high load and very high engine speed conditions. Therefore, a relatively higher improved fuel economy may be achieved. As described earlier, the engine may be operated in three-cylinder and two-cylinder modes with even firing allowing reduced NVH issues. When operating in non-VDE mode, an uneven firing pattern may be utilized which may produce a distinct exhaust note.

It will be further appreciated that in the embodiment of engine 10 of FIGS. 2, 4, and 5, a larger proportion of operating mode transitions may include transitions from two-cylinder VDE mode to three-cylinder VDE mode or transitions from three-cylinder VDE mode to non-VDE mode. Further, fewer transitions involving a transition from four-cylinder non-VDE mode to two-cylinder VDE mode (and vice versa) may occur. Consequently, a smoother and easier transition in engine control may be enabled in the example embodiment of engine 10 described in reference to FIGS. 2, 4, and 5. Overall, drivability may be enhanced due to reduced NVH and smoother engine control.

An alternate engine operation for the example engine (e.g. engine 10 of FIGS. 2, 4, and 5) is illustrated in Map 1160. Herein, the option of the two-cylinder VDE mode is unavailable and the engine may largely operate in an even firing three-cylinder VDE mode. For example, the three-cylinder VDE mode may be operational during low load conditions at low, moderate, and high speeds, and during moderate load conditions at low, moderate, and high speeds. A transition to non-VDE mode may be made only under conditions including very high engine speeds, high loads, or very high engine loads. In the example shown in Map 1160, transitions between non-VDE and VDE modes may be significantly reduced, easing NVH and enabling smoother engine control. Further, in the example of engine 10, solely one cylinder may include a deactivation mechanism providing a decrease in costs. The fuel economy benefits may be relatively diminished in comparison to the engine operation example of Map 1140.

Map 1180 of FIG. 11 depicts an engine operation example for an alternate engine embodiment which will be described further in reference to FIGS. 14, 15, and 16.

Figure 10:
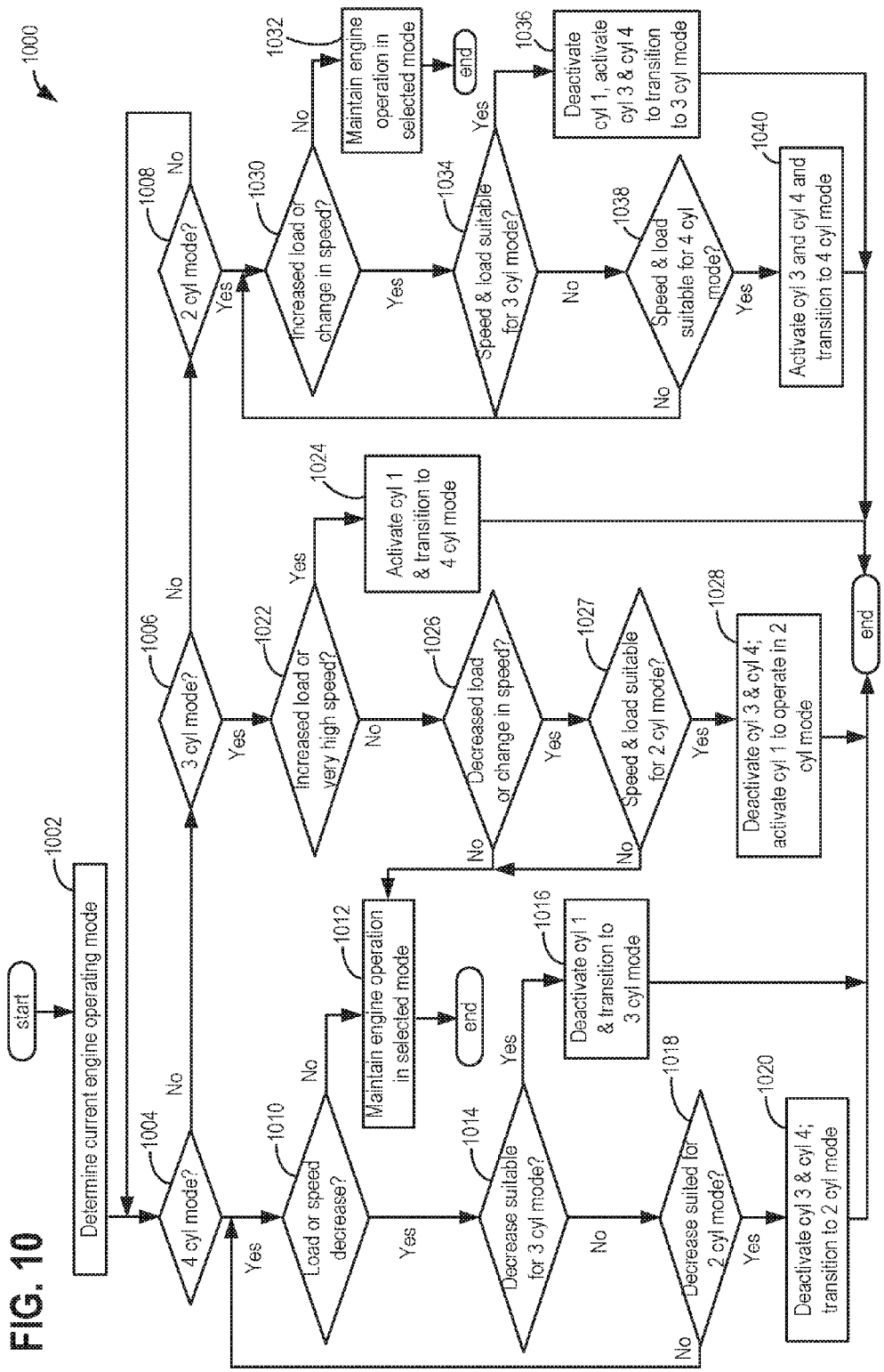
FIG. 10 portrays an example flowchart for transitions between different engine modes based on engine operating conditions, according to the present disclosure.
Figure 11:
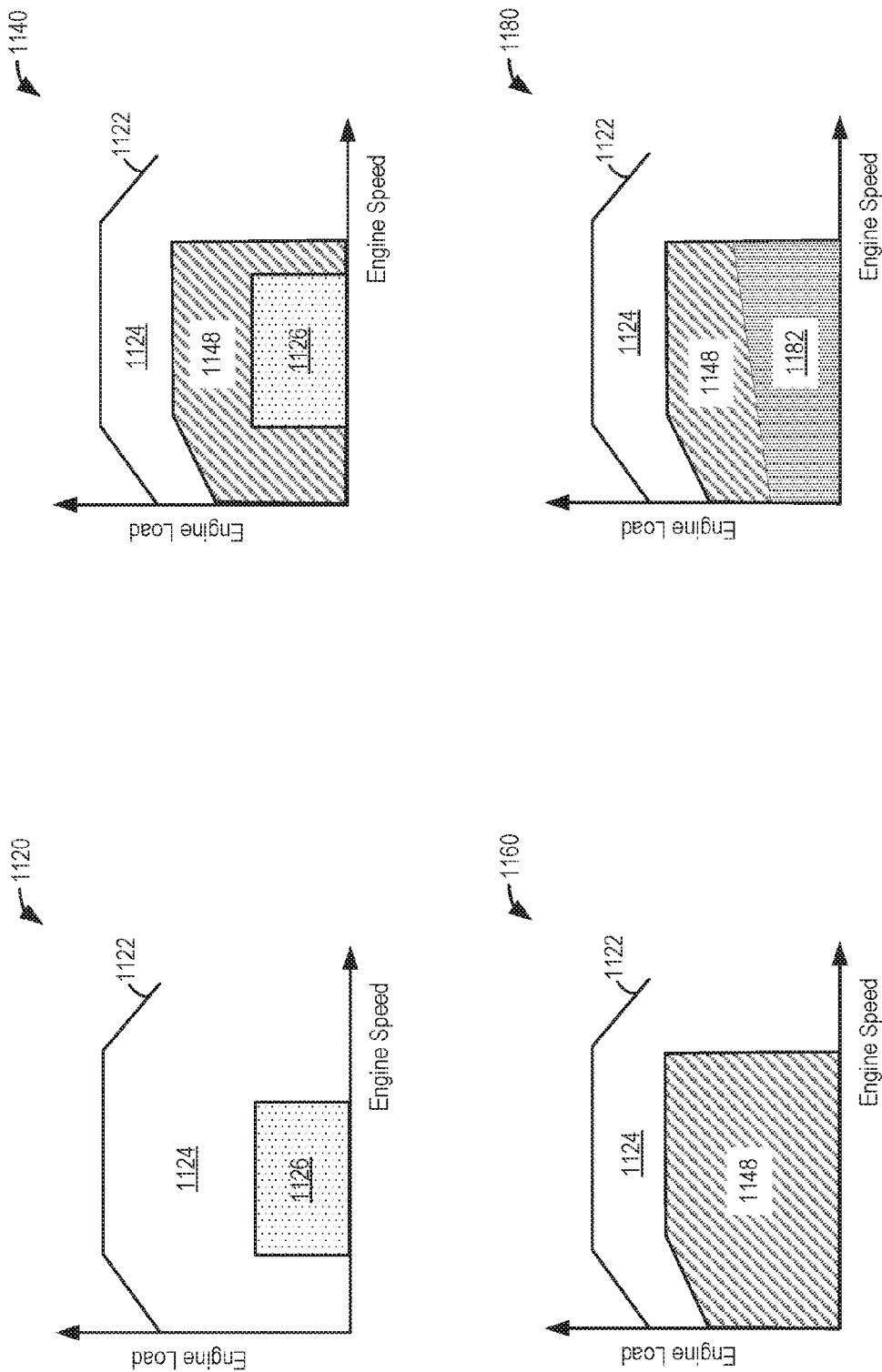
FIG. 11 demonstrates example plots illustrating the selection of engine operation mode based on engine speed and engine load.

Turning now to FIG. 10, routine 1000 for determining transitions in engine operating modes based on engine load and engine speed conditions is described. Specifically, the engine may be transitioned from a non-VDE mode to one of two VDE modes and vice versa, and may also be transitioned between the two VDE modes.

At 1002, the current operating mode may be determined. For example, the four-cylinder engine may be operating in a non-VDE full cylinder mode, a three-cylinder VDE mode, or a two-cylinder VDE mode. At 1004, it may be determined if the engine is operating in the four-cylinder mode. If not, routine 1000 may move to 1006 to determine if the current mode of engine operation is the three-cylinder VDE mode. If not, routine 1000 may determine at 1008 if the engine is operating in the two-cylinder VDE mode. If not, routine 1000 returns to 1004.

At 1004, if it is confirmed that a non-VDE mode of engine operation is present, routine 1000 may continue to 1010 to confirm if engine load and/or engine speed have decreased. If the existing engine operating mode is a non-VDE mode with all four cylinders activated, the engine may be experiencing high or very high engine loads. In another example, a non-VDE mode of engine operation may be in response to very high engine speeds. Thus, if the engine is experiencing high engine loads to operate in a non-VDE mode, a change in operating mode may occur with a decrease in load. A decrease in engine speed may also enable a transition to a VDE mode. An increase in engine load or speed may not change operating mode.

If it is confirmed that a decrease in load and/or speed has not occurred, at 1012, the existing engine operating mode may be maintained and routine 1000 ends. However, if it is determined that a decrease in engine load and/or speed has occurred, routine 1000 progresses to 1014 to determine if the decrease in engine load and/or speed makes it suitable to operate in three-cylinder mode. As described earlier in reference to Map 1140 of FIG. 11, a transition to moderate load-moderate speed conditions, and to moderate load-high speed conditions may enable engine operation in three-cylinder VDE mode. It will be appreciated that a transition to three-cylinder VDE mode may also occur during low speed-low load conditions, as shown in Map 1140 of FIG. 11. Accordingly, if it is confirmed that existing load and/or speed conditions enable a transition to three-cylinder mode, at 1016, a transition to three-cylinder VDE mode may occur. Further, cylinder 1 of the four cylinders may be deactivated while maintaining the remaining three cylinders activated. Further still, the remaining three cylinders may continue to be fired about 240 CA degrees apart from each other. Routine 1000 may then end.

If at 1014 it is determined that the decrease in engine load and/or engine speed is not suitable for operating in three-cylinder mode, routine 1000 continues to 1018 to confirm that the decrease in engine load and/or engine speed enables engine operation in two-cylinder mode. As depicted in Map 1140 of FIG. 11, low engine loads with moderate engine speeds may enable a two-cylinder VDE mode. If the engine load and/or engine speed are not suited for the two-cylinder mode, routine 1000 returns to 1010. Else, at 1020 a transition to two-cylinder VDE mode from non-VDE mode may be completed by deactivating cylinders 3 and 4, while maintaining cylinders 1 and 2 in an activated condition. Cylinders 1 and 2 may be fired at 360 CA degree intervals therebetween. Routine 1000 may then end.

Returning to 1006, if it is confirmed that the current engine operating mode is the three-cylinder VDE mode, routine 1000 continues to 1022 to determine if engine load has increased or if the engine speed is very high. As shown in map 1140, if the engine speed is very high, the engine may be operated in full-cylinder mode. If the existing operating mode is the three-cylinder mode, the engine may have previously experienced moderate load-moderate speed conditions, or moderate load-high speed conditions. Alternatively, the engine may be at low load-low speed conditions. Therefore, a transition from the existing mode may occur with an increase in engine load or a significant increase in engine speed. If an increase in engine load and/or very high engine speed is confirmed at 1022, routine 1000 progresses to 1024 to transition to a non-VDE mode. Therefore, cylinder 1 may be activated to operate the engine in four-cylinder mode with uneven firing.

If an increase in engine load and/or very high engine speed is not determined at 1022, routine 1000 may confirm at 1026 if a decrease in engine load or a change in engine speed has occurred. As explained earlier, if the engine had previously been operating at moderate load-moderate speed conditions, a decrease in load may enable a transition to two-cylinder VDE mode. In another example, a transition to two-cylinder VDE mode may also be initiated if an existing low load-low speed condition changes to a low load-moderate speed condition. In yet another example, a transition from a low load-high speed condition to a low load-moderate speed condition may also enable engine operation in two-cylinder VDE mode. If the change in speed and/or decrease in load is not determined, routine 1000 progresses to 1012 where the existing engine operating mode may be maintained. However, if a decrease in engine load or a change in engine speed is confirmed, routine 1000 continues to 1027 to determine if the changes in speed and/or the decrease in load are suitable for engine operation in two-cylinder mode. For example, the controller may determine if the existing speed and/or load fall within zone 1126 of Map 1140. If yes, engine operation may be transitioned to two-cylinder VDE mode at 1028. Herein, cylinders 3 and 4 may be deactivated and cylinder 1 may be activated while cylinder 2 is maintained in an active mode. If the decrease in engine load and/or change in engine speed do not enable operation in two-cylinder mode, routine 1000 continues to 1012 where the existing engine operating mode may be maintained.

Returning to 1008, if it is confirmed that the current engine operating mode is the two-cylinder VDE mode, routine 1000 continues to 1030 to determine if engine load has increased or if engine speed has changed. If the existing operating mode is the two-cylinder mode, the engine may have previously experienced low to moderate engine loads at moderate engine speeds. Therefore, a transition from the existing mode may occur with an increase in engine load. A decrease in load may not change the engine operating mode. Further, a change from the existing mode may also occur if engine speed decreases to low speed or increases to high (or very high) speed. If an increase in engine load and/or a change in engine speed is not confirmed at 1030, routine 1000 progresses to 1032 to maintain the existing two-cylinder VDE mode.

If an increase in engine load and/or a change in engine speed is confirmed at 1030, routine 1000 may continue to 1034 to determine if the engine load and/or engine speed enable a transition to three-cylinder VDE mode. For example, engine load may be at moderate levels to enable transition to three-cylinder VDE mode. If yes, engine operation may be transitioned to three-cylinder VDE mode at 1036. Further, cylinders 3 and 4 may be activated and cylinder 1 may be deactivated while cylinder 2 is maintained in an active mode. If the engine load and/or engine speed are not suitable for engine operation in three-cylinder mode, routine 1000 may continue to 1038 to determine if the engine load and/or engine speed enable engine operation in four-cylinder mode. For example, engine load may be very high. In another example, engine speed may be very high. If yes, at 1040, cylinders 3 and 4 may be activated and the engine may be transitioned to non-VDE mode of operation. Routine 1000 may then end. If the increase in engine load and/or change in speed is not sufficient to operate the engine in full-cylinder mode, routine 1000 may return to 1030.

Thus, a controller may determine engine operating modes based on the existing combination of engine speed and engine load. A map, such as example Map 1140, may be utilized to decide engine mode transitions. Further, as mentioned in reference to Map 1160 of FIG. 11, in some examples, the available engine operation modes may be either a three-cylinder mode or a non-VDE mode. A controller may be configured to perform routines, such as the routines of FIGS. 9 and 10, to determine an engine mode of operation and transitions between the two modes based on an engine load-engine speed map. By operating the engine in one of two available modes, transitions in engine operation may be reduced affording a decrease in torque disturbances and smoother engine control.

Figure 18:
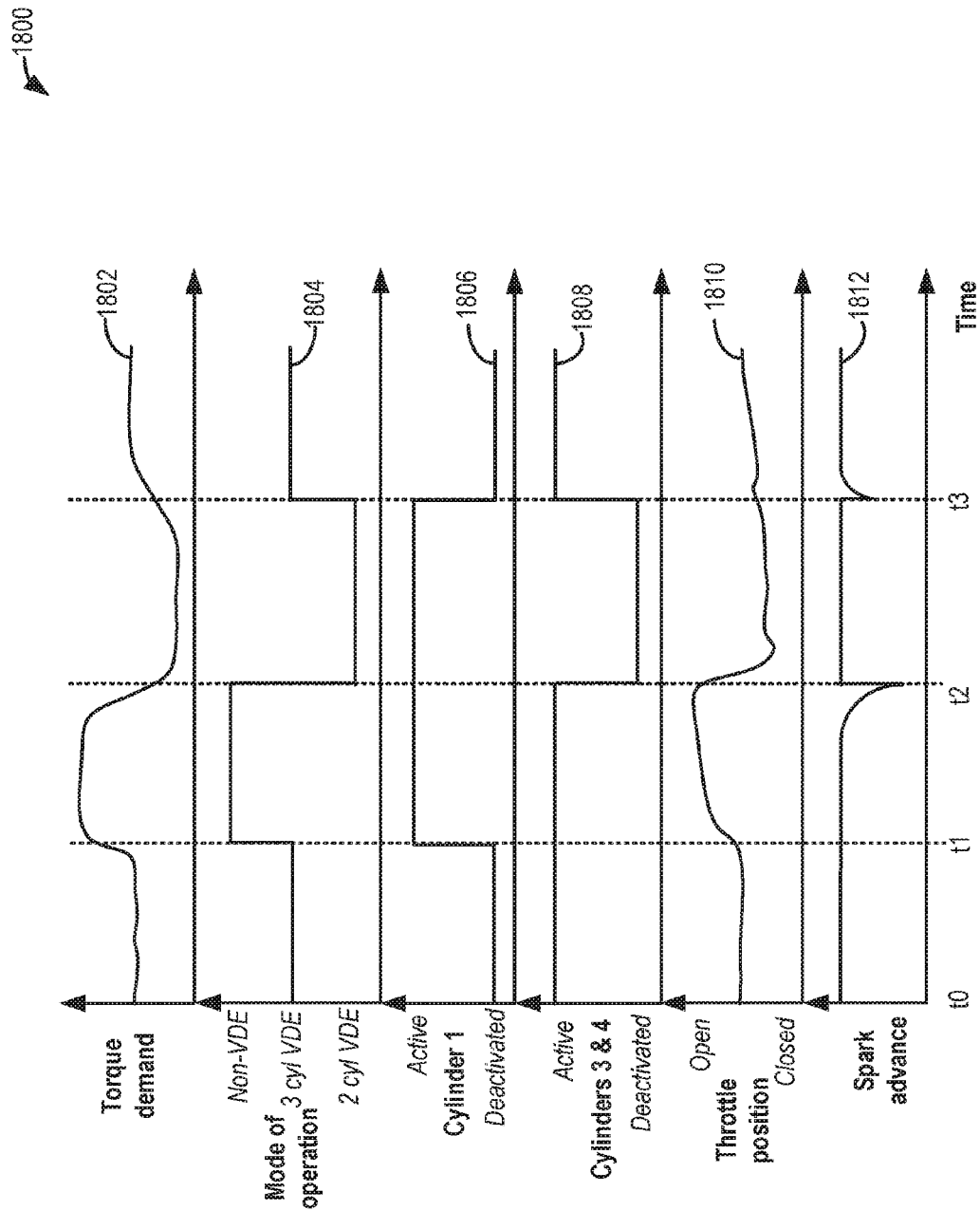
FIG. 18 depicts example transitions between the two VDE and the non-VDE modes of engine operation.

Turning now to FIG. 18, it illustrates map 1800 depicting example transitions in an engine, such as engine 10, from non-VDE mode to VDE mode. Map 1800 depicts torque demand at plot 1802, mode of engine operation (two-cylinder VDE mode, three-cylinder VDE mode, and non-VDE mode) at plot 1804, activation status of cylinder 1 at plot 1806, activation status of cylinders 3 and 4 at plot 1808, throttle position at 1810, and spark advance at plot 1812. All the above parameters are plotted against time on the x-axis. In particular, plot 1812 shows spark retard as applied to active cylinders. It will also be appreciated that cylinder 2 is always maintained active and operational in all engine operating modes. To elaborate further, cylinder 1 herein may be cylinder 31 of FIG. 2, cylinder 2 may be cylinder 33 of FIG. 2, cylinder 3 may be cylinder 35 of FIG. 2, and cylinder 4 may be cylinder 37 of FIG. 2.

At t0, the engine may be operating in three-cylinder VDE mode because of moderate torque demand. Therefore, cylinder 1 may be deactivated while cylinders 2, 3, and 4 are active and firing at even firing intervals of 240 CA degrees. Further, the throttle may be at a position between open and closed while spark advance may be at a timing that provides the desired torque. At t1, torque demand may increase substantially. For example, increased torque demand may occur when a vehicle is being accelerated to merge with other vehicles on a highway. In response to the substantial increase in torque demand, the engine may be transitioned to full-cylinder or non-VDE mode (plot 1804) to provide the desired torque and accordingly, cylinder 1 may be activated. Further, the throttle may be adjusted to a fully open position to enable higher air flow while spark timing may be maintained at its original setting (e.g., the timing at t0).

At t2, torque demand drops substantially. For example, upon merging onto the highway, the vehicle may attain cruising speed allowing a reduction in engine speed and engine load. In response to the decrease in torque demand, and reduction in engine speed and load, the engine may be transitioned to the two-cylinder VDE mode. Further, cylinders 3 and 4 may be deactivated while cylinder 1 remains in its active and operational state. Additionally, the throttle may be moved to a more closed position. Between t2 and t3, the throttle may be adjusted towards a more closed position. A spark retard may also be applied to enable reduction in torque (plot 1812). As shown in FIG. 18, spark advance may be reduced just prior to the transition at t2 to reduce torque in the non-VDE mode before changing to two-cylinder mode. In this way, torque in each of the two activated cylinders that are firing after the transition to two-cylinder VDE mode can be increased so that the total torque delivered by the engine does not suddenly drop, but changes smoothly. Once the transition is complete, spark timing may be restored.

At t3, torque demand may slightly increase and the engine may be transitioned to the three-cylinder mode based on an increase in engine load. Accordingly, cylinder 1 may be deactivated, and cylinders 3 and 4 may be reactivated simultaneously. Further, throttle position may be adjusted slightly to allow more air flow to meet the increase in torque demand. To reduce a rapid rise in torque, spark timing may be retarded at t3. It will be observed that the spark retard applied at t3 may be lower than the spark retard applied at t2. The spark timing may be restored once desired torque is attained.

In this way, a four cylinder engine may be operated in a three-cylinder VDE mode, a two-cylinder VDE mode, apart from and in addition to a full cylinder (or non-VDE) mode to attain fuel economy benefits. The system described herein may comprise an engine including four cylinders arranged inline wherein three of the four cylinders are capable of deactivation, a crankshaft with four crank pins, a single balance shaft rotating in an opposing direction to the crankshaft, and a controller configured with computer readable instructions stored on non-transitory memory for, during a first condition, deactivating two of the three cylinders capable of deactivation, and operating the engine via activating two remaining cylinders with even firing. The first condition may include low engine load conditions. As described earlier in reference to the example of engine 10 from FIGS. 2, 4, and 5, cylinders 31, 35, and 37 may be capable of deactivation while cylinder 33 may not be capable of deactivation. During the low engine load condition, therefore, cylinders 35 and 37 may be deactivated, and cylinders 31 and 33 may be activated with even firing at 360 crank angle degree intervals.

During a second condition, the controller may also be configured for deactivating one of the three cylinders capable of deactivation, and operating the engine via activating remaining three cylinders with even firing. Herein, the second condition may be medium engine loads, and cylinder 31 of engine 10 may be deactivated while cylinders 33, 35, and 37 are activated to operate the engine in three-cylinder mode. Further, the activated three cylinders (33, 35, and 37) may be fired at about 240 crank angle degrees apart from each other. In another example, the second condition may include idling conditions.

During a third condition, the controller may be configured for operating the engine with all cylinders activated with at least one uneven firing cylinder. Herein, the at least one uneven firing cylinder may be only cylinder 31 of example engine 10 and the third condition may include high and very high engine load conditions. Further, when all cylinders are activated, a first cylinder (e.g., cylinder 35 of engine 10) may be fired at 120 degrees of crank rotation, a second cylinder (e.g., cylinder 33 of engine 10) may be fired at 240 degrees of crank rotation after firing the first cylinder, a third cylinder (e.g., cylinder 37 of engine 10) may be fired at 240 degrees of crank rotation after firing the second cylinder, and a fourth cylinder (e.g., cylinder 31 of engine 10) may be fired at 120 degrees of crank rotation after firing the third cylinder.

The crankshaft in the example system may include a second crank pin, a third crank pin, and a fourth crank pin positioned 120 degrees apart from each other. The crankshaft may further include a first crank pin, situated adjacent to the second crank pin and aligned with the second crank pin.

Figure 12:
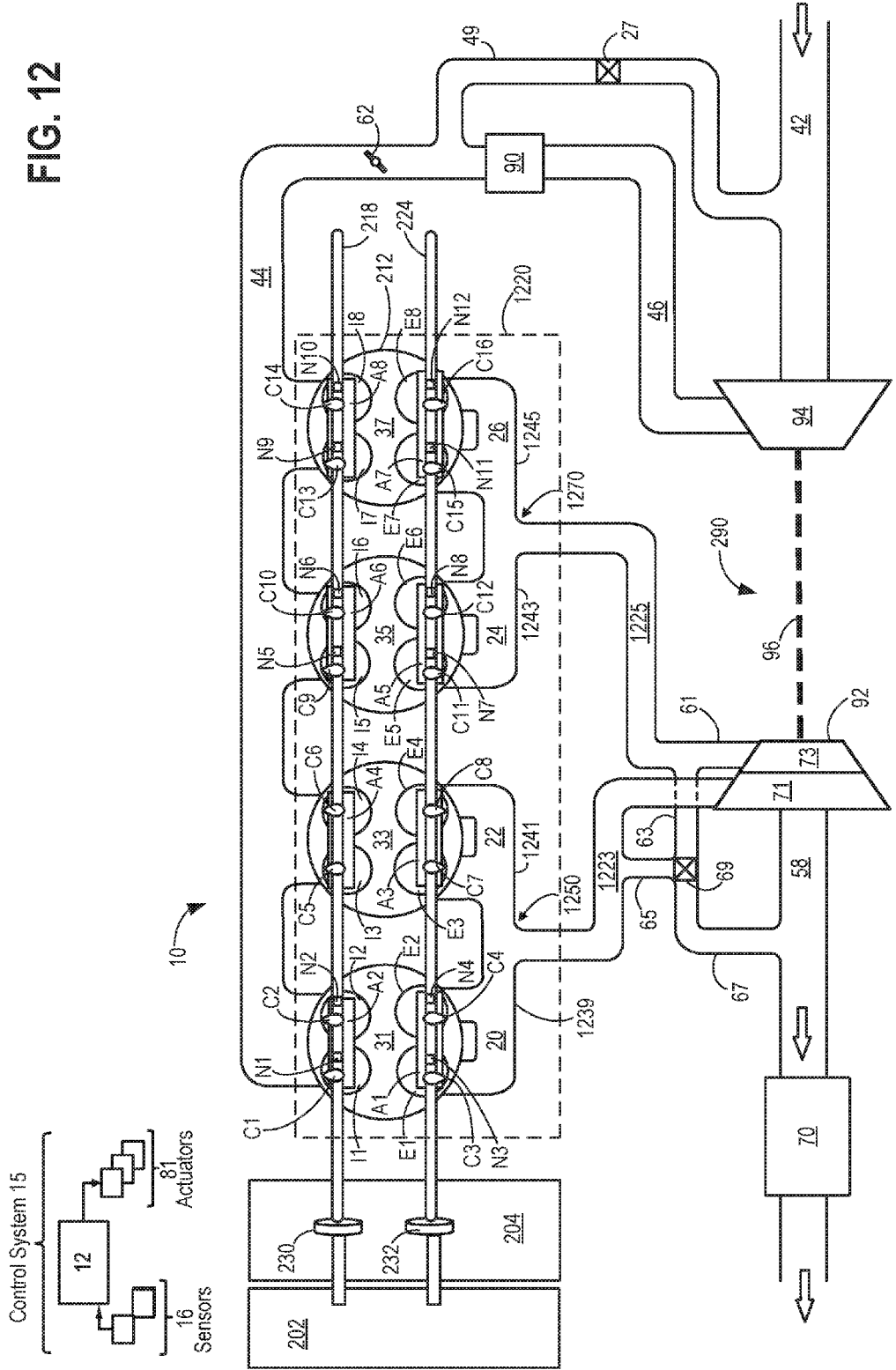
FIG. 12 shows an example layout of the engine of FIG. 2 with an integrated exhaust manifold.
Figure 13:
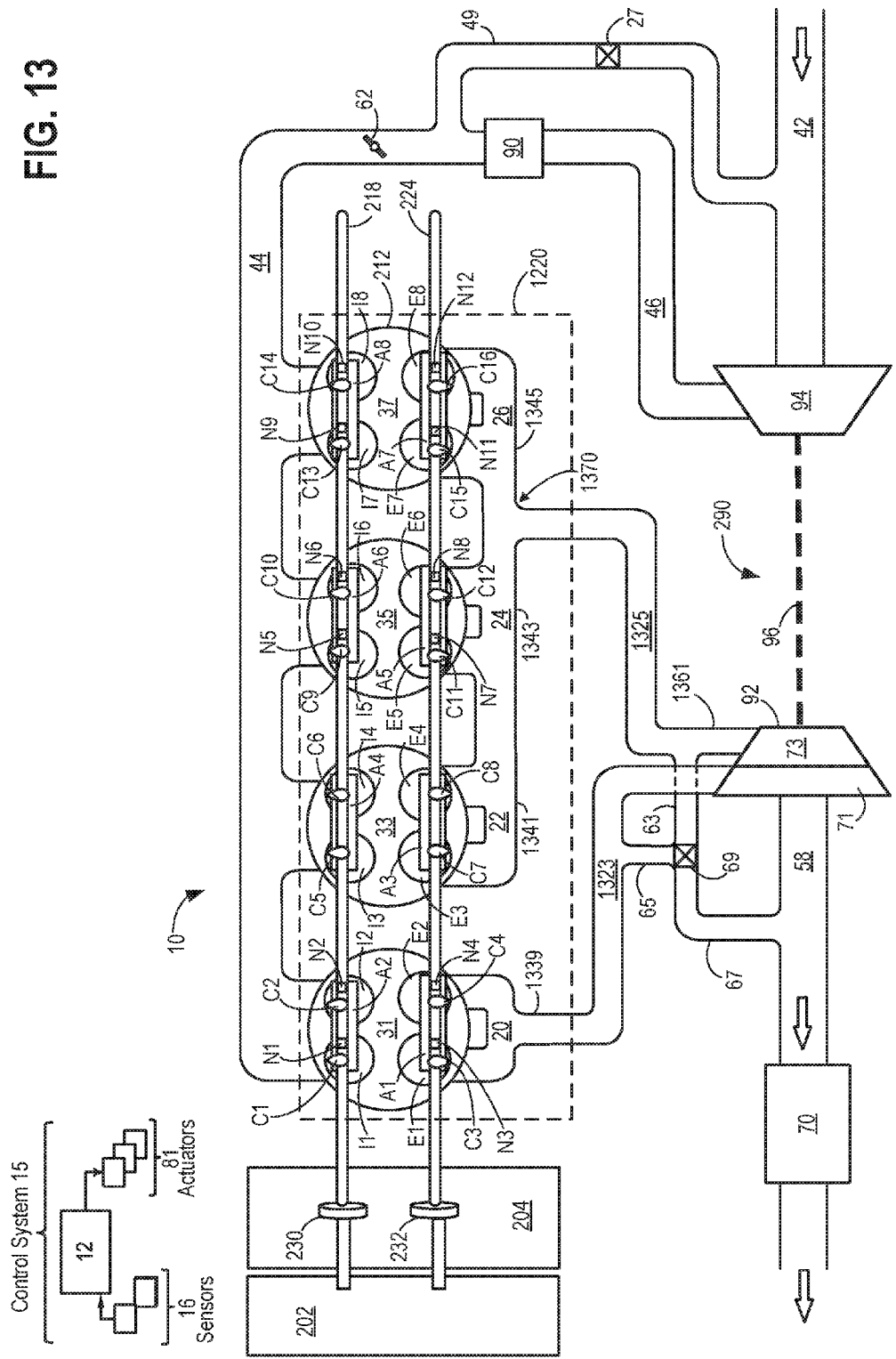
FIG. 13 presents an alternate exhaust layout for the engine of FIG. 12.

Turning now to FIG. 12, an embodiment with an integrated exhaust manifold (IEM) with a symmetric exhaust layout for engine 10 is depicted. Engine components including the cylinders 31, 33, 35, and 37, VCT system 202, CPS system 204 inclusive of camshafts and cams, turbocharger 290, emission control device 70, charge air cooler 90 are the same as in FIGS. 2 and 4. The exhaust layout from cylinders to the turbocharger is distinct from that shown in FIGS. 2 and 4.

Engine 10 is illustrated with IEM 1220 configured to exhaust combustion products from cylinders 31, 33, 35, and 37. IEM 1220 may include exhaust runners 1239, 1241, 1243 and 1245, each exhaust runner selectively communicating with a corresponding cylinder via one or more exhaust ports and exhaust valves of that cylinder. Further, pairs of exhaust runners may merge within IEM 1220 to form two plenums. As shown in the example of FIG. 12, exhaust runners 1239 and 1241 may merge at Y-junction 1250 into first plenum 1223. Exhaust runners 1243 and 1245 may merge at Y-junction 1270 into second plenum 1225. The first plenum 1223 and second plenum 1225 may not communicate with each other.

The split exhaust manifold may be integrated into a cylinder head to form IEM 1220. Therefore, exhaust runners 1239, 1241, 1243, and 1245, and exhaust plenums 1223 and 1225 may also be integrated within the IEM 1220. Additionally, exhaust runner 1239 and exhaust runner 1241 may merge within IEM 1220 at Y-junction 1250 such that first plenum 1223 originates within IEM 1220. Likewise, exhaust runners 1243 and 1245 may join within IEM 1220 at Y-junction 1270 such that second plenum 1225 originates within IEM 1220.

To elaborate further, exhaust runner 1239 may be fluidically coupled to cylinder 31 via exhaust port 20, while exhaust runner 1241 may fluidically communicate with cylinder 33 via exhaust port 22. First plenum 1223 formed by the joining of exhaust runners 1239 and 1241 may thus be fluidically coupled to cylinders 31 and 33. Similarly, exhaust runner 1243 may be fluidically coupled to cylinder 35 via exhaust port 24, while exhaust runner 1245 may fluidically communicate with cylinder 37 via exhaust port 26. Second plenum 1225 formed by the joining of exhaust runners 1243 and 1245 may thus be fluidically coupled to cylinders 35 and 37. As shown in FIG. 12 (and FIGS. 2 and 4), exhaust runners from cylinders 31 and 33 may not communicate with exhaust runners from cylinders 35 and 37. Further, first plenum 1223 and second plenum 1225 may be completely separated, such that blowback from one cylinder may not harm combustion in another cylinder adjacent in the firing sequence. First and second plenums (1223 and 1225, respectively) may also extend outside of IEM 1220. Thus, the first plenum 1223 and second plenum 1225 may be the sole outlets for exhaust outside of IEM 1220.

As depicted in FIG. 12, outside of IEM 1220, first plenum 1223 may deliver exhaust from cylinders 31 and 33 to first scroll 71 of exhaust turbine 92 while second plenum 1225 may direct exhaust from cylinders 35 and 37 to second scroll 73 of exhaust turbine 92 via passage 61. Therefore, first scroll 71 may be fluidically coupled only to first plenum 1223 and second scroll 73 may be fluidically coupled only to second plenum 1225.

As in the embodiments of FIGS. 2 and 4, wastegate 69 may be included in bypass passage 67 to allow exhaust in first plenum 1223 to bypass exhaust turbine 92 via passage 65. Exhaust in second plenum 1225 may bypass exhaust turbine 92 via passage 63 and past wastegate 69.

In this way, a system may comprise an integrated exhaust manifold (IEM), an inline group of four cylinders with two inner cylinders, cylinders 33 and 35, flanked by two outer cylinders, cylinders 31 and 37. Each cylinder may fluidically communicate with one of four exhaust runners of the IEM, the exhaust runners of a first outer (cylinder 31) and a first inner cylinder (cylinder 33) merging into first plenum 1223 within the IEM 1220, and the exhaust runners of a second outer (cylinder 37) and a second inner cylinder (cylinder 35) merging into second plenum 1225 within the IEM 1220. The system may also include a turbocharger with a twin scroll exhaust turbine 92 with a first scroll 71 of the turbine fluidically communicating with the first plenum 1223 but not the second plenum 1225, and second scroll 73 of the turbine fluidically communicating with the second plenum 1225 but not the first plenum 1223. Further, as demonstrated in FIG. 12, the first and second plenums may be the only exhaust outlets of the IEM and may not fluidically communicate with each other within the IEM.

An asymmetric exhaust layout with an integrated exhaust manifold, such as that shown in FIG. 13, may be an alternative to the embodiment of FIG. 12. Herein, as in FIG. 4, exhaust from cylinder 31 may be separated and directed to first scroll 71 of exhaust turbine. Meanwhile, exhaust from cylinders 33, 35, and 37 may be combined and directed to second scroll 73 of exhaust turbine 92. The embodiment of FIG. 13 differs from the embodiment of FIG. 4 chiefly in regards to the presence of the IEM 1220. All other features, including firing patterns and intervals between exhaust pulses may be the same as in the embodiment of FIG. 4.

Exhaust runner 1339 may evacuate exhaust gases from cylinder 31 via exhaust port 20 and fluidically communicate with first plenum 1323 to direct exhaust pulses to first scroll 71 of exhaust turbine 92. Exhaust runner 1341 which receives combustion gases from cylinder 33 via exhaust port 22 may combine with exhaust runner 1343, which receives exhaust gases from cylinder 35 via exhaust port 24. Further, exhaust runner 1345, which receives exhaust gases from cylinder 37 via exhaust port 26 may combine with exhaust runners 1341 and 1343 at Y-junction 1370 to form second plenum 1325. Second plenum 1325 may direct exhaust gases from cylinders 33, 35, and 37 to second scroll 73 of exhaust turbine 92 via passage 1361.

In this way, an integrated exhaust manifold (IEM) may be provided to reduce engine weight, surface area, and production costs. By reducing engine weight, fuel economy benefits may be further increased in addition to those achieved by operating the engine in three-cylinder VDE mode as discussed earlier. Additionally, the turbocharger may be positioned closer to the cylinders when using an IEM enabling hotter exhaust gases to be discharged into the turbine affording faster warm-up of the emissions control device.

Figure 14:
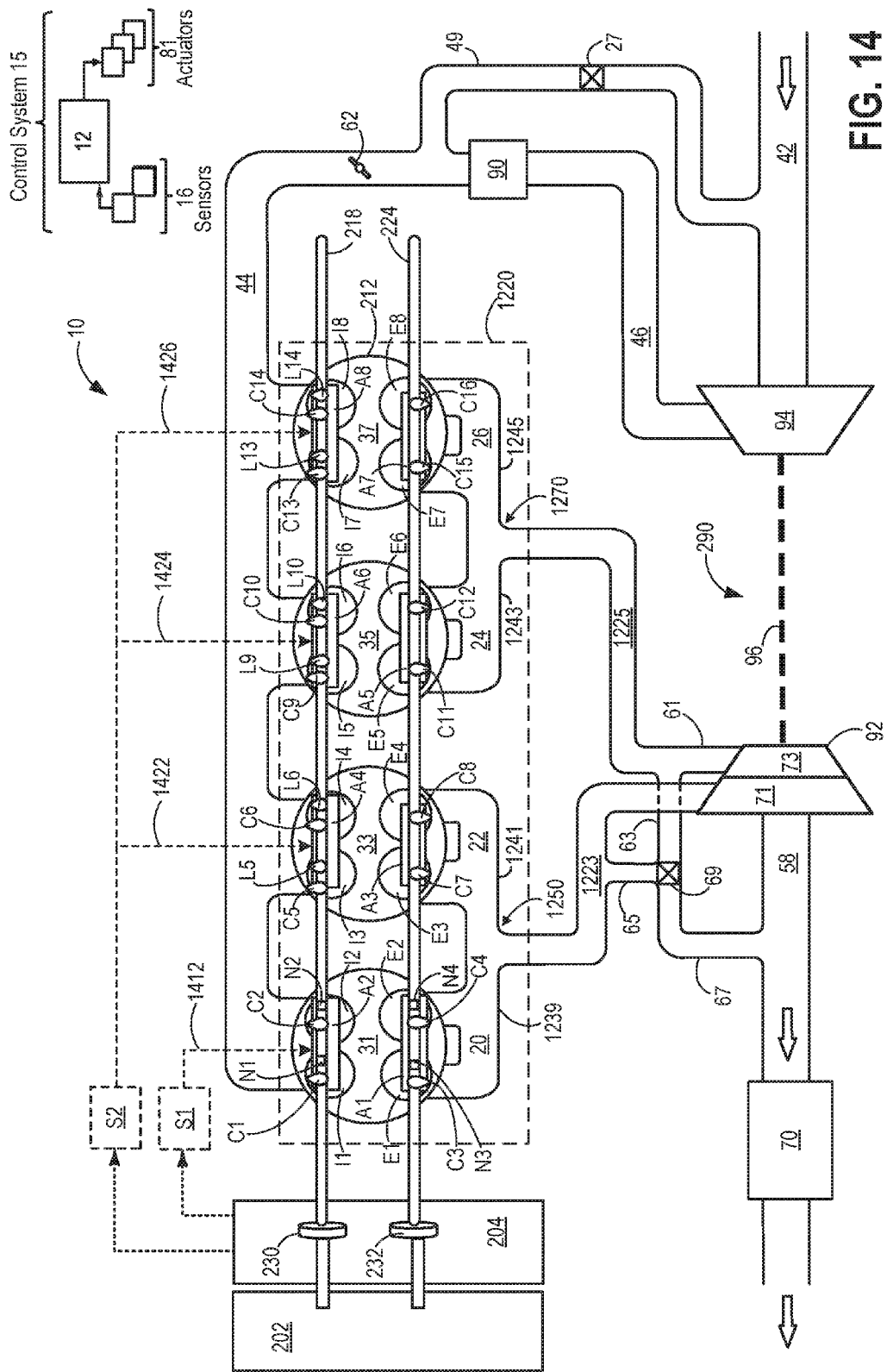
FIG. 14 shows an embodiment of the engine of FIG. 2 with a cam profile switching system that allows the engine to operate substantially in a three-cylinder mode.
Figure 15:
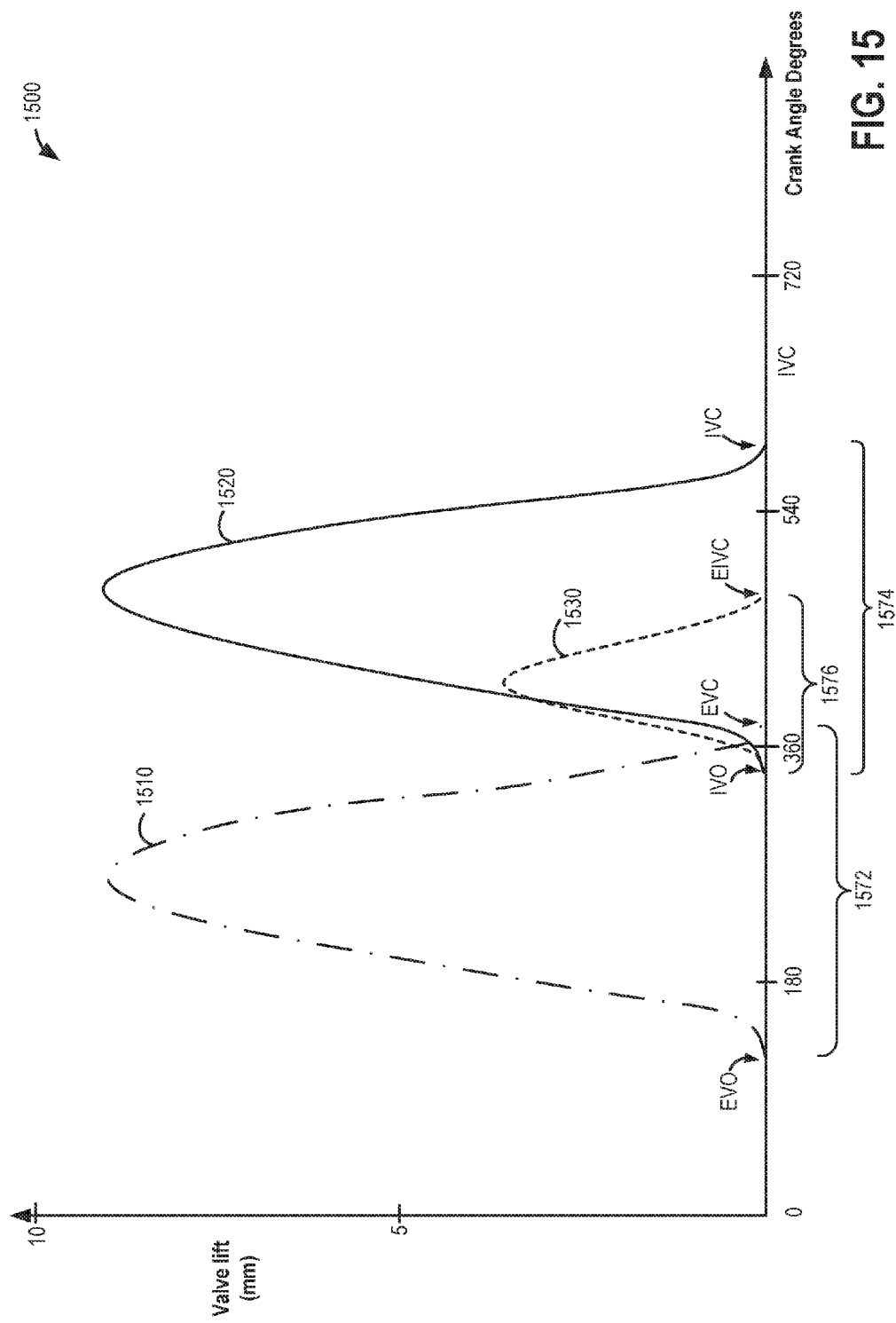
FIG. 15 depicts an example valve timing for the embodiment of FIG. 14, according to the present disclosure.

Turning now to FIG. 14, an additional embodiment of engine 10 that may be operated primarily in three-cylinder mode over a wider range of engine loads and engine speeds is depicted. Specifically, the engine in the embodiment of FIG. 14 may include a single cylinder of four cylinders that is capable of deactivation unlike the engine of FIGS. 2, 4, and 5 which includes three cylinders capable of deactivation. Further, the remaining three cylinders in the present embodiment of FIG. 14 may be configured to operate with early intake valve closing during certain operating conditions. As such, multiple engine components, such as the turbocharger 290, emission control device 70, etc. described earlier in reference to FIGS. 2 and 12 may be the same in FIG. 14. Distinct components will be described herein.

As in earlier embodiments, engine 10 of FIG. 14 includes four cylinders: a first outer cylinder 31, a first inner cylinder 33, a second inner cylinder 35, and a second outer cylinder 37. In the depicted example, cylinder 31 is capable of deactivation but cylinders 33, 35, and 37 may not be capable of deactivation. Integrated exhaust manifold (IEM) 1220 may assist in exhausting combustion products to turbocharger 290. Further details of the cylinders will be described below. Variable cam timing (VCT) system 202 and cam profile switching (CPS) system 204 may be included to enable engine operation with variable valve timings and enable the switching of available cam profiles, respectively.

Each cylinder of engine 10 is depicted with two intake valves and two exhaust valves. Other embodiments may include fewer valves or additional valves. Each intake valve is actuatable between an open position allowing intake air into a respective cylinder and a closed position substantially blocking intake air from the respective cylinder. FIG. 14 illustrates intake valves I1-I8 being actuated by the common intake camshaft 218. Intake camshaft 218 includes a plurality of intake cams configured to control the opening and closing of the intake valves. Each intake valve may be controlled by two intake cams, which will be described further below. In some embodiments, one or more additional intake cams may be included to control the intake valves. Further still, intake actuator systems may enable the control of intake valves.

Each exhaust valve is actuatable between an open position allowing exhaust gas out of a respective cylinder and a closed position substantially retaining gas within the respective cylinder. FIG. 14 shows exhaust valves E1-E8 being actuated by common exhaust camshaft 224. Exhaust camshaft 224 includes a plurality of exhaust cams configured to control the opening and closing of the exhaust valves. In the depicted embodiment, each of the exhaust valves of cylinders 33, 35, and 37 may be controlled by a single exhaust cam, which will be described further below. In some embodiments, one or more additional exhaust cams may be included to control the exhaust valves. Further, exhaust actuator systems may enable the control of exhaust valves.

Engine 10 of FIG. 14 may be a variable displacement engine wherein only one cylinder of the four cylinders 212 may be deactivated, if desired, via one or more mechanisms. As mentioned earlier, cylinder 31 is the sole cylinder including a deactivation mechanism in this embodiment. Intake and exhaust valves of the single cylinder, cylinder 31, may be deactivated in the VDE mode of engine operation via switching tappets, switching rocker arms, or switching hydraulic roller finger followers.

As in the example of FIG. 2, cylinder 31 in FIG. 14 includes a first intake cam and a second intake cam per intake valve arranged on common intake camshaft 218, and a first exhaust cam and a second exhaust cam per exhaust valve positioned on common exhaust camshaft 224. First intake cams may have a first cam lobe profile for opening the intake valves for a first intake duration and first valve lift. In the example of FIG. 14, first intake cams C1 and C2 of cylinder 31 may open intake valves I1 and I2 respectively for a similar duration and lift. Second intake cams, N1 and N2, are depicted as null cam lobes which may have a profile to maintain their respective intake valves I1 and I2 in the closed position. Thus, null cam lobes N1 and N2 may assist in deactivating corresponding intake valves when cylinder 31 is deactivated in the VDE mode.

Similar to the intake valves, cylinder 31 features a first exhaust cam and a second exhaust cam arranged on common exhaust camshaft 224. First exhaust cams may have a first cam lobe profile providing a first exhaust duration and first exhaust valve lift. First exhaust cams C3 and C4 of cylinder 31 may have a similar first cam lobe profile which opens respective exhaust valves E1 and E2 for a given duration and lift. In other examples, the exhaust durations and lifts provided by cams C3 and C4 may be similar or may be distinct. Second exhaust cams N3 and N4 are depicted as null cam lobes which may have a profile to maintain their respective exhaust valves E1 and E2 in the closed position through one or more engine cycles. Thus, null cam lobes N3 and N4 may assist in deactivating corresponding exhaust valves in cylinder 31 during the VDE mode.

As mentioned earlier, other embodiments may include different mechanisms known in the art for deactivating intake and exhaust valves in cylinders. Such embodiments may not utilize null cam lobes for deactivation.

Cylinders 33, 35, and 37 in the embodiment of FIG. 14 may not be deactivatable enabling engine 10 to operate largely in a three-cylinder mode over a wide range of engine speeds and loads. However, during lighter engine loads, these three cylinders may be operated with early intake valve closing (EIVC) to leverage fuel economy benefits arising from reduced pumping losses.

Accordingly, cylinders 33, 35, and 37 may each include a first intake cam and a second intake cam per intake valve arranged on common intake camshaft 218, and a single exhaust cam per exhaust valve positioned on common exhaust camshaft 224. Herein, first intake cams may have a first cam lobe profile for opening the intake valves for a first intake duration and first intake valve lift. First intake cams for cylinders 33, 35, and 37 may have the same profile as the first intake cams in cylinder 31. In other examples, the cams may have distinct profiles. Further, in the depicted example of FIG. 14, second intake cams may have a second cam lobe profile for opening the intake valves for a second intake duration and lift. The second intake duration may be a shorter intake duration (e.g., shorter than the first intake duration) and a lower intake valve lift (e.g., lower than the first intake valve lift).

To elaborate, intake valves I3 and I4 of cylinder 33 may be actuated by either respective first intake cams C5 and C6, or by respective second intake cams L5 and L6. Further, intake valves I5 and I6 of cylinder 35 may be actuated by either respective first intake cams C9 and C10, or by respective second intake cams L9 and L10, and intake valves I7 and I8 of cylinder 37 may be actuated by either respective first intake cams C13 and C14, or by respective second intake cams L13 and L14. First intake cams C5, C6, C9, C10, C13, and C14 may have a first cam lobe profile providing a first intake duration and a first intake valve lift. Second intake cams L5, L6, L9, L10, L13, and L14 may have a second cam lobe profile for opening respective intake valves for a second intake duration different from the first intake duration, and a second intake valve lift distinct from the first intake valve lift. In the depicted example, the first intake duration provided by first intake cams C5, C6, C9, C10, C13, and C14 may be longer than second intake duration provided by second intake cams L5, L6, L9, L10, L13, and L14. Additionally, the first intake valve lift provided by first intake cams C5, C6, C9, C10, C13, and C14 may be higher than second intake valve lift provided by second intake cams L5, L6, L9, L10, L13, and L14.

In one example, the lift and duration provided by the second intake cams for a given cylinder may be similar. For example, each of the second intake duration and the second valve lift provided by each of second intake cams L9 and L10 of cylinder 35 may be the same. To elaborate, the intake duration provided by second intake cam L9 for intake valve I5 may be the same as the intake duration provided by second intake cam L10 for intake valve I6. In other examples, the lift and duration of the second intake cams may be distinct on a given cylinder. For example, second intake cam L5 may have a lower lift and a shorter duration than second intake cam L6 in order to induce swirl in cylinder 33 during the intake event. Likewise, second intake cams L9 and L10 of cylinder 35 may have different profiles from each other, and second intake cams L13 and L14 of cylinder 37 may have distinct profiles relative to each other.

Exhaust valves E3-E8 of cylinders 33, 35, and 37 may each be actuated by a single exhaust cam with a first cam profile providing a first exhaust duration and a first exhaust lift. As depicted in FIG. 14, cams C7 and C8 may actuate respective exhaust valves E3 and E4 of cylinder 33, cams C11 and C12 may actuate respective exhaust valves E5 and E6 of cylinder 35, and exhaust cams C15 and C16 may actuate respective exhaust valves E7 and E8 of cylinder 37. The first cam profiles for exhaust cams associated with cylinders 33, 35, and 37 may be the same as the first exhaust cam profile of first exhaust cams C3 and C4 in cylinder 31. In other examples, the cam lobe profiles for exhaust cams may differ.

Each of the intake valves may be actuated by a respective actuator system operatively coupled to controller 12. As shown in FIG. 14, intake valves I1 and I2 of cylinder 31 may be actuated via actuator system A2, intake valves I3 and I4 of cylinder 33 may be actuated via actuator system A4, intake valves I5 and I6 of cylinder 35 may be actuated via actuator system A6, and intake valves I7 and I8 of cylinder 37 may be actuated via actuator system A8. Further, each of the exhaust valves may be actuated by a respective actuator system operatively coupled to controller 12. As depicted, exhaust valves E1 and E2 of cylinder 31 may be actuated via actuator system A1, exhaust valves E3 and E4 of cylinder 33 may be actuated via actuator system A3, exhaust valves E5 and E6 of cylinder 35 may be actuated via actuator system A5, and exhaust valves E7 and E8 of cylinder 37 may be actuated via actuator system A7.

Other embodiments may include reduced actuator systems or different combinations of actuator systems without departing from the scope of the present disclosure. For example, the intake valves and exhaust valves of each cylinder may be actuated by a single actuator.

CPS system 204 may be configured to translate specific portions of intake camshaft 218 longitudinally, thereby causing operation of intake valves I1-I8 to vary between respective first intake cams and second intake cams (or null cams for cylinder 31).

In an optional embodiment depicted in FIG. 14 (dashed lines) wherein actuator systems A2, A4, A6, and A8 include rocker arms to actuate the first and second intake cams, CPS system 204 may be operatively coupled to solenoid S1 and solenoid S2, which in turn may be operatively coupled to the actuator systems. Herein, the rocker arms may be actuated by electrical or hydraulic means via solenoids S1 and S2 to follow either the first intake cams or the second intake cams. As depicted, solenoid S1 is operatively coupled solely to actuator system A2 (via 1412) and not operatively coupled to actuator systems A4, A6, and A8. Likewise, solenoid S2 is operatively coupled to actuator systems A4 (via 1422), A6 (via 1424), and A8 (via 1426), and not operatively coupled to actuator system A2.

It will be appreciated that though not shown in FIG. 14, solenoids S1 and S2 may also be operatively coupled to actuator systems A1, A3, A5, and A7 to actuate the respective exhaust cams. To elaborate, solenoid S1 may be operatively coupled only to actuator system A1 and not to actuator systems A3, A5, and A7. Further, solenoid S2 may be operatively coupled to A3, A5, and A7 but not operatively coupled to A1. Herein, rocker arms may be actuated by electrical or hydraulic means to follow either the first exhaust cams or the second null cams. Alternatively, CPS system 204 may be configured to translate specific portions of exhaust camshaft 224 longitudinally, thereby causing operation of exhaust valves E1-E2 to vary between respective first exhaust cams and second null cams.

Solenoid S1 may control intake cams of intake valves I1 and I2 of cylinder 31 via rocker arms in actuator system A2. As mentioned earlier, though not shown in FIG. 14, solenoid S1 may also control exhaust valves E1 and E2 of cylinder 31, which may be deactivated at the same time as intake valves I1 and I2. A default position for solenoid S1 may be a closed position such that rocker arm(s) operatively coupled to solenoid S1 are maintained in a pressureless unlocked position resulting in no lift (or zero lift) of intake valves I1 and I2.

Solenoid S2 may control each pair of intake cams of intake valves I3 and I4 of cylinder 33, intake valves I5 and I6 of cylinder 35, and intake valves I7 and I8 of cylinder 37 respectively. Solenoid S2 may control the intake cams of intake valves of cylinders 33, 35, and 37 via rocker arms in respective actuator systems A4, A6, and A8. Solenoid S2 may be maintained in a default closed position such that associated rocker arms are maintained in a pressureless locked position.

In this way, CPS system 204 may switch between a first cam for opening a valve for a first duration, and a second cam, for opening the valve for a second duration. In the given example, CPS system 204 may switch cams for intake valves in cylinders 33, 35, and 37 between a first cam for opening the intake valves for a first longer duration, and a second intake cam for opening the intake valves for a second shorter duration. CPS system 204 may switch cams for intake valves in cylinder 31 between a first cam for opening the intake valves for a first duration (that may be similar to the first intake duration in cylinders 33, 35, and 37) and a second null cam for maintaining intake valves closed. Further, CPS system 204 may switch cams for exhaust valves in only cylinder 31 between a first cam for opening the exhaust valves for a first duration, and a second null cam for maintaining exhaust valves closed. In the example of cylinders 33, 35, and 37, CPS system 204 may not switch cams for the exhaust valves as cylinders 33, 35 and 37 are configured with one cam per exhaust valve.

CPS system 204 may receive signals from controller 12 to switch between different cam profiles for different cylinders in engine 10 based on engine operating conditions. For example, during high engine loads, engine operation may be in non-VDE mode. Herein, all cylinders may be activated and the intake valves in each cylinder may be actuated by their respective first intake cams.

In another example, at a medium engine load, engine 10 may be operated in a three-cylinder mode. Herein, CPS system 204 may be configured to actuate the intake valves of cylinders 33, 35, and 37 with their respective first intake cams. Concurrently, cylinder 31 may be deactivated by CPS system 204 via actuating its intake and exhaust valves with respective second, null cams. In yet another example, at a low engine load, engine 10 may be operated in a three-cylinder mode with early intake valve closing. Herein, CPS system 204 may be configured to actuate the intake valves of cylinders 33, 35, and 37 with their respective second intake cams which provide shorter intake durations.

In the optional embodiment comprising actuator systems with rocker arms wherein the rocker arms are actuated by electrical or hydraulic means, the engine may be operated with three active cylinders and early intake valve closing by energizing solenoid S2 coupled to cylinders 33, 35, and 37 to open and actuate the respective rocker arms to follow the second intake cams with shorter intake duration. At medium engine loads, solenoid S2 may be de-energized to close such that the respective rocker arms follow the first intake cams with longer intake duration in the three active cylinders (33, 35, and 37). In both VDE modes (with early intake valve closing and without early intake valve closing), solenoid S1 may be maintained in its default position. In non-VDE mode, solenoid S1 may be energized to open so that respective rocker arms follow the first intake cams (and first exhaust cams, when applicable) on cylinder 31, and solenoid S2 may be de-energized to close such that the respective rocker arms follow the first intake cams with longer intake duration in cylinders 33, 35, and 37. Thus, FIG. 14 describes an engine system including four cylinders arranged inline, wherein each cylinder may have at least one intake valve. The intake valve(s) of a single cylinder (cylinder 31) may be actuated by one of two cams, wherein a first cam has a non-zero lift profile and a second cam has a zero lift profile. Herein, the second cam may be a null cam lobe with a no-lift or a zero lift profile. Further, each of the intake valves of remaining three cylinders (cylinders 33, 35, and 37) may be actuated by one of two cams, where both cams have non-zero lift profiles. Accordingly, each cam may lift its respective intake valve to a non-zero height and none of the cams actuating either intake or exhaust valves in cylinders 33, 35, and 37 may be null cam lobes.

Engine 10 of embodiment in FIG. 14 may be operated in either a non-VDE mode or a VDE mode. During the VDE mode, cylinder 31 may be disabled by deactivating its intake and exhaust valves. Herein, intake valves I1 and I2, and exhaust valves E1 and E2 may be actuated (or closed) by their respective null cam lobes. The VDE mode may be a three-cylinder mode. Two three-cylinder VDE modes may be available to engine 10 based on a selection of either the first intake cam or the second intake cam in the three active cylinders. Specifically, a first three-cylinder VDE mode may include engine operation with longer intake durations via using first cam lobes to actuate each of the intake valves in cylinders 33, 35, and 37. Engine 10 may operate in the first three-cylinder VDE mode, without early intake valve closing (EIVC), during medium engine load conditions. A second three-cylinder VDE mode may include engine operation with a shortened intake duration (e.g., EIVC) by using the second cam lobes to actuate each of the intake valves in cylinders 33, 35, and 37. The second three-cylinder VDE mode may, therefore, include EIVC and may be used for engine operation during engine idling conditions and during low engine load conditions. As stated earlier, during both VDE modes, cylinder 31 may be deactivated. CPS system 204 may switch between the first cam lobes and the second cam lobes for intake valve actuation in the VDE mode to enable a first three-cylinder VDE mode or a second three-cylinder VDE mode based on engine operating conditions.

Specifically, during the first three-cylinder VDE mode, intake valves in cylinders 33, 35, and 37 may be actuated by first cams C5, C6, (for intake valves I3-I4) and C9, C10, (for intake valves I5-I6) and C13, C14 (for intake valves I7-I8). During the second three-cylinder VDE mode, intake valves in cylinders 33, 35, and 37 may be actuated by respective second cams L5, L6, and L9, L10, and L13, L14.

In the non-VDE mode, the CPS system 204 may switch to first cam lobes for actuating all intake valves in all cylinders with a longer intake duration and a higher intake valve lift. The non-VDE mode may be utilized during high or very high engine load conditions. To elaborate, during the non-VDE mode, intake valves and exhaust valves in cylinder 31 may be actuated by cams C1, C2 (for I1-I2), and C3 and C4 (for E1-E2) while intake and exhaust valves in cylinders 33, 35, and 37 may be actuated by first cams C5, C6 (for I3-I4), C7, C8 (for E3-E4), C9, C10 (for I5-I6), C11, C12 (for E5-E6), C13, C14 (for I7-I8), C15, and C16 (for E7-E8).

Referring now to FIG. 15, map 1500 depicts an example intake valve and exhaust valve operation utilizing cam profile switching between the two non-zero lift cam lobes described above with reference to FIG. 14. In particular, FIG. 15 shows the operation of an intake valve (which may be one of intake valves I3-I8) and an exhaust valve (which may be one of exhaust valves E3-E8), with respect to crankshaft angle.

Map 1500 illustrates crank angle degrees plotted along the x-axis and valve lift in millimeters plotted along the y-axis. An exhaust stroke of the cycle is shown generally occurring between 180 degrees and 360 degrees crank angle. Subsequently, a regular intake stroke of the cycle is shown generally occurring between 360 degrees and 540 degrees crank angle. The regular intake stroke may occur with a first cam actuating the intake valves of cylinders 33, 35, or 37.

Further, as shown in map 1500, each of the exhaust valve and the intake valve have a positive lift which corresponds to the valves being in an open position, thereby enabling air to flow out of or into the combustion chamber. During engine operation, the amount of lift during intake strokes and exhaust strokes may vary from that shown in FIG. 15 without departing from the scope of the examples described herein.

Curve 1510 depicts an example exhaust valve timing, lift, and duration for an exhaust valve in cylinder 33, cylinder 35, or cylinder 37. Exhaust valve opening (EVO) may commence before 180 crankshaft degrees, at approximately 120 crankshaft degrees, and exhaust valve closing (EVC) may end at approximately 380 crankshaft degrees. Therefore, exhaust duration may be approximately 260 crankshaft degrees. In one example, exhaust duration may be 250 crankshaft degrees. In another example, exhaust duration may be longer at 270 crankshaft degrees. In yet another example, exhaust duration may be exactly 260 crank angle degrees. Further, exhaust valve lift may be approximately 9 mm.

Curve 1520 portrays an example intake valve timing, lift, and duration for an intake valve actuated by a first cam in cylinder 33, cylinder 35 or cylinder 37. Herein, intake valve opening (IVO) may begin at approximately 350 crankshaft degrees and intake valve closing (IVC) may occur at approximately 590 crankshaft degrees. Accordingly, intake duration when actuating with the first cam may be approximately 240 crank angle degrees. In one example, intake duration may be 230 crankshaft degrees. In another example, intake duration may be longer at 260 crankshaft degrees. In yet another example, intake duration may be exactly 240 crankshaft degrees. Further, intake valve lift may be approximately 9 mm. In one example, intake valve lift may be 8 mm whereas in another example, intake valve lift may be 10 mm. In yet another example, intake valve lift may be exactly 9 mm. Intake and exhaust valve lifts may vary from that stated herein without departing from the scope of the examples herein.

Curve 1530 depicts an example intake valve timing, lift, and duration for an intake valve actuated by a second cam in cylinder 33, cylinder 35, or cylinder 37. Herein, intake valve opening (IVO) may begin at about the same time as in curve 1520, e.g., at approximately 350 crankshaft degrees. However, the intake valve may be closed earlier and early intake valve closing (EIVC) may occur at approximately 470 crankshaft degrees. Accordingly, intake duration when actuating with the second cam may be approximately 120 crank angle degrees. In one example, intake duration may be shorter e.g., 110 crankshaft degrees. In another example, intake duration may be longer e.g., 140 crankshaft degrees. In yet another example, intake duration may be exactly 120 crank angle degrees. Further, intake valve lift may be approximately 3 mm. Intake valve lift during EIVC may vary between 2 mm to 5 mm in alternate examples.

As depicted in FIG. 15, bracket 1572 represents an exhaust duration, bracket 1574 represents an intake duration with first cam, and bracket 1576 represents an intake duration with second cam actuation. As will be observed, bracket 1576 is substantially shorter than bracket 1574. As described earlier, intake duration with second cam actuation may be approximately 120 crank angle degrees, and shorter than intake duration with first cam actuation which may be approximately 240 crank angle degrees. Further, intake valve lift with second cam is lower than intake valve lift with first cam.

Figure 16:
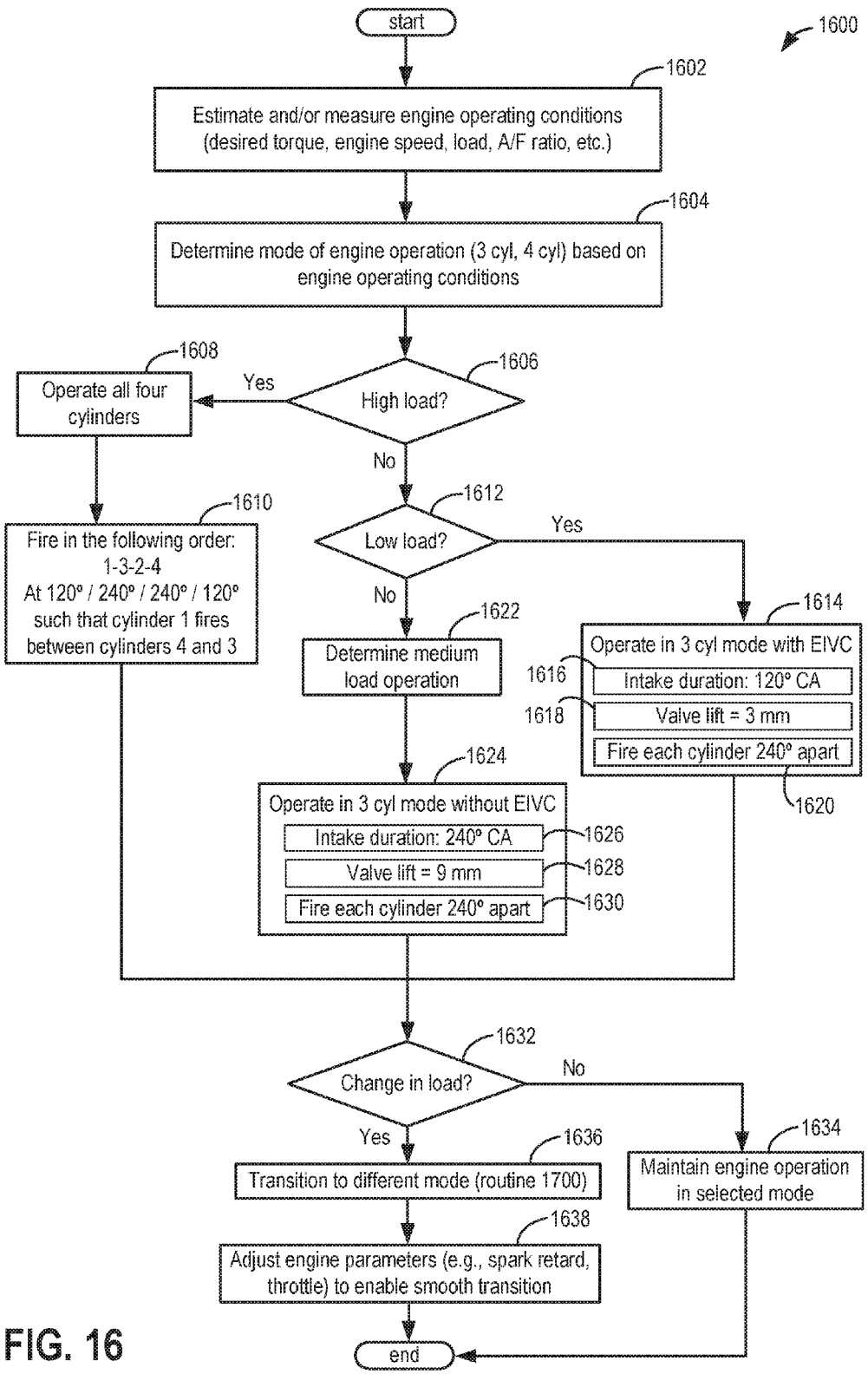
FIG. 16 is an example flowchart for operating the example engine of FIG. 14.
Figure 17:
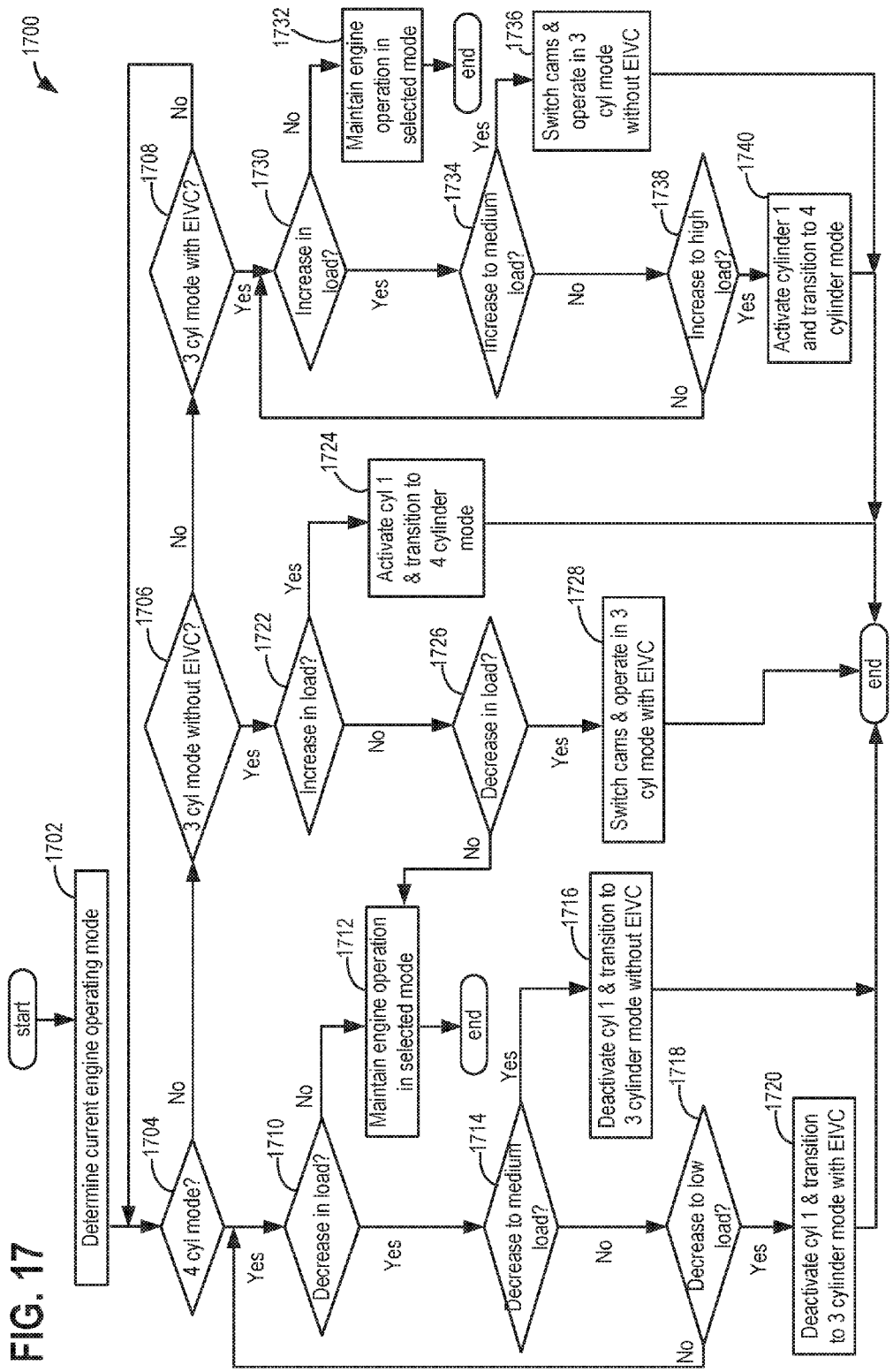
FIG. 17 illustrates an example flowchart for transitioning between different engine operating modes for the example engine of FIG. 14.

Turning now to FIG. 16, it shows an example routine 1600 for determining a mode of operation in a vehicle with an engine, such as the example engine of FIG. 14. Specifically, a three-cylinder VDE mode with early intake valve closing (EIVC), a three-cylinder VDE mode without EIVC or a non-VDE mode of operation may be selected based on engine loads. Further, transitions between these modes of operation may be determined based on changes in engine loads. Routine 1600 may be controlled by a controller such as controller 12 of engine 10.

At 1602, the routine includes estimating and/or measuring engine operating conditions. These conditions may include, for example, engine speed, engine load, desired torque, manifold pressure (MAP), air/fuel ratio, mass air flow (MAF), boost pressure, engine temperature, spark timing, intake manifold temperature, knock limits, etc. At 1604, the routine includes determining a mode of engine operation based on the estimated engine operating conditions. For example, engine load may be a significant factor to determine engine mode of operation which includes a three-cylinder VDE mode with EIVC, a three cylinder VDE mode without EIVC at regular, base durations of intake, or a non-VDE mode (or four-cylinder mode). The regular, base durations of intake in the three-cylinder mode without EIVC may be longer than the intake durations during the three-cylinder mode with EIVC. In another example, desired torque may also determine engine operating mode. A higher demand for torque may include operating the engine in non-VDE or four-cylinder mode. A lower demand for torque may enable a transition of engine operation to a VDE mode. As will be elaborated later in reference to map 1180 of FIG. 11, a combination of engine speed and engine load conditions may determine engine mode of operation.

At 1606, therefore, routine 1600 may determine if high (or very high) engine load conditions exist. For example, the engine may be experiencing higher loads as the vehicle ascends a steep incline. In another example, an air-conditioning system may be activated thereby increasing load on the engine. If it is determined that high engine load conditions exist, routine 1600 continues to 1608 to activate all cylinders and operate in the non-VDE mode. In the example of engine 10 of FIG. 14, all four cylinders may be activated during the non-VDE mode. As such, a non-VDE mode may be selected during very high engine loads and/or very high engine speeds.

At 1610, the four cylinders may be fired in the following sequence: 1-3-2-4 with cylinders 2, 3, and 4 firing about 240 CA degrees apart, and cylinder 1 firing about halfway between cylinder 4 and cylinder 3. In this example, cylinder 31 of FIG. 14 is cylinder 1, cylinder 33 of FIG. 14 is cylinder 2, cylinder 35 of FIG. 14 is cylinder 3, and cylinder 37 of FIG. 14 is cylinder 4. When all cylinders are activated, the single deactivatable cylinder 1 (cylinder 31) may be fired approximately midway between cylinder 4 and cylinder 3. Further, firing events in cylinder 4 may be separated from firing events in cylinder 3 by 240 crank angle degrees. Thus, cylinder 1 may be fired approximately 120 crank angle degrees after cylinder 4 is fired, and approximately 120 crank angle degrees before cylinder 3 is fired. Furthermore, cylinder 2 may be fired about 240 crank angle (CA) degrees after firing cylinder 3 and cylinder 4 may be fired about 240 crank angle degrees after firing cylinder 2. Thus the non-VDE mode includes uneven firing intervals (e.g., 120°-240°-240°-120°) wherein cylinder 3 is fired 120 CA degrees after cylinder 1, cylinder 2 is fired 240 CA degrees after cylinder 3, cylinder 4 is fired 240 CA degrees after cylinder 2, and cylinder 1 is fired at 120 CA degrees after cylinder 1. The sequence continues thereon at the same firing intervals in non-VDE mode.

If at 1606, it is determined that high engine load conditions do not exist, routine 1600 progresses to 1612 where it may determine if low engine load conditions are present. For example, the engine may be operating at a light load when cruising on a highway. In another example, lower engine loads may occur when the vehicle is descending an incline. If low engine load conditions are determined at 1612, routine 1600 continues to 1614 to operate the engine in a three-cylinder VDE mode with EIVC. Herein, cylinder 1 may be deactivated. As explained in reference to FIG. 15, the three-cylinder mode with EIVC may include actuating the intake valves with respective second cams. Therefore, the three activated cylinders may be operated with an intake duration of 120 crank angle degrees at 1616, and with an intake valve lift of 3 mm at 1618. Additionally, at 1620, the three activated cylinders (cylinders 2, 3, and 4) may be fired at 240 crank angle degree intervals. Routine 900 may then proceed to 1632.

If it is determined at 1612 that low engine load conditions are not present, routine 1600 progresses to 1622 where it may determine engine operation under medium loads. Next, at 1624, the engine may be operated in a three-cylinder VDE mode without EIVC wherein cylinder 1 may be deactivated and cylinders 2, 3, and 4 may be activated. Herein, the intake valves of the activated cylinders may be actuated via their respective first cams. Further, at 1626, intake durations in the three activated cylinders may be 240 crank angle degrees, and at 1628, intake valves may be lifted to about 9 mm. Further still, at 1630, combustion events in the three activated cylinders may occur at 240 crank angle degree intervals.

Once an engine operating mode is selected and engine operation in selected mode is commenced (e.g., at one of 1610, 1624, or 1614), routine 1600 may determine at 1632 if a change in engine load is occurring. For example, the vehicle may complete ascending the incline and reach a level portion whereby the existing high engine load may be reduced to a moderate load. In another example, the vehicle may accelerate on the highway to pass other vehicles. Herein, engine load may increase to a moderate or high load. If it is determined at 1632 that a change in load is not occurring, routine 1600 continues to 1634 to maintain engine operation in the selected mode. Else, at 1636, engine operation may be transitioned to a different mode based on the change in engine load. Mode transitions will be described in detail in reference to FIG. 17 which shows an example routine 1700 for transitioning from an existing engine operation mode to a different operation mode based on determined engine loads.

At 1638, various engine parameters may be adjusted to enable a smooth transition and reduce torque disturbance during transitions. For example, when transitioning from a VDE mode to a non-VDE mode, an opening of an intake throttle may be decreased to allow the MAP to decrease. Since the number of firing cylinders may have increased in the transition from VDE mode to non-VDE mode, the airflow and thus, MAP to each of the firing cylinders, may need to be decreased to minimize torque disturbances. Therefore, adjustments may be made such that the intake manifold may be filled to a lesser extent with air to achieve an air charge and MAP that will provide the driver-demanded torque as soon as the cylinders are reactivated. Accordingly, based on an estimation of engine operating parameters, the engine's throttle may be adjusted to reduce airflow and the MAP to a desired level. Additionally or alternatively, spark timing may be retarded to maintain a constant torque on all the cylinders, thereby reducing cylinder torque disturbances. When sufficient MAP is reestablished, spark timing may be restored and throttle position may be readjusted. In addition to throttle and spark timing adjustments, valve timing may also be adjusted to compensate for torque disturbances. Routine 1600 may end after 1638.

Turning now to map 1180 of FIG. 11, it shows an engine speed-engine load map for the embodiment of the engine in FIG. 14. Specifically, map 1180 indicates different engine operation modes that are available at different combinations of engine speeds and engine loads. Map 1180 also shows engine speed plotted along the x-axis and engine load plotted along the y-axis. Line 1122 represents a highest load that a given engine can operate under at a given speed. Zone 1124 indicates a four-cylinder non-VDE mode for a four-cylinder engine, such as engine 10 described earlier. Zone 1148 indicates a three-cylinder VDE mode without EIVC and zone 1182 indicates a three-cylinder VDE mode with EIVC.

Map 1180 depicts an example of engine operation where the engine may largely operate in one of two available three-cylinder VDE modes. A two-cylinder VDE mode option is not available for engine 10 of FIG. 14. Engine 10 may operate in three-cylinder VDE mode with EIVC during low engine loads—low engine speeds, during low engine loads—moderate engine speeds, and during low engine loads—high engine speeds. Engine mode of operation may be transitioned to three-cylinder mode without EIVC during medium engine load conditions at all speeds other than very high, as shown by zone 1148. At very high speed conditions at all loads and very high load conditions at all engine speeds, a non-VDE mode of operation may be utilized.

It will be appreciated from Map 1180 that the example engine of FIG. 14 may operate substantially in a three-cylinder mode. A non-VDE mode may be selected only during the high load and high engine speed conditions. Thus, fuel economy may be enhanced while reducing the number of transitions between three-cylinder mode and non-VDE mode. In the example shown in Map 1180, transitions between non-VDE and VDE modes may be significantly reduced. By reducing transitions in engine operating modes, engine control may be easier and torque disturbances due to such transitions may be lessened. Further, in the example of engine 10, a single cylinder may be arranged to be capable of deactivation enabling a decrease in costs. The fuel economy benefits may be relatively diminished in comparison to the engine operation example of Map 1140.

Thus, a method for an engine is provided comprising during a first condition, operating the engine with a single cylinder deactivated and remaining cylinders activated with a first intake duration, during a second condition, operating the engine with the single cylinder deactivated and the remaining cylinders activated with a second intake duration, and during a third condition, operating the engine with all cylinders activated. Herein, the first condition may include a first engine load, the second condition may include a second engine load, and the third condition may include a third engine load, such that the second engine load is lower than the first engine load, and the first engine load is lower than the third engine load. The method may further comprise during the first condition operating the remaining cylinders with a first intake valve lift, and during the second condition, operating the remaining cylinders with a second intake valve lift. Further, during the third condition, all cylinders may be activated with the first intake duration and the first intake valve lift. Herein, the first intake valve lift may be higher than the second intake valve lift and the first intake duration may be longer than the second intake duration. Further, the first intake duration may be approximately 240 crank angle degrees, and the second intake duration may be approximately 120 crank angle degrees. The exhaust duration may be the same during all three conditions and may be approximately 260 crank angle degrees. Further, the second condition may include an idling engine condition.

The method may further include switching between the first condition and the second condition with a cam profile switching system between a first cam and a second cam, the first cam for opening a first intake valve of each of the remaining cylinders for the first intake duration, and the second cam for opening the first intake valve of each of the remaining cylinders for the second intake duration. Herein, the engine may comprise four cylinders arranged inline. Further, during the first and second conditions, firing events in the engine may be separated by 240 crank angle degrees. During the third condition, the single cylinder may be fired approximately midway between a fourth cylinder and a third cylinder, and wherein the fourth cylinder and the third cylinder may be fired 240 crank angle degrees apart. The method may further comprise firing a second cylinder approximately 240 crank degrees after firing the third cylinder.

Turning now to FIG. 17, routine 1700 for determining transitions in engine operating modes based on engine load conditions is described for the example engine of FIG. 14. Specifically, the engine may be transitioned from a non-VDE mode to one of two three-cylinder VDE modes and vice versa, and may also be transitioned between the two three-cylinder VDE modes.

At 1702, the current operating mode may be determined. For example, the four-cylinder engine may be operating in a non-VDE, full cylinder mode, a three-cylinder VDE mode with EIVC, or a three-cylinder VDE mode without EIVC. At 1704, it may be determined if the engine is operating in the four-cylinder mode. If not, routine 1700 may move to 1706 to determine if the current mode of engine operation is the three-cylinder VDE mode without EIVC. If not, routine 1700 may determine at 1708 if the engine is operating in the three-cylinder VDE mode with EIVC. If not, routine 1700 returns to 1704.

At 1704, if it is confirmed that a non-VDE mode of engine operation is present, routine 1700 may continue to 1710 to confirm if engine load has decreased. If the existing engine operating mode is a non-VDE mode with all four cylinders activated, the engine may be experiencing high or very high engine loads. In another example, a non-VDE mode of engine operation may be in response to very high engine speeds. Thus, if the engine is experiencing high engine loads to operate in a non-VDE mode, a change in operating mode may occur solely with a decrease in load. An increase in engine load may not change operating mode.

If it is confirmed that a decrease in load has not occurred, at 1712, the existing engine operating mode may be maintained and routine 1700 ends. However, if it is determined that a decrease in engine load has occurred, routine 1700 progresses to 1714 to determine if the decrease in engine load is to a medium load. In another example, a change in engine conditions may include a decrease in load to medium loads and a decrease in speed to high, moderate or low speeds. As described earlier in reference to Map 1180 of FIG. 11, a transition to moderate load-moderate speed conditions, and to moderate load-low speed conditions may enable engine operation in three-cylinder VDE mode without EIVC. It will be appreciated that a transition to three-cylinder VDE mode without EIVC may also occur during moderate load-high speed conditions. Accordingly, if a decrease to medium load is confirmed, at 1716, a transition to three-cylinder VDE mode without EIVC may occur.

Herein, cylinder 1 of the four cylinders may be deactivated while maintaining remaining three cylinders in an activated condition. Further, intake valves in the remaining three cylinders may be actuated by their respective first cams providing a longer intake duration. Routine 1700 may then end.

If at 1714 it is determined that the decrease in engine load is not to a medium engine load condition, routine 1700 continues to 1718 to confirm that the decrease in engine load is to a low load condition. As explained above in reference to Map 1180 of FIG. 11, low engine loads with low to high engine speeds may enable a three-cylinder VDE mode with EIVC. If the decrease in load is not to a low load condition, routine 1700 returns to 1710. Else, at 1720 a transition to the three-cylinder VDE mode with EIVC may be completed by deactivating cylinder 1 and maintaining cylinders 2, 3, and 4 in an activated condition. Further, intake valves in the activated three cylinders may be actuated by their respective second cams providing shorter intake durations. Routine 1700 may then end.

Returning to 1706, if it is confirmed that the current engine operating mode is the three-cylinder VDE mode without EIVC, routine 1700 continues to 1722 to determine if engine load has increased. If the existing operating mode is the three-cylinder mode without EIVC, the engine may have previously experienced moderate load conditions. Therefore, a transition from the existing mode may occur with an increase in engine load or a significant increase in engine speed. A transition from the existing mode may also occur if there is a decrease in engine load to a low load. If an increase in engine load is confirmed at 1722, routine 1700 progresses to 1724 to transition to a non-VDE mode. Therefore, cylinder 1 may be activated to operate the engine in four-cylinder mode. Further, intake valves in all cylinders may be actuated by their respective first cams providing a longer intake duration.

If an increase in engine load is not determined at 1722, routine 1700 may confirm at 1726 if a decrease in engine load has occurred. If yes, engine operation may be transitioned to three-cylinder VDE mode with EIVC at 1728. The CPS system may switch intake valve actuating cams from a first cam with longer intake duration to a second cam with a shorter intake duration. If a decrease in engine load is not confirmed, routine 1700 may continue to 1712 where the existing engine operating mode may be maintained. Herein, the existing engine operating mode is the three-cylinder VDE mode without EIVC.

Returning to 1708, if it is confirmed that the current engine operating mode is the three-cylinder VDE mode with EIVC, routine 1700 continues to 1730 to determine if engine load has increased. If the existing operating mode is the three-cylinder VDE mode with EIVC, the engine may have previously experienced lighter engine loads. Therefore, a transition from the existing mode may occur with an increase in engine load to either medium, high or very high. In another example, a transition may also occur if engine speed increases to very high speeds. If an increase in engine load is not confirmed at 1730, routine 1700 progresses to 1732 to maintain the existing three-cylinder VDE mode with EIVC. It should be noted that the relative speed (or loads or other such parameters) as being high or low refer to the relative speed compared to the range of available speeds.

If an increase in engine load is confirmed at 1730, routine 1700 may continue to 1734 to determine if the increase in engine load is to a medium load (from an existing low load). If yes, engine operation may be transitioned to three-cylinder VDE mode without EIVC at 1736. The CPS system may switch intake valve actuating cams from the second cam with shorter intake duration to the first cam with longer intake duration. If an increase to medium engine load is not confirmed, routine 1700 may continue to 1738 to determine if the increase in load is to a high (or very high load). If yes, at 1740, cylinder 1 may be activated and the engine may be transitioned to non-VDE mode of operation. Further, the intake valves in all cylinders may be actuated via their respective first intake cams providing longer intake durations. Routine 1700 may then end. If the increase in engine load is not to a high (or very high) load, routine 1700 may return to 1730.

Thus, the embodiment of FIG. 14 may comprise an engine with four cylinders wherein a single cylinder of the four cylinders includes a deactivation mechanism. Further, each of the remaining three of the four cylinders (excluding the single cylinder) include at least one intake valve actuatable between an open position and a closed position via a first intake cam having a first profile for opening the intake valve for a first intake duration, and via a second intake cam having a second profile for opening the intake valve for a second intake duration. Additionally, the engine may include a controller with computer-readable instructions stored in non-transitory memory for during a low engine load, deactivating the single cylinder, and actuating the intake valve of each of the remaining three cylinders with the second intake cam. During a medium engine load, the controller may deactivate the single cylinder, and actuate the intake valve of each of the remaining three cylinders with the first intake cam, and during a high engine load, the controller may activate the single cylinder, and actuate the intake valve of each of the remaining three cylinders with the first intake cam. Herein, the first intake cam may have a profile that enables a longer intake duration than the intake duration enabled by the second intake cam. Therefore, the first intake duration is longer than the second intake duration. Furthermore, the first profile of the first intake cam may have a first valve lift and the second profile of the second intake cam may have a second valve lift wherein the second valve lift is lower than the first valve lift. In other words, the first valve lift if higher than the second valve lift.

In this way, an engine with variable displacement engine (VDE) operation may be operated for substantial reduction in fuel consumption and smoother engine control. The engine may include a crankshaft that enables a three-cylinder VDE mode with even firing such that three of four cylinders are fired about 240 crank angle degrees apart from each other. Herein, a single cylinder of the four cylinders may be deactivated. The engine may also operate in full-cylinder or non-VDE mode wherein all four cylinders are activated with uneven firing. In one example, the crankshaft may enable the single cylinder to be fired approximately midway between two of the three cylinders. The uneven firing mode may comprise firing the single cylinder at approximately zero crank angle (CA) degrees followed by firing a first of the three cylinders approximately 120 CA degrees after firing the single cylinder. A second of the three cylinders may be fired approximately 240 CA degrees after firing the first of the three cylinders followed by firing a third of the three cylinders approximately 240 CA degrees after firing the second of the three cylinders. For example, in a four-cylinder engine with cylinders 1, 2, 3, 4 arranged inline, the firing order in full-cylinder mode may be 1-3-2-4 wherein cylinders 2, 3, 4 fire 240 CA degrees apart from each other and cylinder 1 fires approximately midway between cylinder 4 and cylinder 3.

The engine described above may either be a naturally aspirated engine or a turbocharged engine. In the example of a turbocharged engine with VDE operation having a firing order 1-3-2-4, a twin scroll exhaust turbine may be included to separate exhaust pulses. Exhaust runners from cylinder 1 and cylinder 2 may be coupled to a first scroll of the exhaust turbine and exhaust runners from cylinder 3 and cylinder 4 may be coupled to a second scroll of the exhaust turbine. Each scroll may thus receive exhaust pulses separated by at least 240 CA degrees. A symmetric layout such as the one described above may improve turbine efficiency. An alternate layout may comprise coupling the exhaust runner from cylinder 1 to the first scroll of the exhaust turbine and coupling exhaust runners from cylinders 2, 3, and 4 to the second scroll of the exhaust turbine. This layout may also provide exhaust pulse separation of at least 240 CA degrees in each scroll but may result in a relatively lower turbine efficiency. However, each of these layouts may offer a compactness which may be utilized by integrating the exhaust manifold into the cylinder head. By including an integrated exhaust manifold, the engine may have reduced weight, reduced surface area, and decreased expenses.

In another embodiment, the engine may be capable of operating in a two-cylinder VDE mode during low (or lower) engine load conditions. In this embodiment, only three of the four cylinders may be provided with deactivation mechanisms. The single uneven firing cylinder (during full-cylinder mode) may be one of the three provided with deactivation mechanisms. For example, cylinders 1, 3, and 4 may be deactivatable while cylinder 2 may not be deactivatable. To operate in the two-cylinder VDE mode, the single uneven firing cylinder may be activated along with the non-deactivatable cylinder. For example, cylinder 1 and cylinder 2 may be activated in the two-cylinder VDE mode while cylinder 3 and cylinder 4 may be deactivated. Further, the engine may be operated with even firing wherein the two activated cylinders (cylinders 1 and 2) are fired at approximately 360 CA degree intervals from each other. In this embodiment, the engine may be operated in the two-cylinder VDE mode during lower engine loads, as mentioned above. The engine may be transitioned to three-cylinder VDE mode during medium engine load conditions. Further, a higher engine load condition may include engine operation in full-cylinder or non-VDE mode. Additionally, during idle, the engine may be operated in the three-cylinder VDE mode. It will be noted that engine load conditions mentioned above are relative. As such, low engine load conditions may include conditions where engine load is lower than each of medium engine loads and high (or higher) engine loads. Medium engine loads include conditions where engine load is greater than low load conditions, but lower than high (or higher) load conditions. High or very high engine load conditions include engine loads that may be higher than each of medium and low (or lower) engine loads.

In yet another embodiment, the engine may not be capable of operating in a two-cylinder VDE mode. Herein, during lower engine loads the engine may operate in a three-cylinder mode with early intake valve closing (EIVC). In this embodiment, the single uneven firing cylinder may be the only cylinder including a deactivation mechanism. The remaining three cylinders may include intake valves that are actuatable by two cams: a first cam providing a longer intake duration and a higher valve lift, and a second cam providing a shorter intake duration and a lower valve lift. Herein, the second cam may enable EIVC operation. A controller of the engine in this embodiment may operate the engine in three-cylinder VDE mode with EIVC during lighter engine loads, and may transition engine operation to a three-cylinder mode without EIVC during moderate engine loads. In some examples, the engine may be operated during higher engine load conditions in the three-cylinder mode without EIVC. Finally, during very high engine loads, the controller may transition engine operation to non-VDE (full-cylinder) mode and activate the single cylinder. It will be appreciated that the three cylinder VDE mode includes even firing wherein the engine is fired at approximately 240 CA degree intervals. Further, in the non-VDE mode, an uneven firing pattern may be used.

In this way, a three cylinder VDE mode may be used primarily for engine operation in the engine embodiments described above. Aside from fuel economy benefits, the engine may operate with decreased NVH offering improved drivability. A single balance shaft may replace the typical twin balance shafts to counter crankshaft rotation and offset vibrations providing a reduction in weight and decreased frictional losses. Accordingly, fuel economy may be further enhanced. An integrated exhaust manifold (IEM) may also be used in the described embodiments providing a further decline in engine weight. In the example of a turbocharged engine having VDE operation with a twin scroll turbocharger, exhaust pulse separation may be obtained which may result in higher volumetric efficiencies and engine power. In the example of the engine capable of three-cylinder VDE mode with EIVC, the engine may be primarily operated in a three-cylinder VDE mode. Thus, fuel consumption may be decreased and enhanced engine efficiency may be attained. Further, by using a two-step intake valve lift, charge motion in the cylinders may be increased and pumping losses may be reduced. In addition, transitions between the VDE and non-VDE modes may be reduced resulting in smoother engine operation and improved engine control. Overall, the engine embodiments with VDE operation described herein offer substantial fuel economy benefits and enhances drivability.

In one representation, a method for an engine having VDE operation may comprise when all cylinders are activated, firing a first cylinder at 120 degrees of crank rotation, firing a second cylinder at 240 degrees of crank rotation after firing the first cylinder, firing a third cylinder at 240 degrees of crank rotation after firing the second cylinder, firing a fourth cylinder at 120 degrees of crank rotation after firing the third cylinder. Further, when three cylinders are activated, the method may include firing the three activated cylinders at 240 crank angle degree intervals. In one example, the three cylinders may be activated during idle engine conditions. In another example, the three cylinders may be activated during medium engine load conditions. The method may also comprise when two cylinders are activated, firing the two activated cylinders at 360 crank angle degree intervals. The two cylinders may be activated during low engine load conditions.

In another representation, a system for an engine may comprise a turbocharger for providing a boosted aircharge to the engine, the turbocharger including an intake compressor and an exhaust turbine, the exhaust turbine including a first and a second scroll, an inline group of four cylinders with a first cylinder fluidically communicating with the first scroll of the exhaust turbine and remaining three cylinders fluidically communicating with the second scroll of the exhaust turbine. Further, a controller may be configured with computer readable instructions stored on non-transitory memory for during a first condition, flowing exhaust from the first cylinder to the first scroll of the exhaust turbine and flowing exhaust from the remaining three cylinders to the second scroll of the exhaust turbine. Herein, the first condition may include high engine load conditions. Further, the first scroll of the exhaust turbine may receive exhaust from the first cylinder at 720 crank angle degree intervals, and wherein the second scroll of the exhaust turbine may receive exhaust from the remaining three cylinders at 240 crank angle degree intervals. The exhaust from the first cylinder may be received by the exhaust turbine approximately midway between exhaust received from two of the remaining three cylinders.

The controller may be further configured for during a second condition, deactivating the flowing of exhaust from the first cylinder to the first scroll of the exhaust turbine and flowing exhaust from the remaining three cylinders to the second scroll of the exhaust turbine. Herein, the second condition may include medium engine load conditions. In another example, the second condition may include engine idling conditions.

The controller may be further configured for, during a third condition, activating the first cylinder, activating a first of the remaining three cylinders, and, deactivating a second and a third cylinder of the remaining three cylinders. Herein, exhaust may flow from the first of the remaining three cylinders to the second scroll and exhaust may flow from the first cylinder to the first scroll of the exhaust turbine. Further, the exhaust turbine may receive exhaust at 360 crank angle degree intervals. Further still, the third condition may include low engine load conditions.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine having VDE operation and a twin scroll turbocharger with first and second exhaust turbine scrolls, comprising:
when all cylinders of an inline group of cylinders including a first outer cylinder adjacent to a first inner cylinder and a second inner cylinder adjacent to a second outer cylinder are activated, firing the second inner cylinder at 120 degrees of crank rotation and flowing exhaust from the second inner cylinder to the second scroll, firing the first inner cylinder at 240 degrees of crank rotation after firing the second inner cylinder and flowing exhaust from the first inner cylinder to the first scroll, firing the second outer cylinder at 240 degrees of crank rotation after firing the first inner cylinder and flowing exhaust from the second outer cylinder to the second scroll, and firing the first outer cylinder at 120 degrees of crank rotation after firing the second outer cylinder and flowing exhaust from the first outer cylinder to the first scroll.

2. The method of claim 1 further comprising, when the first outer cylinder is deactivated and the first inner, second inner, and second outer cylinders are activated, firing the activated cylinders at 240 crank angle degree intervals, flowing exhaust from the first inner cylinder to the first scroll, and flowing exhaust from the second inner and second outer cylinders to the second scroll.

3. The method of claim 2, wherein the first outer cylinder is deactivated and the first inner, second inner, and second outer cylinders are activated during idle engine conditions.

4. The method of claim 2, wherein the first outer cylinder is deactivated and the first inner, second inner, and second outer cylinders are activated during medium engine load conditions.

5. The method of claim 1 further comprising, when the second outer and second inner cylinders are deactivated and the first outer and first inner cylinders are activated, firing the activated cylinders at 360 crank angle degree intervals and flowing exhaust from the activated cylinders to the first scroll.

6. The method of claim 5, wherein the second outer and second inner cylinders are deactivated and the first outer and first inner cylinders are activated during low engine load conditions.

* * * * *